United States Patent
Stevenson et al.

(10) Patent No.: US 11,609,015 B2
(45) Date of Patent: Mar. 21, 2023

(54) MULTIFUNCTION ADAPTIVE WHOLE HOUSE FAN SYSTEM

(71) Applicant: QC Manufacturing, Inc., Temecula, CA (US)

(72) Inventors: Dana Charles Stevenson, Canyon Lake, CA (US); Dane Stevenson, Temecula, CA (US); Dustin Martin Stevenson, Menifee, CA (US)

(73) Assignee: QC MANUFACTURING, INC., Temecula, CA (US)

( * ) Notice: Subject to any disclaimer, the term of this patent is extended or adjusted under 35 U.S.C. 154(b) by 0 days.

(21) Appl. No.: 17/815,157

(22) Filed: Jul. 26, 2022

(65) Prior Publication Data
US 2022/0364751 A1 Nov. 17, 2022

Related U.S. Application Data

(63) Continuation of application No. 17/539,031, filed on Nov. 30, 2021, now Pat. No. 11,435,103, which is a
(Continued)

(51) Int. Cl.
*F24F 11/46* (2018.01)
*F24F 11/77* (2018.01)
(Continued)

(52) U.S. Cl.
CPC .............. *F24F 11/46* (2018.01); *F24F 7/007* (2013.01); *F24F 7/025* (2013.01);
(Continued)

(58) Field of Classification Search
CPC ........ F24F 11/46; F24F 11/77; F24F 11/0001; F24F 7/007; F24F 7/025; F24F 2110/10; F24F 2110/12; F24F 2011/0002
See application file for complete search history.

(56) References Cited

U.S. PATENT DOCUMENTS

| 416,405 A | 12/1889 | Fouquet |
| 1,924,489 A | 8/1933 | Ferris |

(Continued)

FOREIGN PATENT DOCUMENTS

| AU | 9333942 A | 9/1993 |
| JP | 57-062341 A | 4/1982 |

(Continued)

OTHER PUBLICATIONS

International Search Report and Written Opinion of the International Searching Authority for International Application No. PCT/US2020/061088, dated Feb. 15, 2021, in 10 pages.
(Continued)

*Primary Examiner* — Marc E Norman
(74) *Attorney, Agent, or Firm* — Knobbe, Martens, Olson & Bear, LLP

(57) ABSTRACT

A multifunction adaptive whole house fan system can include a whole house fan to pull large volume of air through a building structure. The whole house fan can pull air from a motorized window or damper into the building structure and expel air through an attic. The system can monitor the environment to operate the whole house fan when desired conditions are present in coordination with other systems of the building structure to reduce overall energy consumption.

30 Claims, 17 Drawing Sheets

Related U.S. Application Data continuation of application No. 17/379,712, filed on Jul. 19, 2021, now Pat. No. 11,193,687, which is a continuation of application No. 17/227,259, filed on Apr. 9, 2021, now Pat. No. 11,092,350, which is a continuation of application No. PCT/US2020/061088, filed on Nov. 18, 2020.

(60) Provisional application No. 63/114,947, filed on Nov. 17, 2020, provisional application No. 63/114,924, filed on Nov. 17, 2020, provisional application No. 62/939,491, filed on Nov. 22, 2019.

(51) Int. Cl.
| | | |
|---|---|---|
| *F24F 7/00* | (2021.01) | |
| *F24F 7/02* | (2006.01) | |
| *F24F 11/00* | (2018.01) | |
| *F24F 7/007* | (2006.01) | |
| *F24F 110/10* | (2018.01) | |
| *F24F 110/12* | (2018.01) | |

(52) U.S. Cl.
CPC .......... *F24F 11/0001* (2013.01); *F24F 11/77* (2018.01); *F24F 2011/0002* (2013.01); *F24F 2110/10* (2018.01); *F24F 2110/12* (2018.01)

(56) References Cited

U.S. PATENT DOCUMENTS

| | | |
|---|---|---|
| 2,011,421 A | 8/1935 | Searles |
| 2,087,637 A | 7/1937 | Burt |
| 2,191,774 A | 2/1940 | Reed |
| 2,218,348 A | 10/1940 | Boyer |
| 2,225,885 A | 12/1940 | Penman |
| 2,278,581 A | 4/1942 | Macdougald |
| 2,299,833 A | 10/1942 | Mader |
| 2,300,475 A | 11/1942 | Ward |
| 2,349,627 A | 5/1944 | Kemmer et al. |
| 2,464,000 A | 3/1949 | Schild |
| 2,544,379 A | 3/1951 | Davenport |
| 2,612,831 A | 10/1952 | Lohman, Jr. |
| 2,618,450 A | 11/1952 | Thomas |
| 2,682,757 A | 7/1954 | Borgerd |
| 2,684,621 A | 7/1954 | Cook |
| 2,885,948 A | 5/1959 | Oshins |
| 2,922,733 A | 1/1960 | Henning |
| 2,936,982 A | 5/1960 | Cushenberry |
| 2,962,402 A | 11/1960 | Sweeney |
| 3,092,529 A | 6/1963 | Pearson |
| 3,199,433 A | 8/1965 | Bosma, Jr. et al. |
| 3,312,242 A | 4/1967 | Kahn et al. |
| 3,330,379 A | 7/1967 | Cook |
| 3,482,503 A | 12/1969 | Jenn |
| 3,654,966 A | 4/1972 | Waksman |
| 3,698,158 A | 10/1972 | Kinnebrew |
| 3,738,621 A | 6/1973 | Anderson |
| 3,791,281 A | 2/1974 | Steiner |
| 3,990,063 A | 11/1976 | Schuman |
| 3,990,069 A | 11/1976 | Schuman |
| 4,121,796 A | 10/1978 | Forbes |
| 4,176,587 A | 12/1979 | Cox |
| 4,261,255 A | 4/1981 | Anderson et al. |
| 4,318,518 A | 3/1982 | Davis |
| 4,344,479 A | 8/1982 | Bailey |
| 4,372,196 A | 2/1983 | Henderson |
| 4,375,183 A | 3/1983 | Lynch |
| 4,385,550 A | 5/1983 | Steiner et al. |
| 4,437,511 A | 3/1984 | Sheridan |
| 4,445,426 A | 5/1984 | Bohanon, Sr. |
| 4,501,194 A | 2/1985 | Brown |
| 4,502,467 A | 3/1985 | Smith |
| 4,510,851 A | 4/1985 | Sarnosky et al. |
| 4,515,071 A | 5/1985 | Zach |
| 4,594,940 A | 6/1986 | Wolbrink et al. |
| 4,596,180 A | 6/1986 | Steiner et al. |
| 4,628,802 A | 12/1986 | Steiner et al. |
| RE32,362 E | 2/1987 | McCabe |
| 4,662,268 A | 5/1987 | Beavers |
| RE32,607 E | 2/1988 | Smith |
| 4,776,385 A | 10/1988 | Dean |
| 4,784,049 A | 11/1988 | Steiner et al. |
| 4,794,852 A | 1/1989 | Ee |
| 4,796,841 A | 1/1989 | Baker et al. |
| 4,939,986 A | 7/1990 | Turner |
| 4,951,480 A | 8/1990 | Brence |
| 4,955,997 A | 9/1990 | Robertson, III |
| 4,977,818 A | 12/1990 | Taylor et al. |
| 4,991,657 A | 2/1991 | LeLande, Jr. |
| 5,014,770 A | 5/1991 | Palmer |
| 5,049,801 A | 9/1991 | Potter |
| 5,092,520 A | 3/1992 | Lestage |
| 5,195,927 A | 3/1993 | Raisanen |
| 5,306,207 A | 4/1994 | Court |
| 5,326,317 A | 7/1994 | Ishizu et al. |
| 5,353,601 A | 10/1994 | Palmer |
| 5,528,229 A | 6/1996 | Mehta |
| 5,533,346 A | 7/1996 | Freeman et al. |
| 5,620,368 A | 4/1997 | Bates et al. |
| 5,720,661 A | 2/1998 | Yoshizawa et al. |
| 5,746,653 A | 5/1998 | Palmer et al. |
| 5,879,232 A | 3/1999 | Luter, II et al. |
| 5,881,806 A | 3/1999 | Rudd |
| 5,947,158 A | 9/1999 | Gross et al. |
| 5,957,506 A | 9/1999 | Stepp |
| 5,966,953 A | 10/1999 | Murr et al. |
| 5,979,167 A | 11/1999 | Kochavi et al. |
| 5,996,898 A | 12/1999 | Parker et al. |
| 6,126,540 A | 10/2000 | Janu et al. |
| 6,135,397 A | 10/2000 | Santa Cruz et al. |
| 6,203,422 B1 | 3/2001 | Rosal et al. |
| 6,203,423 B1 | 3/2001 | Craw et al. |
| 6,210,270 B1 | 4/2001 | Niksic et al. |
| 6,215,659 B1 | 4/2001 | Chen |
| 6,260,765 B1 | 7/2001 | Natale et al. |
| 6,267,667 B1 | 7/2001 | Fikes |
| 6,287,191 B1 | 9/2001 | Barker, II |
| 6,302,932 B1 | 10/2001 | Unger et al. |
| 6,319,115 B1 | 11/2001 | Shingaki |
| 6,322,443 B1 | 11/2001 | Jackson |
| 6,328,776 B1 | 12/2001 | Shanks et al. |
| 6,386,828 B1 | 5/2002 | Davis et al. |
| 6,450,414 B1 | 9/2002 | Dartnall et al. |
| 6,524,182 B2 | 2/2003 | Kilburn et al. |
| 6,537,146 B1 | 3/2003 | Haynes |
| 6,601,802 B1 | 8/2003 | Howe |
| 6,604,715 B2 | 8/2003 | Howe |
| 6,749,125 B1 | 6/2004 | Carson et al. |
| 7,001,265 B1 | 2/2006 | Beaty |
| 7,063,140 B1 | 6/2006 | Woo |
| 7,398,821 B2 | 7/2008 | Rainer et al. |
| 7,497,774 B2 | 3/2009 | Stevenson et al. |
| 7,591,433 B2 | 9/2009 | Wang et al. |
| 7,789,740 B2 | 9/2010 | Janesky |
| 7,798,418 B1 | 9/2010 | Rudd |
| 7,850,513 B1 | 12/2010 | Parker et al. |
| 8,079,898 B1 | 12/2011 | Stevenson |
| 8,123,142 B2 | 2/2012 | Cislo |
| 8,215,593 B2 | 7/2012 | Van Walraven |
| 8,368,240 B1 | 2/2013 | Burkett |
| 8,597,092 B2 | 12/2013 | Kupferberg et al. |
| 8,726,586 B1 | 5/2014 | Stevens et al. |
| 8,888,574 B2 | 11/2014 | Bredahl et al. |
| 8,998,691 B1 | 4/2015 | Stevenson |
| 9,322,568 B2 | 4/2016 | Aycock |
| 9,458,860 B2 | 10/2016 | Uehara |
| 9,582,011 B2 | 2/2017 | Potter |
| 9,664,402 B2 | 5/2017 | Kubo |
| 9,903,603 B2 | 2/2018 | Stevenson |
| 9,910,449 B2 | 3/2018 | Matsuoka et al. |
| 9,933,182 B2 | 4/2018 | Alfakhrany et al. |
| 10,371,397 B1 | 8/2019 | Stevenson |
| 10,550,952 B1 | 2/2020 | Ficner et al. |
| 10,739,025 B1 | 8/2020 | Stevenson |

(56) References Cited

U.S. PATENT DOCUMENTS

| | | |
|---|---|---|
| 10,753,627 B1 | 8/2020 | Stevenson |
| 10,830,464 B1 | 11/2020 | Stevenson |
| 11,092,350 B1 | 8/2021 | Stevenson et al. |
| 11,175,056 B1 | 11/2021 | Stevenson et al. |
| 11,193,687 B2 | 12/2021 | Stevenson et al. |
| 11,274,839 B1 | 3/2022 | Stevenson |
| 11,415,333 B2* | 8/2022 | Stevenson ............... F24F 11/46 |
| 2001/0015302 A1 | 8/2001 | Lundgren |
| 2002/0124992 A1 | 9/2002 | Rainer et al. |
| 2003/0084638 A1 | 5/2003 | Vacek |
| 2003/0190885 A1 | 10/2003 | Johnsons, Jr. |
| 2004/0020222 A1 | 2/2004 | Miwa |
| 2004/0253918 A1 | 12/2004 | Ezell et al. |
| 2005/0102913 A1 | 5/2005 | Gilleran |
| 2005/0113020 A1 | 5/2005 | Wheeler |
| 2005/0239394 A1 | 10/2005 | O'Hagin et al. |
| 2005/0277381 A1 | 12/2005 | Banerjee et al. |
| 2006/0037334 A1 | 2/2006 | Tien et al. |
| 2006/0154596 A1 | 7/2006 | Meneely, Jr. |
| 2007/0012052 A1 | 1/2007 | Butler et al. |
| 2007/0028635 A1 | 2/2007 | Gleeson |
| 2007/0096665 A1 | 5/2007 | Ku et al. |
| 2007/0130850 A1 | 6/2007 | Miekka |
| 2007/0145160 A1 | 6/2007 | Martin |
| 2007/0178827 A1 | 8/2007 | Erni |
| 2007/0197158 A1 | 8/2007 | Byczynski |
| 2007/0213003 A1 | 9/2007 | Railkar et al. |
| 2007/0227721 A1 | 10/2007 | Springer et al. |
| 2007/0243820 A1 | 10/2007 | O'Hagin |
| 2008/0014860 A1 | 1/2008 | Heitman et al. |
| 2008/0073439 A1 | 3/2008 | Lestage et al. |
| 2008/0113606 A1 | 5/2008 | Janesky |
| 2008/0113612 A1 | 5/2008 | Chich et al. |
| 2008/0314998 A1 | 12/2008 | Herzon et al. |
| 2009/0013703 A1 | 1/2009 | Werner |
| 2009/0099696 A1 | 4/2009 | Artman et al. |
| 2009/0125159 A1 | 5/2009 | Shen et al. |
| 2009/0134232 A1 | 5/2009 | Larsen |
| 2009/0186570 A1 | 7/2009 | Riggins |
| 2009/0186572 A1 | 7/2009 | Farrell |
| 2009/0321039 A1 | 12/2009 | Therrien et al. |
| 2010/0082162 A1 | 4/2010 | Mundy et al. |
| 2010/0163633 A1 | 7/2010 | Barrett et al. |
| 2010/0178863 A1 | 7/2010 | Coward |
| 2010/0211224 A1 | 8/2010 | Keeling et al. |
| 2010/0300645 A1 | 12/2010 | Glover |
| 2010/0304660 A1 | 12/2010 | Boehling et al. |
| 2010/0330898 A1 | 12/2010 | Daniels |
| 2011/0048245 A1 | 3/2011 | Schjerven, Sr. et al. |
| 2011/0053488 A1 | 3/2011 | Gans et al. |
| 2011/0097990 A1 | 4/2011 | Charron |
| 2011/0124280 A1 | 5/2011 | Railkar et al. |
| 2011/0153106 A1 | 6/2011 | Drake et al. |
| 2011/0217194 A1 | 9/2011 | Randall |
| 2011/0259559 A1 | 10/2011 | Gheyri |
| 2011/0263192 A1 | 10/2011 | Kouninski |
| 2011/0316279 A1 | 12/2011 | Bahari et al. |
| 2012/0034861 A1 | 2/2012 | Skrobek |
| 2012/0038162 A1 | 2/2012 | Smith, Jr. et al. |
| 2012/0045983 A1 | 2/2012 | Eskola, III |
| 2012/0065787 A1 | 3/2012 | Broniak et al. |
| 2012/0079840 A1 | 4/2012 | Lukasse et al. |
| 2012/0083196 A1 | 4/2012 | Mockridge |
| 2012/0190292 A1 | 7/2012 | Skrepcinski et al. |
| 2012/0273581 A1 | 11/2012 | Kolk et al. |
| 2012/0289139 A1 | 11/2012 | Fujimura et al. |
| 2013/0040553 A1 | 2/2013 | Potter |
| 2013/0045671 A1 | 2/2013 | Apple et al. |
| 2013/0074428 A1 | 3/2013 | Allen et al. |
| 2013/0165037 A1 | 6/2013 | Casey |
| 2013/0223976 A1 | 8/2013 | Smith et al. |
| 2013/0324029 A1 | 12/2013 | Sandman et al. |
| 2014/0079569 A1 | 3/2014 | Uehara |
| 2014/0081468 A1 | 3/2014 | Potter |
| 2014/0105738 A1 | 4/2014 | Bassett |
| 2014/0105743 A1 | 4/2014 | Bassett |
| 2014/0120818 A1 | 5/2014 | Bennett |
| 2014/0170961 A1 | 6/2014 | Labrecque |
| 2014/0202449 A1 | 7/2014 | Snyder |
| 2014/0206278 A1 | 7/2014 | Stevenson |
| 2014/0242898 A1 | 8/2014 | Richards |
| 2015/0032266 A1 | 1/2015 | Weast et al. |
| 2015/0079896 A1 | 3/2015 | Stocker |
| 2015/0098180 A1 | 4/2015 | Berghe |
| 2015/0118017 A1 | 4/2015 | Yato |
| 2015/0184879 A1 | 7/2015 | Zelman |
| 2015/0194039 A1 | 7/2015 | Martin |
| 2015/0219347 A1 | 8/2015 | Alfakhrany et al. |
| 2015/0285524 A1 | 10/2015 | Saunders |
| 2016/0010886 A1 | 1/2016 | Dukes |
| 2016/0084227 A1 | 3/2016 | Krippene |
| 2016/0091216 A1 | 3/2016 | Tran et al. |
| 2016/0237884 A1 | 8/2016 | Yamada et al. |
| 2016/0341443 A1 | 11/2016 | Ramos et al. |
| 2017/0022877 A1 | 1/2017 | Sirovatka et al. |
| 2017/0205107 A1 | 7/2017 | Williams et al. |
| 2017/0211833 A1 | 7/2017 | Tran et al. |
| 2017/0363309 A1 | 12/2017 | Mills et al. |
| 2018/0031266 A1 | 2/2018 | Atchison et al. |
| 2018/0045206 A1 | 2/2018 | Birk et al. |
| 2018/0080670 A1 | 3/2018 | Carlyon et al. |
| 2018/0180299 A1 | 6/2018 | Hallit et al. |
| 2018/0216845 A1 | 8/2018 | Whitehead |
| 2018/0245814 A1 | 8/2018 | Yan et al. |
| 2018/0259205 A1 | 9/2018 | Coogan et al. |
| 2018/0267566 A1 | 9/2018 | Locke et al. |
| 2018/0274810 A1 | 9/2018 | Woods |
| 2018/0299161 A1 | 10/2018 | Ribbich et al. |
| 2018/0372364 A1 | 12/2018 | Elwell |
| 2019/0003236 A1 | 1/2019 | Hall et al. |
| 2019/0003728 A1 | 1/2019 | Nakayama et al. |
| 2019/0017724 A1 | 1/2019 | Sekar et al. |
| 2019/0037770 A1 | 2/2019 | Dugas et al. |
| 2019/0040671 A1 | 2/2019 | Hall et al. |
| 2019/0056141 A1 | 2/2019 | Carey et al. |
| 2019/0137126 A1 | 5/2019 | Desrochers |
| 2019/0162009 A1 | 5/2019 | Hall et al. |
| 2019/0309559 A1 | 10/2019 | Hall et al. |
| 2019/0309562 A1 | 10/2019 | Hall et al. |
| 2019/0353369 A1 | 11/2019 | George et al. |
| 2020/0169092 A1 | 5/2020 | Hall et al. |
| 2020/0186626 A1 | 6/2020 | Martin |
| 2020/0240674 A1 | 7/2020 | Howe et al. |
| 2020/0326088 A1 | 10/2020 | Mowris |
| 2021/0156582 A1 | 5/2021 | Stevenson et al. |
| 2022/0082285 A1 | 3/2022 | Stevenson et al. |
| 2022/0163224 A1 | 5/2022 | Stevenson et al. |

FOREIGN PATENT DOCUMENTS

| | | |
|---|---|---|
| JP | 58-208527 A | 5/1983 |
| JP | 58-208528 A | 5/1983 |
| JP | 59-041734 A | 8/1984 |
| JP | 09-242206 A | 9/1997 |
| JP | H 10-54584 A | 2/1998 |
| JP | 2000-002457 A | 1/2000 |
| WO | WO 2013/125263 A1 | 8/2013 |

OTHER PUBLICATIONS

International Preliminary Report on Patentability and Written Opinion of the International Searching Authority for International Application No. PCT/US2020/061088, dated Jun. 2, 2022, in 7 pages.

International Search Report and Written Opinion of the International Searching Authority for International Application No. PCT/US2020/061092, dated Feb. 15, 2021, in 10 pages.

International Preliminary Report on Patentability and Written Opinion of the International Searching Authority for International Application No. PCT/US2020/061092, dated Jun. 2, 2022, in 7 pages.

Air Quality Index Basics. Retrieved from the Internet.<URL:https://www.airnow.gov/aqi/aqi-basics/>. Retrieved Jan. 26, 2021. (Year: 2021).

(56) References Cited

OTHER PUBLICATIONS

Alt, H.G., "Air Conditioning Simplified"; Domestic Engineering vol. 143, No. 3, p. 76; 1934. Reprinted from "Comfort Cooling with Attic Fans" by G.B. Helmrich and G.H. Tuttle. (Version 1).
G.B. Helmrich and G.H. Tuttle, "Attic Ventilation"; Domestic Engineering pp. 75-79; 1934. (Version 2).
Carrier, Air conditioning system design, Carrier corporation 1984.
Print-Out of Quietcoolfan.com website, Sep. 2003.
QuietCool Attic Fan web page of Sep. 29, 2020 downloaded from the Wayback Machine at https://web.archive.org/web/20200929113122/https://quietcoolsystems.com/attic-fan (Year: 2020).
Quiet Cool Online Publication—Quiet Cool Whole House Fans, dated Aug. 20, 2006, located at http://web.archive.org/web/20060820095737/http://www.quietcoolfan.com/ (with Examiner's annotations).
Utah Department of Air Quality, Current Conditions. Retrieved from the internet <URL:https://air.utah.gov/currentconditions.php?id=ln> Retrieved Jan. 26, 2021 (Year: 2021).
Wikipedia contributors, "Weather forecasting," Wikipedia, The Free Encyclopedia, https://en.wikipedia.org/w/index.php?title=Weather_forecasting&oldid=1009049104 (accessed Apr. 2, 2021) (Year: 2021).

\* cited by examiner

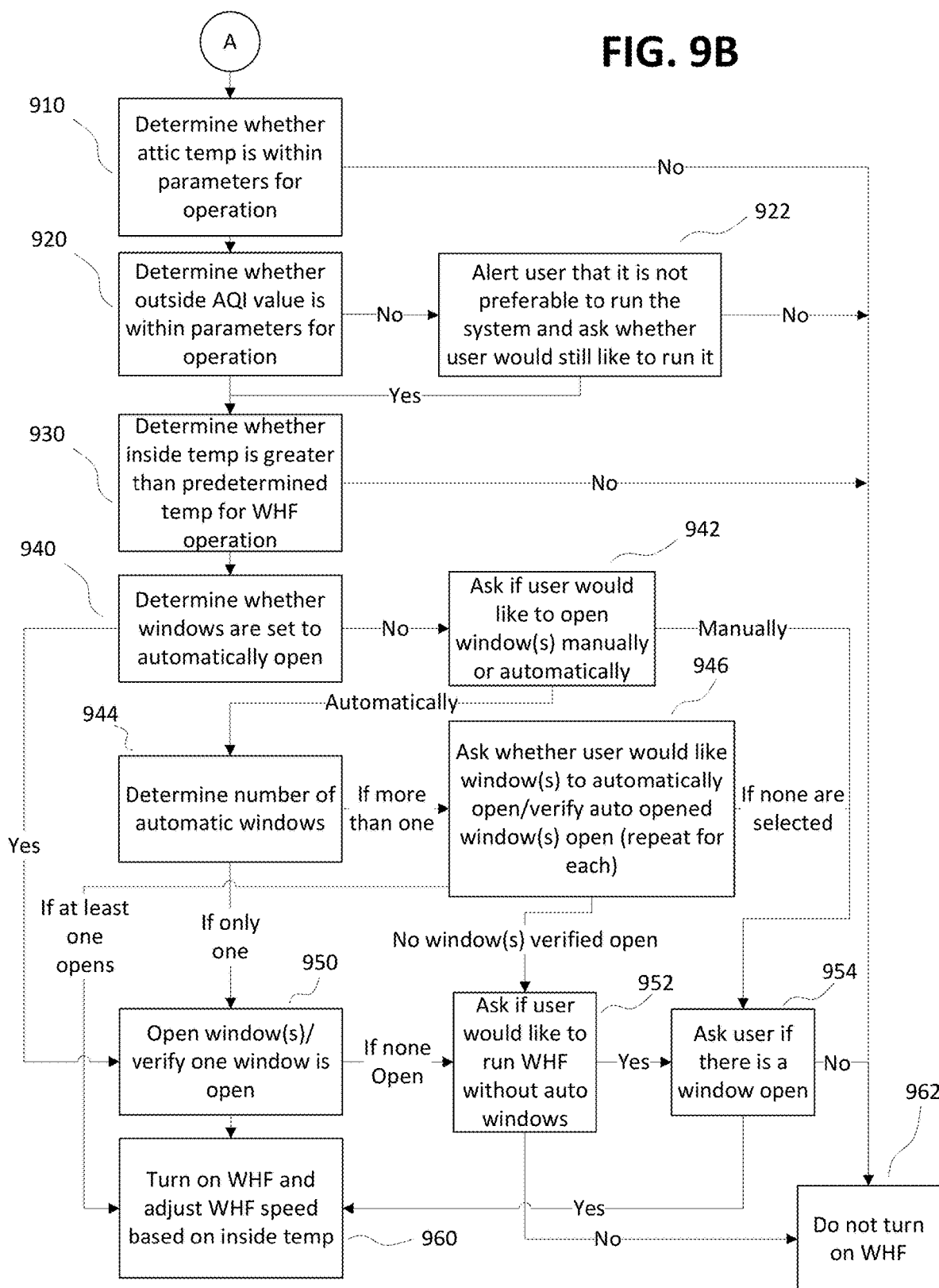

MULTIFUNCTION ADAPTIVE WHOLE HOUSE FAN SYSTEM

CROSS-REFERENCE TO RELATED APPLICATIONS

Any and all applications for which a foreign or domestic priority claim is identified in the Application Data Sheet as filed with the present application are incorporated by reference under 37 CFR 1.57 and made a part of this specification. This application is related to International Application PCT/US2020/061092, filed Nov. 18, 2020, the entirety of which is incorporated herein by reference and made a part of this specification.

BACKGROUND

Field

The present disclosure relates to multifunction adaptive whole house fan systems for building structures.

Description of the Related Art

Heating and cooling the space in residential and commercial buildings accounts for a primary share of building energy consumption. Occupants or persons otherwise associated with building heating and cooling may either not know when it is optimum to use a heating and cooling system or otherwise not properly utilize the heating and cooling system. When one desires to have the whole house fan on, one opens one or more windows and manually turns on the switch. In order for whole house fan to work properly, at least one window needs to be open so as to allow the fan to pull sufficient outside air in to cool the dwelling.

SUMMARY

When the outside ambient air temperature is lower than the internal air temperature, outside ambient air can instead be used to effectively cool the home or building structure, reducing the need to run a costly air conditioning system. Further, air conditioning systems merely circulate air located within a building structure, and do not bring any outside air, so any harmful environmental elements (e.g. dust, disease, chemicals) may remain within the building structure.

A whole house fan can be used to move air through the building structure when desired outside and/or inside conditions allow. Whole house fans include one or more high cubic feet per minute (cfm) fans, typically placed in the attic of a building structure, and function by creating a negative static pressure inside of the building structure to draw air in from the outside. The outside air is moved through the ceiling into the attic where the air is exhausted out through a vent by positive static pressure in the attic or upper floor. Louvered shutters can be placed over the vent to prevent cooled or heated air from escaping when the whole house fan is not in use. Whole house fan systems move large amounts of air and allow for the entire building structure air volume to be recycled with multiple air exchanges per hour, removing latent heat within the building structure. Advantageously, whole house fan systems typically require less energy than air conditioning systems and can reduce the need for air conditioning, therefore reducing energy consumption while providing a comfortable space for building occupants. The systems and methods disclosed herein provide a more efficient and cost effective cooling and ventilating of interior spaces of a building structure while improving the indoor or interior air quality.

In some embodiments, a multifunction adaptive whole house fan system disclosed herein may use open windows to serve as intake air vents. In some embodiments, the user may manually open the windows to allow for airflow into the building structure. In some embodiments, the multifunction adaptive whole house fan system disclosed herein may control one or more automated windows to allow for airflow into the building structure. The automated windows can be controlled by the system to be automatically opened by the system to drawn in air and be automatically closed by the system when the whole house fan is shut off.

The automated window can have one or more user control interfaces (e.g., buttons) for the user to open or close the automated window at the window itself (e.g., without system controls input). The automated window can further have security features to help warn when the automated window is forced open by, for example, activating one or more alarms. For example, the automated window can sense when the window is being forced open without user and/or system commands being provided to open (e.g., a burglar forcing the window open). When the automated window is forced open, the automated window can sound an alarm via a noisemaker of the automated window acting as an alarm system and/or trigger a general alarm system of the building structure. Further, the automated window can have a lock mechanism that can be activated by the system and/or user at the automated window using one or more user controller interface features (e.g., buttons) on the automated window to lock, close, engage, and/or secure the window in a desired or certain position and inhibit the automated window from being forced open.

The multifunction adaptive whole house fan system can control for and/or notify a user when a whole house fan may not be effective at cooling the building structure such as, for example, when the outside temperature is higher than the inside temperature. The multifunction adaptive whole house fan system may also be connected to a thermostat and an air conditioning system to avoid, for example, the air conditioning system running (being activated or operating) while the whole house fan is running (activated or operating), mitigating possible energy savings. The air conditioning systems discussed herein can include systems with a vapor compression refrigeration cycle.

In some embodiments, the multifunction adaptive whole house fan system can determine the temperature of the interior and/or exterior of the building structure and other parameters such as humidity. The multifunction adaptive whole house fan system can use these input parameters to control activation of a whole house fan system and/or air conditioning system. The multifunction adaptive whole house fan system can be connected to and at least partially control an air conditioning system. The fresh air cooling and ventilating system can be connected to an automated or automatic window system. The multifunction adaptive whole house fan system can control one or more automated window(s) to automatically open or close window(s) to, for example, serve as intake air vent(s) for the whole house fan system.

The multifunction adaptive whole house fan system can include one or more controller(s) that provides for automatic and/or manual control of certain parts of the system. The controller(s) can operate in various modes ranging from automatic operation of the system to substantially manual operation of the system. For example, in an automatic mode, the controller(s) can collect a variety of information from climate condition system(s) such as temperature sensors, humidity sensors, air quality sensors (such as for example sensors for detecting volatile organic compound (VOC) gases, carbon dioxide, carbon monoxide, smoke, particulates, and/or pollen), weather information, and/or other information via a variety of input sources, including sensors and the internet. The controller(s) can determine when conditions permit for operation of the whole house fan system or the air conditioning system. For example, the multifunction adaptive whole house fan system can turn off the air conditioning system and operate the whole house fan if it is cooler outside than in the interior space of the building structure. Alternatively, if it is hot outside, the multifunction adaptive whole house fan system can allow the air conditioning system to operate. The multifunction adaptive whole house fan system can also operate the whole house fan if there are undesired air pollutants (based on AQI levels) inside the building structure by bringing in fresh air from the outside.

Accordingly, the multifunction adaptive whole house fan system can be operated in a variety of modes. An automatic mode allows the system to operate with minimal or no user input after, for example, selection of the automatic mode. The multifunction adaptive whole house fan system can be operated in a semi-automatic mode, which may prompt the user for certain input before, during, and/or after operation. The multifunction adaptive whole house fan system can be operated in various selectable modes ranging from automatic to manual (including semi-automatic) depending on the user input for desired operation and/or devices, such as automated windows, connected to the fresh air cooling and ventilating system.

The multifunction adaptive whole house fan system can be controlled by the user utilizing a variety of methods. In some embodiments, one or more user devices are positioned within the building structure from which the user can control the system. The user device can display information about the fresh air cooling and ventilating system to the user. In some embodiments, the user can use a smart phone application connected to the multifunction adaptive whole house fan system over the internet or via a Bluetooth connection to control the fresh air cooling and ventilating system. Similar to the user device, the smart phone application can display information about the fresh air cooling and ventilating system to the user.

According to this disclosure, a multifunction adaptive whole house fan system for use in a building structure having an attic and a living space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the living space to create a positive static pressure in the attic to cause air in the attic to be pushed out through one or more vents in the attic and inhibit outside air from being drawn into the attic through the one or more vents; an air intake comprising an air register, the air intake configured to be positioned in a wall separating the attic and the living space of the building structure; a duct having a first end and a second end, the first end configured to be attached to the whole house fan, the second end configured to be attached to the air intake, the duct being flexible between the first end and the second end; a motorized window configured to be positioned in a wall separating the living space from ambient environment of the building structure, the motorized window configured to automatically open to permit ambient air to enter the living space and to automatically close to inhibit ambient air from entering the living space, the motorized window comprising lock control to inhibit the motorized window from being forced open; a fresh air controller configured to receive data associated with an outside temperature value corresponding to ambient temperature around the building structure and an inside temperature value corresponding to temperature inside the living space, the fresh air controller configured to be in communication with and control operation of the whole house fan and the motorized window, the fresh air controller configured to be in communication with a thermostat controller, the thermostat controller configured to control operation of an air conditioning system of the building structure, the air conditioning system configured to maintain a desired temperature inside the living space, the fresh air controller configured to: compare the outside temperature value to the inside temperature value; based on a comparison being that the outside temperature value is less than the inside temperature value: send a cease operation command to the thermostat controller for the thermostat controller to suspend operation of the air conditioning system; cause the motorized window to open to permit ambient air to enter the living space; cause the whole house fan to operate to draw air into the attic from the living space through the air register via the duct and to draw ambient air into the living space through the motorized window as the air is drawn into the attic from the living space; based on a comparison being that the outside temperature value is greater than the inside temperature value: cause the whole house fan to suspend operation; cause the motorized window to close to inhibit ambient air from entering the living space; and/or send a resume or continue operation command to the thermostat controller for the thermostat controller to resume or continue operation of the air conditioning system.

According to this disclosure, the multifunction adaptive whole house fan system can further include one or more of the following: a ventilation fan configured to be positioned in the attic of the building structure, the ventilation fan configured to be positioned proximate to a vent of the one or more vents, the ventilation fan configured to draw air from the attic through the vent to facilitate the whole house fan pushing air from the attic through the one or more vents; wherein the fresh air controller is configured to cause the ventilation fan to operate with the whole house fan being operated; a ventilation fan controller configured to cause operation of the ventilation fan, the fresh air controller configured to be in communication with the ventilation fan controller, the fresh air controller configured to send a ventilation command to the ventilation fan controller to cause the ventilation fan to operate; wherein the ventilation fan controller is in wired communication with the ventilation fan, and wherein the ventilation fan controller is configured to wirelessly communicate with the fresh air controller; a whole house fan controller configured to cause operation of the whole house fan, the fresh air controller configured to be in communication with the whole house fan controller, the fresh air controller configured to send an operate command to the whole house fan controller to cause the whole house fan to operate based on the comparison of the outside temperature value to the inside temperature value; wherein the whole house fan controller is in wired communication with the whole house fan, and wherein the whole house fan controller is configured to be in wired communication with the fresh air controller; a user device configured to be positioned in the living space, the user device comprising the fresh air controller; wherein the user device comprises a temperature sensor configured to send a temperature signal corresponding to the inside temperature value, the fresh air controller configured to receive the temperature signal to determine the inside temperature value; wherein the fresh air controller is configured to receive data associated with the outside temperature value via the internet; wherein the fresh air controller is configured to wirelessly communicate with the thermostat controller; wherein the fresh air controller is configured to adjust speed of the whole house fan based on the inside temperature value, the fresh air controller configured to: compare the inside temperature value to a first predetermined temperature, a second predetermined temperature, and a third predetermined temperature, wherein the first predetermined temperature is less than the second predetermined temperature, and the second predetermined temperature is less the third predetermined temperature; based on a comparison being that the inside temperature value is between the first predetermined temperature and the second predetermined temperature, cause the whole house fan to operate at a first speed; based on a comparison being that the inside temperature value is between the second predetermined temperature and the third predetermined temperature, cause the whole house fan to operate at a second speed, the second speed being greater than the first speed; based on a comparison being that the inside temperature value is greater than the third predetermined temperature, cause the whole house fan to operate at a third speed, the third speed being greater than the second speed; wherein the fresh air controller is configured, based on a comparison being that the inside temperature value is less than the first predetermined temperature, to: cause the whole house fan to suspend operation; cause the motorized window to close to inhibit ambient air from entering the living space; wherein the fresh air controller is configured to receive data associated with an attic temperature value corresponding to temperature inside the attic, the fresh air controller configured to: compare the attic temperature value to a predetermined attic temperature; based on a comparison being that the attic temperature value is greater than the predetermined attic temperature, cause the whole house fan to suspend operation and the motorized window to close to inhibit ambient air from entering the living space; an attic temperature sensor configured to send a temperature signal corresponding to the attic temperature value, the fresh air controller configured to receive the temperature signal to determine the attic temperature value; wherein the fresh air controller is configured to retrieve a previous outside temperature value corresponding to ambient temperature around the building structure from a predetermined previous time period, the fresh air controller configured to: compare the outside temperature value to the previous outside temperature value; based on a comparison being of the outside temperature value is greater than the previous outside temperature value by a predetermined value, cause the whole house fan to suspend operation and the motorized window to close to inhibit ambient air from entering the living space; and/or wherein the fresh air controller is configured to receive a window signal indicating whether the motorized window is open or closed, and wherein the fresh air controller is configured to cause the whole house fan to suspend operation based on the window signal indicating that the motorized window is closed.

According to this disclosure, a multifunction adaptive whole house fan system for use in a building structure having an attic and an interior space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents; a motorized window configured to be positioned between the interior space and ambient environment of the building structure, the motorized window configured to automatically open to permit ambient air to enter the interior space and to automatically close to inhibit ambient air from entering the interior space; a fresh air controller configured to receive data associated with an outside temperature value corresponding to ambient temperature around the building structure and an inside temperature value corresponding to temperature in the interior space, the fresh air controller configured to control operation of the whole house fan and the motorized window, the fresh air controller configured to be in communication with a thermostat controller, the thermostat controller configured to control operation of an air conditioning system of the building structure, the air conditioning system configured to maintain a desired temperature inside the interior space, the fresh air controller configured to: compare the outside temperature value to the inside temperature value; based on a comparison being that the outside temperature value is less than the inside temperature value: send a cease operation command to the thermostat controller for the thermostat controller to suspend operation of the air conditioning system; cause the motorized window to open to permit ambient air to enter the interior space; cause the whole house fan to operate to draw air into the attic from the interior space and to draw ambient air into the interior space through the motorized window as the air is drawn into the attic from the interior space; based on a comparison being that the outside temperature value is greater than the inside temperature value: cause the whole house fan to suspend operation; cause the motorized window to close to inhibit ambient air from entering the interior space; and/or send a resume or continue operation command to the thermostat controller for the thermostat controller to resume or continue operation of the air conditioning system.

According to this disclosure, the multifunction adaptive whole house fan system can further include one or more of the following: an air intake comprising an air register, the air intake configured to be positioned in a wall separating the attic and the interior space of the building structure; duct having a first end and a second end, the first end configured to be attached to the whole house fan, the second end configured to be attached to the air intake, the duct being flexible between the first end and the second end; a ventilation fan configured to be positioned in the attic of the building structure, the ventilation fan configured to be positioned proximate to a vent of the one or more vents, the ventilation fan configured to draw air from the attic through the vent to facilitate the whole house fan pushing air from the attic through the one or more vents; wherein the fresh air controller is configured to cause the ventilation fan to operate with the whole house fan being operated; a ventilation fan controller configured to cause operation of the ventilation fan, the fresh air controller configured to be in communication with the ventilation fan controller, the fresh air controller configured to send a ventilation command to the ventilation fan controller to cause the ventilation fan to operate; wherein the ventilation fan controller is in wired communication with the ventilation fan, and wherein the ventilation fan controller is configured to wirelessly communicate with the fresh air controller; a whole house fan controller configured to cause operation of the whole house fan, the fresh air controller configured to be in communication with the whole house fan controller, the fresh air controller configured to send an operate command to the whole house fan controller to cause the whole house fan to operate based on the comparison of the outside temperature value to the inside temperature value; wherein the whole house fan controller is in wired communication with the whole house fan, and wherein the whole house fan controller is configured to be in wired communication with the fresh air controller; a user device configured to be positioned in the interior space, the user device comprising the fresh air controller; wherein the user device comprises a temperature sensor configured to send a temperature signal corresponding to the inside temperature value, the fresh air controller configured to receive the temperature signal to determine the inside temperature value; wherein the fresh air controller is configured to receive data associated with the outside temperature value via the internet; wherein the fresh air controller is configured to wirelessly communicate with the thermostat controller; wherein the fresh air controller is configured to adjust speed of the whole house fan based on the inside temperature value, the fresh air controller configured to: compare the inside temperature value to a first predetermined temperature, a second predetermined temperature, and a third predetermined temperature, wherein the first predetermined temperature is less than the second predetermined temperature, and the second predetermined temperature is less the third predetermined temperature; based on a comparison being that the inside temperature value is between the first predetermined temperature and the second predetermined temperature, cause the whole house fan to operate at a first speed; based on a comparison being that the inside temperature value is between the second predetermined temperature and the third predetermined temperature, cause the whole house fan to operate at a second speed, the second speed being greater than the first speed; based on a comparison being that the inside temperature value is greater than the third predetermined temperature, cause the whole house fan to operate at a third speed, the third speed being greater than the second speed; wherein the fresh air controller is configured, based on a comparison being that the inside temperature value is less than the first predetermined temperature, to: cause the whole house fan to suspend operation; cause the motorized window to close to inhibit ambient air from entering the interior space; wherein the fresh air controller is configured to receive data associated with an attic temperature value corresponding to temperature inside the attic, the fresh air controller configured to: compare the attic temperature value to a predetermined attic temperature; based on a comparison being that the attic temperature value is greater than the predetermined attic temperature, cause the whole house fan to suspend operation and the motorized window to close to inhibit ambient air from entering the interior space; and an attic temperature sensor configured to send a temperature signal corresponding to the attic temperature value, the fresh air controller configured to receive the temperature signal to determine the attic temperature value; wherein the fresh air controller is configured to retrieve a previous outside temperature value corresponding to ambient temperature around the building structure from a predetermined previous time period, the fresh air controller configured to: compare the outside temperature value to the previous outside temperature value; based on a comparison being of the outside temperature value is greater than the previous outside temperature value by a predetermined value, cause the whole house fan to suspend operation and the motorized window to close to inhibit ambient air from entering the interior space; and/or wherein the fresh air controller is configured to receive a window signal indicating whether the motorized window is open or closed, and wherein the fresh air controller is configured to cause the whole house fan to suspend operation based on the window signal indicating that the motorized window is closed.

According to this disclosure, a multifunction whole house fan system for use in a building structure having an attic and an interior space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents; a motorized window configured to be positioned at the interior space, the motorized window configured to automatically open to permit ambient air to enter the interior space and to automatically close to inhibit ambient air from entering the interior space; a fresh air controller configured to receive data associated with an outside temperature value corresponding to ambient temperature around the building structure and an inside temperature value corresponding to temperature in the interior space, the fresh air controller configured to control operation of the whole house fan and the motorized window, the fresh air controller configured to: compare the outside temperature value to the inside temperature value; based on a comparison being that the outside temperature value is less than the inside temperature value: cause the motorized window to open to permit ambient air to enter the interior space; cause the whole house fan to operate to draw air into the attic from the interior space and to draw ambient air into the interior space through the motorized window as the air is drawn into the attic from the interior space; based on a comparison being that the outside temperature value is greater than the inside temperature value: cause the whole house fan to suspend operation; and/or cause the motorized window to close to inhibit ambient air from entering the interior space.

According to this disclosure, the multifunction whole house fan system can further include one or more of the following: wherein the fresh air controller is configured to be in communication with a thermostat controller, the thermostat controller configured to control operation of an air conditioning system of the building structure, the air conditioning system configured to maintain a desired temperature inside the interior space; wherein, based on the comparison being that the outside temperature value is less than the inside temperature value, the fresh air controller is configured to send a cease operation command to the thermostat controller for the thermostat controller to suspend operation of the air conditioning system; wherein, based on a comparison being that the outside temperature value is greater than the inside temperature value, the fresh air controller is configured to send a resume or continue operation command to the thermostat controller for the thermostat controller to resume or continue operation of the air conditioning system; wherein the fresh air controller is configured to wirelessly communicate with the thermostat controller; an air intake comprising an air register, the air intake configured to be positioned in a wall separating the attic and the interior space of the building structure; a duct having a first end and a second end, the first end configured to be attached to the whole house fan, the second end configured to be attached to the air intake, the duct being flexible between the first end and the second end; a ventilation fan configured to be positioned in the attic of the building structure, the ventilation fan configured to be positioned proximate to a vent of the one or more vents, the ventilation fan configured to draw air from the attic through the vent to facilitate the whole house fan pushing air from the attic through the one or more vents; wherein the fresh air controller is configured to cause the ventilation fan to operate with the whole house fan being operated; a ventilation fan controller configured to cause operation of the ventilation fan, the fresh air controller configured to be in communication with the ventilation fan controller, the fresh air controller configured to send a ventilation command to the ventilation fan controller to cause the ventilation fan to operate; wherein the ventilation fan controller is in wired communication with the ventilation fan, and wherein the ventilation fan controller is configured to wirelessly communicate with the fresh air controller; a whole house fan controller configured to cause operation of the whole house fan, the fresh air controller configured to be in communication with the whole house fan controller, the fresh air controller configured to send an operate command to the whole house fan controller to cause the whole house fan to operate based on the comparison of the outside temperature value to the inside temperature value; wherein the whole house fan controller is in wired communication with the whole house fan, and wherein the whole house fan controller is configured to be in wired communication with the fresh air controller; a user device configured to be positioned in the interior space, the user device comprising the fresh air controller; wherein the user device comprises a temperature sensor configured to send a temperature signal corresponding to the inside temperature value, the fresh air controller configured to receive the temperature signal to determine the inside temperature value; wherein the fresh air controller is configured to receive data associated with the outside temperature value via the internet; wherein the fresh air controller is configured to adjust speed of the whole house fan based on the inside temperature value, the fresh air controller configured to: compare the inside temperature value to a first predetermined temperature, a second predetermined temperature, and a third predetermined temperature, wherein the first predetermined temperature is less than the second predetermined temperature, and the second predetermined temperature is less the third predetermined temperature; based on a comparison being that the inside temperature value is between the first predetermined temperature and the second predetermined temperature, cause the whole house fan to operate at a first speed; based on a comparison being that the inside temperature value is between the second predetermined temperature and the third predetermined temperature, cause the whole house fan to operate at a second speed, the second speed being greater than the first speed; based on a comparison being that the inside temperature value is greater than the third predetermined temperature, cause the whole house fan to operate at a third speed, the third speed being greater than the second speed; wherein the fresh air controller is configured, based on a comparison being that the inside temperature value is less than the first predetermined temperature, to: cause the whole house fan to suspend operation; cause the motorized window to close to inhibit ambient air from entering the interior space; wherein the fresh air controller is configured to receive data associated with an attic temperature value corresponding to temperature inside the attic, the fresh air controller configured to: compare the attic temperature value to a predetermined attic temperature; based on a comparison being that the attic temperature value is greater than the predetermined attic temperature, cause the whole house fan to suspend operation and the motorized window to close to inhibit ambient air from entering the interior space; an attic temperature sensor configured to send a temperature signal corresponding to the attic temperature value, the fresh air controller configured to receive the temperature signal to determine the attic temperature value; wherein the fresh air controller is configured to retrieve a previous outside temperature value corresponding to ambient temperature around the building structure from a predetermined previous time period, the fresh air controller configured to: compare the outside temperature value to the previous outside temperature value; based on a comparison being of the outside temperature value is greater than the previous outside temperature value by a predetermined value, cause the whole house fan to suspend operation and the motorized window to close to inhibit ambient air from entering the interior space; and/or wherein the fresh air controller is configured to receive a window signal indicating whether the motorized window is open or closed, and wherein the fresh air controller is configured to cause the whole house fan to suspend operation based on the window signal indicating that the motorized window is closed.

According to this disclosure, a multifunction whole house fan system for use in a building structure having an attic and an interior space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents; a motorized window configured to be positioned at the interior space, the motorized window configured to automatically open to permit ambient air to enter the interior space and to automatically close to inhibit ambient air from entering the interior space; a fresh air controller configured to receive data associated with an outside temperature value corresponding to ambient temperature around the building structure, the fresh air controller configured to retrieve a previous outside temperature value corresponding to ambient temperature around the building structure from a predetermined previous time period, the fresh air controller configured to control operation of the whole house fan and the motorized window, the fresh air controller configured to: compare the outside temperature value to a predetermined maximum outside temperature value; based on a comparison being that the outside temperature value is less than the predetermined outside temperature value: cause the motorized window to open to permit ambient air to enter the interior space; cause the whole house fan to operate to draw air into the attic from the interior space and to draw ambient air into the interior space through the motorized window as the air is drawn into the attic from the interior space; compare the outside temperature value to the previous outside temperature value; based on a comparison being that the outside temperature value is greater than the previous outside temperature value by the predetermined value: cause the whole house fan to suspend operation; and/or cause the motorized window to close to inhibit ambient air from entering the interior space.

According to this disclosure, the multifunction whole house fan system can further include one or more of the following: wherein the fresh air controller is configured to be in communication with a thermostat controller, the thermostat controller configured to control operation of an air conditioning system of the building structure, and wherein the fresh air controller is configured to: based on the comparison being that the outside temperature value is less than the predetermined maximum outside temperature value, send a cease operation command to the thermostat controller for the thermostat controller to suspend operation of the air conditioning system; based on the comparison being that the outside temperature value is greater than the previous outside temperature value by the predetermined value, send a resume or continue operation command to the thermostat controller for the thermostat controller to resume or continue operation of the air conditioning system; wherein the fresh air controller is configured to adjust speed of the whole house fan based on the outside temperature value, the fresh air controller configured to: compare the outside temperature value to a first predetermined temperature, a second predetermined temperature, and a third predetermined temperature, wherein the first predetermined temperature is less than the second predetermined temperature, and the second predetermined temperature is less than the third predetermined temperature; based on a comparison being that the outside temperature value is between the first predetermined temperature and the second predetermined temperature, cause the whole house fan to operate at a first speed; based on a comparison being that the outside temperature value is between the second predetermined temperature and the third predetermined temperature, cause the whole house fan to operate at a second speed, the second speed being greater than the first speed; based on a comparison being that the outside temperature value is greater than the third predetermined temperature, cause the whole house fan to operate at a third speed, the third speed being greater than the second speed; wherein the fresh air controller is configured, based on a comparison being that the outside temperature value is less than the first predetermined temperature, to: cause the whole house fan to suspend operation; cause the motorized window to close to inhibit ambient air from entering the interior space; wherein the fresh air controller is configured to receive data associated with an air quality index value corresponding to an air quality index of ambient air around the building structure, the fresh air controller configured to: compare the air quality index value with a predetermined air quality index value; and/or based on a comparison being that the air quality index value is greater than the predetermined air quality index value, cause the whole house fan to suspend operation.

According to this disclosure, a multifunction whole house fan system for use in a building structure having an attic and an interior space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents; a motorized window configured to be positioned at the interior space, the motorized window configured to automatically open to permit ambient air to enter the interior space and to automatically close to inhibit ambient air from entering the interior space; a fresh air controller configured to receive data associated with an inside temperature value corresponding to corresponding to temperature in the interior space, the fresh air controller configured to retrieve a previous inside temperature value corresponding to temperature in the interior space from a predetermined previous time period, the fresh air controller configured to control operation of the whole house fan and the motorized window, the fresh air controller configured to: compare the inside temperature value to a first predetermined inside temperature value; based on a comparison being that the inside temperature value is greater than the first predetermined inside temperature value: cause the motorized window to open to permit ambient air to enter the interior space; cause the whole house fan to operate to draw air into the attic from the interior space and to draw ambient air into the interior space through the motorized window as the air is drawn into the attic from the interior space; compare the inside temperature value to the previous inside temperature value; based on a comparison being that the inside temperature value is greater than the previous inside temperature value by a predetermined value: cause the whole house fan to suspend operation; and/or cause the motorized window to close to inhibit ambient air from entering the interior space.

According to this disclosure, the multifunction whole house fan system can further include one or more of the following: wherein the fresh air controller is configured to be in communication with a thermostat controller, the thermostat controller configured to control operation of an air conditioning system of the building structure, and wherein the fresh air controller is configured to: based on the comparison being that the inside temperature value is greater than the first predetermined inside temperature value, send a cease operation command to the thermostat controller for the thermostat controller to suspend operation of the air conditioning system; based on the comparison being that the inside temperature value is greater than the previous inside temperature value by the predetermined value, send a resume or continue operation command to the thermostat controller for the thermostat controller to resume or continue operation of the air conditioning system; wherein the fresh air controller is configured to adjust speed of the whole house fan based on the inside temperature value, the fresh air controller configured to: compare the inside temperature value to a first predetermined temperature, a second predetermined temperature, and a third predetermined temperature, wherein the first predetermined temperature is less than the second predetermined temperature, and the second predetermined temperature is less the third predetermined temperature; based on a comparison being that the inside temperature value is between the first predetermined temperature and the second predetermined temperature, cause the whole house fan to operate at a first speed; based on a comparison being that the inside temperature value is between the second predetermined temperature and the third predetermined temperature, cause the whole house fan to operate at a second speed, the second speed being greater than the first speed; based on a comparison being that the inside temperature value is greater than the third predetermined temperature, cause the whole house fan to operate at a third speed, the third speed being greater than the second speed; wherein the fresh air controller is configured, based on a comparison being that the inside temperature value is less than the first predetermined temperature, to: cause the whole house fan to suspend operation; cause the motorized window to close to inhibit ambient air from entering the interior space; wherein the fresh air controller is configured to receive data associated with an air quality index value corresponding to an air quality index of ambient air around the building structure, the fresh air controller configured to: compare the air quality index value with a predetermined air quality index value; and/or based on a comparison being that the air quality index value is greater than the predetermined air quality index value, cause the whole house fan to suspend operation.

According to this disclosure, a multifunction whole house fan system for use in a building structure having an attic and an interior space can include one or more of the following: a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents; a motorized window configured to be positioned at the interior space, the motorized window configured to automatically open to permit ambient air to enter the interior space and to automatically close to inhibit ambient air from entering the interior space; a fresh air controller configured to control operation of the whole house fan and the motorized window, the fresh air controller configured to: receive an activate input command; based on receiving the activate input command: cause the motorized window to open to permit ambient air to enter the interior space; cause the whole house fan to operate; receive a deactivate input command; based on receiving the deactivate input command: cause the whole house fan to cease operation; and/or cause the motorized window to close to inhibit ambient air from entering the interior space.

According to this disclosure, the multifunction whole house fan system can further include one or more of the following: wherein the activate input command includes a predetermined operate time period, wherein the fresh air controller is configured to cause the whole house fan to cease operation and the motorized window to close after the predetermined operate time period has passed.

According to this disclosure, the fresh air controller and the thermostat controller can be included in a same control unit that is configured to control the multifunction whole house fan system. The fresh air controller can include the thermostat controller.

Methods of using the system(s) (including device(s), apparatus(es), assembly(ies), structure(s), and/or the like) disclosed herein are included; the methods of use can include using or assembling any one or more of the features disclosed herein to achieve functions and/or features of the system(s) as discussed in this disclosure. Methods of manufacturing the system(s) disclosed herein are included; the methods of manufacture can include providing, making, connecting, assembling, and/or installing any one or more of the features of the system(s) disclosed herein to achieve functions and/or features of the system(s) as discussed in this disclosure.

The Summary is provided to introduce a selection of concepts in a simplified form that are further described below in the Detailed Description. This Summary is not intended to identify key features or essential features of any subject matter described herein.

BRIEF DESCRIPTION OF THE DRAWINGS

FIGS. 9A and 9B are a control diagram illustrating an embodiment for operating a multifunction adaptive whole house fan system.

DETAILED DESCRIPTION

Figure 1:
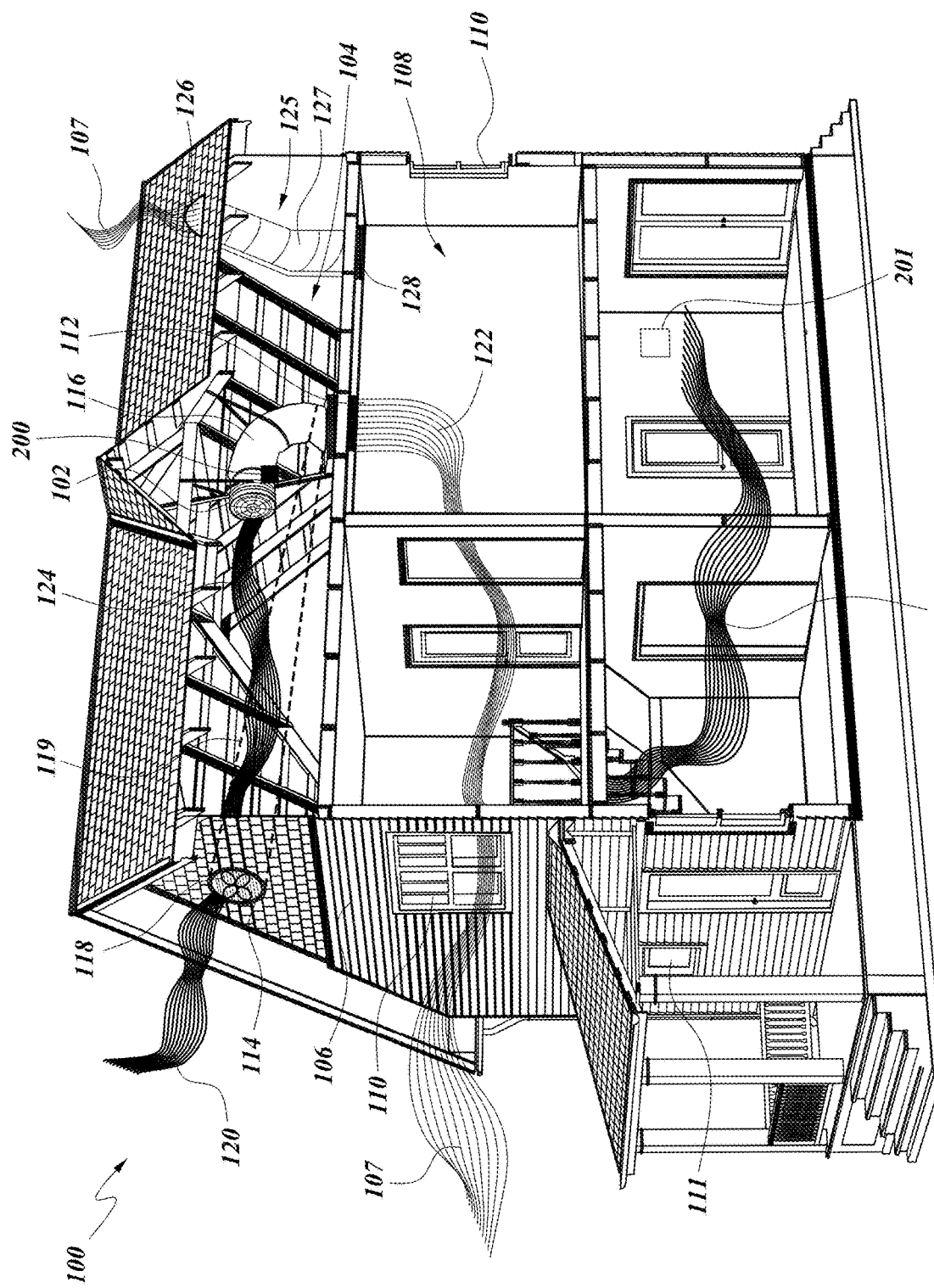
FIG. 1 illustrates a partial sectional view of a building structure showing an embodiment of a multifunction adaptive whole house fan system.

Embodiments of the present disclosure provide for a multifunction adaptive whole house fan system (e.g., fresh air cooling and ventilating fresh air cooling, fresh air ventilating, or fresh air system). The fresh air cooling and ventilating system can include a motorized whole house fan, a vent system, motorized automatic window(s), user device(s), connection(s) to thermostat(s) or other devices that control an air conditioning system, and/or controller(s) that control the fresh air cooling and ventilating system and/or air conditions system. The use of a multifunction adaptive whole house fan system in a building structure presents several advantages over the use of a traditional air conditioning system, including decreased energy usage and greater circulation of fresh ambient air, thereby reducing the amount of dust and contaminated air in the building structure.

In some embodiments, the multifunction adaptive whole house fan system can include motorized automatic window(s) (automatic window(s)), that can be connected to the one or more controllers. The one or more controllers can open and close the motorized automatic windows when the fresh air controller detects desired or predetermined conditions discussed herein. Automated window(s) can help increase utilization and ease of use of the fresh air cooling and ventilating system. For example, in order to run the whole house fan, a user may not need to manually open windows to allow for fresh air to be drawn into the building structure.

The one or more controllers can include a fresh air controller that can be connected to a whole house fan controller (motorized fan controller), which operates the whole house fan. The fresh air controller can also be connected to a thermostat controller of a thermostat. The thermostat controller can control an air conditioning system that can maintain a desired temperature inside the living/interior space of the building structure. In some embodiments, the fresh air controller and all associated controls, algorithms, and/or modes of the fresh air system as discussed herein can be incorporated into the thermostat as a separate controller in the thermostat or as thermostat controller itself. Accordingly, the controls, algorithms, and/or modes that are part of and/or executed by the fresh air controller can be part of and/or executed by the thermostat controller. For example, the controls, algorithms, and/or modes of the fresh air controller discussed herein can be part of the thermostat controller in new home/building installations, and/or an existing thermostat controller can be updated and/or upgraded with the controls, algorithms, and/or modes of the fresh air controller as discussed herein.

Coordination between utilization of the whole house fan system and the air conditioning system can mitigate running the whole house fan system when conditions are better for running an air conditioning system (for example, the outside temperature is hotter than the inside temperature) or running the air conditioning system when conditions are better for running the whole house fan system (for example, the inside temperature is hotter than the outside temperature). The fresh air controller can receive information via a connection to the internet in addition to receiving input from climate condition system(s) including temperature and other kinds of sensors both inside and outside of a building structure. In some embodiments, the fresh air controller can be connected to a ventilation fan, which can be positioned in the attic area of the building structure. The ventilation fan can help draw the exhaust of the whole house fan from the attic.

In some embodiments, the fresh air controller can receive data associated with an outside temperature value corresponding to ambient temperature around the building structure and an inside temperature value corresponding to temperature inside the living space. The fresh air controller can receive temperature data via temperature sensors connected to the fresh air controller. The temperature sensors can be located in and around the building structure, including in the attic space, the living/interior space, and the ambient environment outside the building structure. In some embodiments, one or more temperature sensors maybe part of and/or positioned in a user device. In some embodiments, the fresh air controller can receive temperature data corresponding to an outside temperature value from an online source via a connection to the internet. In some embodiments, the fresh air controller can receive any temperature data discussed herein via a temperature sensor and/or the internet. The temperature sensors can be connected via any wired or wireless connection discussed herein.

In some embodiments, the fresh air controller can receive a humidity value corresponding to the humidity level inside the building structure and/or in the ambient air outside of the building structure. The fresh air controller can receive the humidity value either from a humidity sensor in wired or wireless connection with the fresh air controller or from an online source via a connection to the internet. The humidity sensor(s) can be located in and around the building structure, including in the attic space, the living/interior space, and the ambient environment outside the building structure. In some embodiments, one or more humidity sensors maybe part of and/or positioned in a user device.

In some embodiments, the fresh air controller can receive an air quality value corresponding to the air quality level inside the building structure and/or in the ambient air outside of the building structure, including information about and/or levels of volatile organic compound (VOC) gases, carbon dioxide, carbon monoxide, smoke, particulates, and/or pollen. The fresh air controller can receive the air quality value either from an air quality (AQI) sensor in wired or wireless connection with the fresh air controller or from an online source via a connection to the internet. The AQI sensor(s) can be located in and around the building structure, including in the attic space, the living/interior space, and the ambient environment outside the building structure. In some embodiments, one or more AQI sensors maybe part of and/or positioned in a user device. In some embodiments, one or more AQI sensors may standalone devices that are plugged into the electrical system or plug of a building structure. For example, carbon dioxide, carbon monoxide, and/or smoke detectors may be plugged into a plug of the building structure and connected (e.g., wirelessly) with the fresh air controller.

As used herein, humidity is used in its broad and ordinary sense and includes, for example, a measurement of the concentration of water vapor in the air. A relative humidity or humidity value as used herein falls between 0-100% (percent). High humidity in the interior air of a building structure can cause water damage to the interior of a building structure as well occupant discomfort. For these reasons, it can be advantageous to run the fresh air cooling and ventilating system when there ambient air outside the building structure is below a certain level of humidity.

In some embodiments, the fresh air controller can receive an air quality index data corresponding to the air quality index value in the ambient air outside of the building structure. As used herein, an air quality index is used in its broad and ordinary sense and includes, for example, a value that corresponds to the level of pollution in the air. For example, an air quality index can be utilized to convey the level of risk a person will encounter by breathing the ambient air. Air quality index is usually provided on a scale of 1-1000. Air quality index values in a range of 1-50 are considered excellent with no health implications. Air quality index values of 51-100 are considered good with only slight effects on individuals who are very sensitive to pollutants. Air quality index values between 101-150 are considered lightly polluted, and healthy people may experience slight irritation. Air quality index values between 151-200 are considered moderately polluted, and it is recommended the general population moderately reduce outside activity with those more at risk being advised to avoid outdoor activity. Air quality index values between 201-300 are considered heavily polluted, and the general population is advised to reduce outdoor activity. Air quality index values above 300 are considered severe pollution, and it is recommended that the general population should avoid outdoor activity.

In some embodiments, the fresh air controller can control the operation of the whole house fan and/or the air condition system based on a comparison between the inside and outside temperature values as well as comparing other data values including the outside temperature data, inside temperature data, attic temperature data, humidity data, and/or air quality index data.

The fresh air cooling and ventilating system disclosed herein can have the flexibility to be installed in several different building structure environments to provide an energy and cost savings. For example, the fresh air cooling and ventilating system can be installed in a building structure without an air conditioning system, retrofitted to be installed in a building structure with an existing air conditioning system, or installed as part of a new air conditioning system installation.

Multifunction Adaptive Whole House Fan System Installations

FIG. 1 depicts an illustrative, non-limiting embodiment of a multifunction adaptive whole house fan system (e.g., fresh air cooling and ventilating, fresh air cooling, fresh air ventilating, or fresh air system) 100 of the present disclosure. In some aspects, the fresh air cooling and ventilating system 100 can include a motorized fan or whole house fan (WHF) 102 mounted in an attic space 104 of a building structure 106. A motorized fan or whole house fan controller 200 can control operation of the motorized WHF 102, as described herein. A user device 201 as discussed herein, which can include or house for example a fresh air controller, can be mounted on an interior wall anywhere in the building structure 106, as shown. The user device 201 can be connected to and at least partially control the whole house fan controller 200 as discussed herein.

The user device 201 can include the fresh air controller 300 (FIGS. 2 and 3) as discussed herein. In some embodiments, the user device 201 can be a thermostat controlling the air conditioning system of the building as discussed herein. In some embodiments, the fresh air controller 300 can be in or be part of the thermostat controller as discussed herein (for example, as a separate controller in a thermostat device or be part of the thermostat controller itself in the thermostat controlling the air conditioning system). In some embodiments, the fresh air controller 300 can comprise the thermostat controller. In some embodiments, the thermostat controller can comprise the fresh air controller 300. In some embodiments, a control unit or device that controls the fresh air system 100 and/or building air condition system, such as the user device 201 or a thermostat control unit for controlling the building air condition system, can include the thermostat controller and/or the fresh air controller 300, with the thermostat controller and the fresh air controller 300 being separate controllers or being provided as a single, same controller in the control unit or device.

FIG. 1 depicts the fresh air cooling and ventilating system 100 operating to draw air into the building structure 106. The direction of air flow through the building is shown as flow lines 122 in FIG. 1. As shown in FIG. 1, the fresh air cooling and ventilating system 100 can include one or more WHFs 102 that are high-capacity fans that can rapidly draw a large volume of air out of the interior or living space 108. Outside air can be drawn into the interior space 108 through open windows 110 and/or damper 111 of the building structure 106 to replace the air that is drawn from the interior space 108 by the WHF 102.

As shown in FIG. 1, the building structure 106 can be a two-story building structure depicted with one or more WHFs 102, one or more windows 110, one or more dampers or air intakes 111, and/or one or more user devices 201. However, the type of building structure is not limiting, and the disclosed system can be used in, for example, a one, two, three, four, or any story residential home, apartment complexes, office buildings, and warehouses. The building structure 106 can be a residential or commercial building. The building structure 106 can be any other type of structure with an interior space, including storage or shelter structures. Further, different locations and numbers of components can be used with the automated fresh air cooling and ventilating system 100.

The WHF 102 as depicted in FIG. 1 can be mounted in the attic space 104 and connected to an air intake 112 in the ceiling or wall separating the attic space 104 from the interior space 108 to create a negative static pressure in the interior space 108. The air inlet 112 can be a diffuser, a register, or any other similar device. When the air intake 112 is in an open position, the negative static pressure can draw outside air 107 into the building structure 106 as the exhaust 124 from the WHF 102 is expelled into attic of the building structure. Operating the WHF 102 can create a positive static air pressure in the attic space 104, which can expel air 120 out of the building structure 106 to the outside through vents 114 located in the attic space 104. In some embodiments, the vents 114 to the outside can be actuated to open and close to provide thermal insulation of the attic space 104 from the outside elements. In some embodiments, the vents 114 to the outside can inhibit or mitigate outside air from entering the building structure 106. In some embodiments, the positive static air pressure generate by the WHF 102 and expelled through the vents 114 inhibits outside air from being drawn into the attic space 104.

In some embodiments, the WHF 102 can be mounted in the attic so that it is mechanically isolated from the building structure to dampen vibrations from the fan motor to reduce undesirable noise and vibrations from penetrating the interior space 108 of the building structure 106. In some embodiments, the WHF 102 can be mounted in the attic space 104 such that it is recessed from the attic ceiling to provide mechanical isolation. In some embodiments, the WHF 102 can include shocks, springs, insulation, and/or dashpot dampers to dampen mechanical vibrations from entering the interior space. In some embodiments, the WHF 102 can be mounted between floors of the building structure 106. The location of the WHF 102 is not limiting.

In some embodiments, the WHF 102 can include fan blades actuated by a low RPM motor to move and expel the internal air out of the building structure 106. The air inlet 112 and the WHF 102 can be connected by a flexible, sound insulating duct 116.

In some embodiments, an insulating R value of the duct 116 can be between 4-6, and more preferably about 5 so as to reduce latent heat loss through the duct 116. The sound level of the WHF 102 in the interior space 108 can be between about 42-55 decibels (dBA) and more preferably about 43, 45, 47, or 52 dBA.

The WHF 102 can include a motor, such as a low revolutions per minute (RPM) motor that spins fan blades to move air as discussed herein. In some embodiments, the WHF 102 can include a 1 horse power (HP) motor that can be efficient, with for example a maximum draw of 1300 Watts. The whole house fan controller 200 can communicate with multiple types of motors. For example, a whole house fan controller 200 can communicate with both a permanent split capacitor (PSC) motor and an electronically commutated motor (ECM).

In some embodiments, the low RPM motor of the WHF 102 can spin at between about 800-2000 revolutions per minute (RPM) and more preferably between about 1500-1600 RPM and about 1550 RPM. In some embodiments, the motor can spin between about 1000-1300 RPM and preferably about 1050 RPM. The air flow capacity of the WHF 102 can be between about 500-8000 cubic feet per minute (CFM). In some embodiments, the air flow capacity of the WHF 102 can be about 500-1000 CFM. In some embodiments, the air flow capacity of the WHF 102 can be about 1000-2500 CFM. In some embodiments, the air flow capacity of the WHF 102 can be about 1000-8000 CFM. In some embodiments, the air flow capacity of the WHF 102 can be about 1000-7000 CFM. In some embodiments, the air flow capacity of the WHF 102 can be about 1000-6000 CFM. In some embodiments, the air flow capacity of the WHF 102 can be about 1000-5000 CFM. In some embodiments, the air flow capacity of the WHF 102 can be about 2000-7000 CFM. In some embodiments, the air flow capacity of the WHF 102 can be about 2000-6000 CFM. In some embodiments, the air flow capacity of the WHF 102 can be about 1527 CFM. In some embodiments, the air flow capacity of the WHF 102 can be about 552 CFM. In some embodiments, the air flow capacity of the WHF 102 can be about 1104 CFM. In some embodiments, the air flow capacity of the WHF 102 can be about 2457 CFM. In some embodiments, the air flow capacity of the WHF 102 can be about 2465 CFM. In some embodiments, the air flow capacity of the WHF 102 can be about 3190 CFM. In some embodiments, the air flow capacity of the WHF 102 can be about 4712 CFM.

The WHF 102 can include a fan blade housing that encloses or houses the motor and the fan blades. In some embodiments, the diameter of the fan blade housing can be between about 13 to 26 inches and the diameter of the duct can be between about 13 to about 26 inches. In some embodiments, the distance between the air intake 112 and the WHF 102 can be at least about 4 feet, at least about 5 feet, or at least about 6 feet. In some embodiments, the diameter of the fan blade housing can be larger than the diameter of the duct 116 so as to create a negative venturi effect on the airflow in order to reduce wind or airflow noise.

In some embodiments, the windows 110 shown in FIG. 1 can be motorized automatic windows that can be automatically opened and closed as discussed herein. The windows 110 can be positioned in the exterior wall of the building structure 106 separating the interior space 108 from the ambient environment of the building structure 106. When open, the window 110 can permit the flow of ambient air 107 into the building structure 106 and when closed, can inhibit the flow of ambient air 107 into the building structure 106. Motorized automatic windows can be in connection with a fresh air controller 300 (see for example FIGS. 3 and 4) as discussed herein. The fresh air controller 300 can control the operation of the motorized automatic windows. In some embodiments, the fresh air controller 300 can send a command signal to close one or more or all of the automatic windows in any of the operating modes or control logic flows discussed herein, including when sending a command signal to turn off the WHF 102 as discussed herein.

The motorized automatic windows can open fully, close fully, or be positioned somewhere in between, for example, via a command signal from the fresh air controller 300. For example, in some embodiments, the motorized automatic window can open halfway between fully closed and fully open, a quarter way between fully open and fully closed, or three quarters of the way between fully closed and fully open. In some embodiments, the motorized automatic window can open vertically. In some embodiments, the motorized automatic window can open horizontally or by tilting away from its closed position in either the horizontal or the vertical direction or in any other suitable opening and closing motion.

The fresh air cooling and ventilating system 100 shown in FIG. 1 depicts four windows 110. In some embodiments, the fresh air cooling and ventilating system 100 can have 1, 2, 4, 6, 12, 15, or more windows 110. Any number of the windows 110 can be motorized automatic windows. For example, the fresh air cooling and ventilating system 100 can have 1, 2, 3, 4, 5, or more motorized automatic windows.

In some embodiments, the fresh air cooling and ventilating system 100 may use motorized automatic windows in combination with other types of devices such as dampers 111 installed on exterior walls of the building structure 106 that provide fluid communication between interior space 108 and the ambient environment. In some embodiments, the fresh air cooling and ventilating system 100 may use other types of devices such as dampers 111 installed on exterior walls of the building structure 106 that provide fluid communication between interior space 108 and the ambient environment.

In some embodiments, the dampers 111 can use or can have an air filter. In some embodiments, the dampers 111 do not use or do not have an air filter. In some embodiments, the dampers 111 do not have or do not include a motorized fan that draws air into the damper 111 from the environment to be directed into the interior space 108.

In some embodiments, the dampers 111 shown in FIG. 1 can be motorized automatic dampers that can be automatically opened and closed as discussed herein. The dampers 111 can be positioned in the exterior wall of the building structure 106 separating the interior space 108 from the ambient environment of the building structure 106. When open, the damper 111 can permit the flow of ambient air into the building structure 106 and when closed, can inhibit the flow of ambient air into the building structure 106. Motorized automatic dampers can be in connection with a fresh air controller 300. The fresh air controller 300 can control the operation of the motorized automatic dampers. In some embodiments, the fresh air controller 300 can send a command signal to close one or more or all of the automatic dampers in any of the operating modes or control logic flows discussed herein, including when sending a command signal to turn off the WHF 102 as discussed herein.

The motorized automatic dampers can open fully, close fully, or be positioned somewhere in between, for example, via a command signal from the fresh air controller 300. For example, in some embodiments, the motorized automatic dampers can open half way between fully closed and fully open, a quarter way between fully open and fully closed, or three quarters of the way between fully closed and fully open.

The fresh air cooling and ventilating system 100 shown in FIG. 1 depicts four dampers 111. In some embodiments, the fresh air cooling and ventilating system 100 can have 1, 2, 3, 4, 6, 12, 15, or more dampers 111. Any number of the dampers 111 can be motorized automatic dampers. For example, the fresh air cooling and ventilating system 100 can have 1, 2, 3, 4, 5, or more motorized automatic dampers. In some embodiments, one or more of the dampers 111 may be non-motorized and have one or more movable flaps or leafs that open under creation of negative pressure within the interior space 108 as discussed herein (for example, the WHF being activated) and that close with gravity, spring mechanisms, or other suitable mechanisms upon the WHF being stopped.

In some embodiments, the fresh air cooling and ventilating system 100 may use motorized automatic windows in combination with other types of devices such as skylights 125 installed on the roof of the building structure 106 that provide fluid communication between interior space 108 and the ambient environment. In some embodiments, the fresh air cooling and ventilating system 100 may use other types of devices such as skylights 125 installed on the roof of the building structure 106 that provide fluid communication between interior space 108 and the ambient environment.

In some embodiments, skylights can be motorized automatic skylights that can be automatically opened and closed as discussed herein. In some embodiments, the motorized automatic skylights can function similar to automated windows as discussed herein.

In some embodiments, the skylights can be positioned in the roof of the building structure 106 such as in location depicted by vents 114. The vents 114 depicted in FIG. 1 may represent skylights. The skylights may be positioned such that the skylights separate the interior space 108 from the ambient environment.

In some embodiments, the skylight may be a natural tubular skylight 125 that has an air inlet 126 (e.g., a vent) to the ambient environment. When the WHF operates as discussed herein, the skylight, and in particular the air inlet 126 of the skylight, may function as an open window and/or damper as discussed herein to allow ambient air 107 into the interior space 108. When open, the vent of the skylight can permit the flow of ambient air 107 into the building structure 106 and when closed, can inhibit the flow of ambient air 107 into the building structure 106. The air inlet 126 may be motorized to open and close and function similarly to an automated window as discussed herein. When the air inlet 126 is in an open position, the negative static pressure can draw outside air 107 into the building structure 106 as the exhaust 124 from the WHF 102 is expelled into attic of the building structure with air being drawn and directed through the air inlet 126, the duct 127, and air outlet 128. Operating the WHF 102 can create a positive static air pressure in the attic space 104, which can expel air 120 out of the building structure 106 to the outside through vents 114 located in the attic space 104.

The skylight 125 may be mounted in the attic 104 and connected to an air outlet 128 in the ceiling or wall separating the attic space 104 from the interior space 108 to create a negative static pressure in the interior space 108. The air outlet 128 can be an opening that allows ambient light into the interior space 108. In some embodiments, the air outlet 128 can be a diffuser, a register, or any other similar device. The skylight 125 can have a duct 127 connecting the air inlet 126 to the air outlet 128. The duct may be a tubular structure or reflecting tube that reflects and/or directs ambient light into the interior space 108.

In some embodiments, the duct 119 depicted in FIG. 1 may represent the tubular ducting of the skylight. The duct of the skylight may ricochet natural light into the interior space 108. The duct of the skylight may function as the duct 119 as discussed herein to provide fluid air communication between the exterior of the building structure 106 and the interior space 108 through the attic space 104.

In some embodiments, the skylights 126 may be a window-type skylight installed in the roof of the building structure 106. When open, the skylight can permit the flow of ambient air into the building structure 106 and when closed, can inhibit the flow of ambient air into the building structure 106. The window-type of skylight may have a side that is pushed up/down or open to permit in ambient air into the interior space 108. The window-type of skylight may rotate on a hinge point to permit ambient air into the interior space 108. The window-type skylight may be motorized to open and close and function similarly to an automated window as discussed herein.

In some embodiments, the air inlet 126 in FIG. 1 can be or be at least partially replaced by the side of the window-type skylight that is pushed up/down or open to permit ambient air into the interior space 108. The duct 127 of the window-type skylight can be formed from surfaces or walls similar to that of the interior space 108 to create a flow path for ambient air between the air inlet 126 and air outlet 128, as well as permit ambient light into the interior space 108.

Motorized automatic skylights and/or air inlets 126 can be in connection with a fresh air controller 300. The fresh air controller 300 can control the operation of the motorized automatic skylights and/or air inlets 126. In some embodiments, the fresh air controller 300 can send a command signal to close one or more or all of the automatic skylights and/or air inlets 126 in any of the operating modes or control logic flows discussed herein, including when sending a command signal to turn off the WHF 102 as discussed herein.

The motorized automatic skylights and/or air inlets 126 can open fully, close fully, or be positioned somewhere in between, for example, via a command signal from the fresh air controller 300. For example, in some embodiments, the motorized automatic skylights can open half way between fully closed and fully open, a quarter way between fully open and fully closed, or three quarters of the way between fully closed and fully open.

In some embodiments, the fresh air cooling and ventilating system 100 can have 1, 2, 3, 4, 6, 12, 15, or more skylights. Any number of the can be motorized automatic skylights. For example, the fresh air cooling and ventilating system 100 can have 1, 2, 3, 4, 5, or more motorized automatic skylights. In some embodiments, one or more of the skylights may be non-motorized and be opened by the user manually.

In some embodiments, the fresh air cooling and ventilating system 100 can include one or more ventilation fans 118 as shown in FIG. 1. The ventilation fan 118 can be positioned in the attic space 104 of the building structure 106. The ventilation fan 118 can be positioned near or proximate to a corresponding vent 114 providing fluid communication between the attic space 104 and the ambient environment around the building structure 106. The ventilation fan 118 can be in communication with the fresh air controller 300 as discussed herein. In some embodiments, the ventilation fan 118 can draw air 120 from the attic space 104 through the vent 114 to facilitate the function of the WHF 102 as discussed herein. In some embodiments, the fresh air controller 300 can cause the ventilation fan 118 to operate with the WHF 102 being operated as discussed herein. In some embodiments, the fresh air controller 300 can operate the ventilation fan 118 independent of the WHF 102.

The ventilation fan 118 can be in communication with a ventilation fan or attic fan controller 224 (see for example FIGS. 3 and 4) which can control the operation of the ventilation fan 118 through a wired or wireless connection. In some embodiments, the ventilation fan controller 224 can be in communication with the fresh air controller 300 and receive a command/operation signal from the fresh air controller 300. The ventilation fan controller 224 can be connected to the fresh air controller 300 via a wireless and/or wired connection utilizing, for example, a Bluetooth connection, Wi-Fi connection, and/or any other connection suitable connection such as Ethernet cables. The fresh air controller 300 can send a command/operation signal causing the ventilation fan controller 224 to operate the ventilation fan 118 or to send a command/operation signal causing the ventilation fan controller 224 to cease operation of the ventilation fan 118. As discussed herein for the WHF 102 and the ventilation fan 118 can be operated at different speeds. The fresh air controller 300 can determine and select a desired speed for the ventilation fan 118 based on, for example, the speed of the WHF 102.

In some embodiments, the WHF 102 as discussed herein can be installed in place of the ventilation fan 118. The air inlet 112 and the WHF 118 installed in a vent 114 can be connected by a flexible, sound insulating duct 119. The duct 119 is illustrated in dashed lines in FIG. 1. In some embodiments, the WHF 118 can be used with or in an unvented or sealed attic (sometimes referred to as high-performance or conditioned attics). In an unvented attic, air-impermeable insulation is applied directly to the underside of the structural roof deck and is tied into the insulation located in the walls so that the roof system becomes part of the insulated building enclosure. In some embodiments, the WHF 118 can be used in an attic space 104 that is sealed with or without the duct 119.

The fresh air cooling and ventilating system 100 can be installed in several different heating, ventilation, HVAC (heating, ventilation, and air conditioning) and/or air conditioning building environments/systems to provide an energy savings and cost savings. Air conditioning system or air conditioning as used herein may include one or more systems of a building structure used for heating, cooling, ventilating, and/or any other type of conditioning/thermal management and/or movement of air within and/or through the building structure. In some embodiments, the fresh air cooling and ventilating system 100 can be installed in a building structure 106 without an existing air conditioning system. In such an installation, the fresh air controller 300 can make control decisions on whether to activate the fresh air cooling and ventilating system 100 based on the external and internal building temperature and/or humidity conditions. If the user device 201 has received an input or is set for cooling, the fresh air controller 300 can determine whether the outside air temperature is cooler than the inside and turns on the WHF (including opening windows or dampers if included). If the outside temperature is warmer than the internal temperature, the fresh air controller 300 does not activate the system 100 but can continue to monitor the temperature and/or humidity parameters periodically until the outside temperature is cool enough to cool effectively.

In some embodiments, the fresh air cooling and ventilating system 100 can be installed in a home with an existing air conditioning system. In a home with existing air conditioning, the fresh air controller 300 can control the air conditioner as well as the fresh air cooling and ventilating system 100. In such an installation, the fresh air controller 300 can use signals received from the internal and external temperature, humidity, and/or AQI sensors 230 and/or information or signals received from the climate condition system(s) to make control decisions about whether to activate either the fresh air cooling and ventilating system 100 or the existing air conditioning. If the user device 201 has received an input or is set for cooling, the fresh air controller 300 first can consider whether the fresh air cooling and ventilating system has the capacity to efficiently cool the building structure 106. As discussed herein, the fresh air controller 300 can send a signal to activate the fresh air cooling and ventilating system 100 over the existing air conditioning whenever the ambient temperature and humidity conditions allow in order to realize a cost and energy savings over running the air conditioner. The fresh air controller 300 can be set to default to use the fresh air cooling and ventilating system 100 whenever possible instead of the air conditioning system to provide a cost savings. If the fresh air controller 300 determines that the fresh air cooling and ventilating system 100 can effectively cool the building structure, the fresh air controller 300 can send a signal to activate the fresh air cooling and ventilating system 100 until the desired temperature is reached. If, while the WHF 102 is running, the fresh air controller 300 determines that the WHF 102 is providing inadequate cooling and cannot cool the building structure 106 to the desired temperature, it can send a command/operation signal to the whole house fan controller 200 to turn off the WHF 102 and can turn on the air conditioner. The fresh air controller 300 then can continue to monitor the situation and can send a command/operation signal to the thermostat to turn off the air conditioner and send a command/operation signal to the whole house fan controller 200 to turn back on the WHFs 102 when conditions are optimal for the fresh air cooling and ventilating system 100.

In some embodiments, the fresh air cooling and ventilating system can be installed in a building as part of a new air conditioning installation. In such an installation, the user device 201 functions substantially the same as in installations retrofitted to function with existing air conditioning systems. The user device 201 may also fully control the operation of the air conditioning system, in particular when the system 100 installed as part of a new air conditioning installation.

Figure 2A:
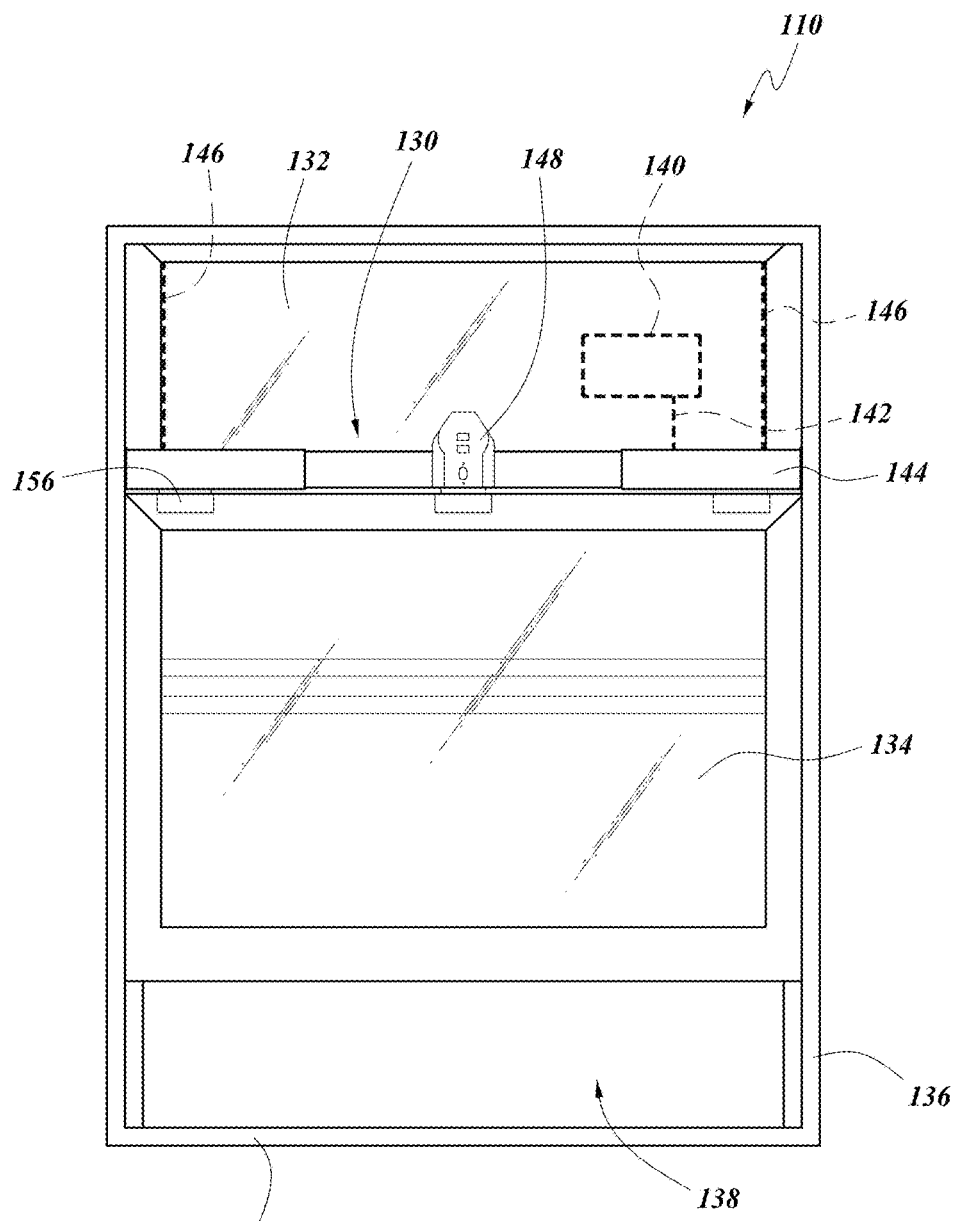
FIGS. 2A and 2B is an illustration of an embodiment showing a motorized window.
Figure 2B:
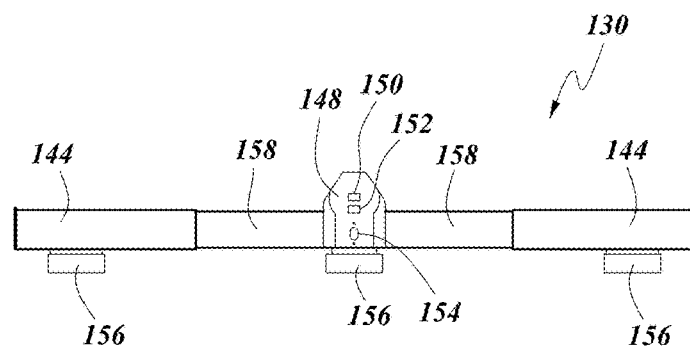

FIG. 2A illustrates an embodiment of a motorized or automated window 110. The motorized window 110 can have, be connected to, engage with, mate with, and/or cooperate with a motorized window opener 130. FIG. 2B illustrates an embodiment of the motorized window opener 130. The window opener 130 can be automated to perform the functions of an automatic or automated window 110 as discussed herein. The window opener 130 can be modular and adjustable to be fitted and installed on a non-motorized window to have the functions of an automated or automatic window as discussed herein. In some embodiments, the window opener 130 can be integrated with the window to form or have an automated window 110.

As illustrated in FIG. 2A, the automated window 110 can have a fixed panel 132 and a moveable or sliding panel 134 situated in a frame 136. The moveable panel 134 can move (e.g., move vertically up) relative to the fixed panel 132 and frame 136 to create an opening 138 to allow fresh air into the building structure 106 as discussed herein. The moveable panel 134 can move (e.g., move vertically down) to close the opening 138 and prevent or inhibit fresh air movement into the building structure 106 as discussed herein.

As illustrated in FIG. 2A, the window opener 130 can be connected to one or more solar photovoltaic panels 140. The solar panels 140 can be connected to the opener 130 via one or more wires or cables 142 to direct electrical power generated by the solar panels 140 to the window opener 130. As illustrated, the solar panels 140 can be situated on the window. Any suitable solar panels may be used including solar panels that extend along the frame 136 and/or the window opener 130.

The solar panel 140 can provide power that is stored in a battery in the window opener 130 that is used to power the window opener 130. In some embodiments, the window opener 130 does not have a battery and is powered directly by the solar panel 140. In some embodiments, the solar panel 140 can be connected to a window housing 148 via, for example, wires 142 or a connection interface (e.g., male and female mechanical interface with electrical connections or tabs) between the window housing 148 and the solar panel 140 providing direct electrical communication between the window housing 148 and the solar panel 140. In some embodiments, the window opener 130 can be powered by an external power source, including a power source associated with the building structure using, for example, 120V or 240V AC power of the building structure 106. In some embodiments, the window opener 130 can be powered by an external power source having a low voltage, such as 12V.

The window opener 130 can have one or more motor assemblies 144 that engage with, mate with, and/or connect to one or more tracks 146 positioned on the frame 136. The motor assemblies 144 can have one or more gears with teeth or other suitable structures that engage, mate, and/or interact with one or more teeth or other suitable structures of the tracks 146. The motor assemblies 144 can be powered by the solar panel 140 and/or battery as discussed herein. The motor assemblies 144 can rotate or move the gears that cause the window opener 130 to travel or move vertically along the tracks 146 to cause the moveable panel 134 to move vertically relative to the frame 136.

The motor assemblies 144 can be controlled by a window controller housed, for example, in a window housing 148. The window housing 148 can also house other electronic components such as a battery. The window housing 148 can have one or more user interfaces for controlling the window opener 130. For example, the window opener 130 can have one or more movement control buttons 150, 152 (or any other suitable interface mechanism) for moving the window opener 130 and moveable panel 134 as discussed herein. An up button 150 can be pressed by a user for the window opener 130 to move the moveable panel 134 up relative to the frame 136. A down button 152 can be pressed by a user for the window opener 130 to move the moveable panel 134 down relative to the frame 136.

The window opener 130 can have a lock control 154 (e.g., a button, a sliding protrusion, or any other suitable interface locking or lock mechanism), for example, on the window housing 148. The lock button 154 can be activated by a user to prevent the window from being opened to lock, close, engage, and/or secure the window in a desired or certain position and inhibit the automated window from being forced open. For example, if the automated window 110 is closed, the lock button 154 can be activated by the user for the window controller to lock the motor assemblies 144 to prevent the motors from rotating such that the moveable panel 130 is prevented from moving. For example, the one or more gears can resist movement against one or more teeth of the track 146 and thereby prevent movement of the moveable panel 134. In some embodiments, the lock button 154 can activate a physical lock that extends from the moveable panel 134 into a portion of the fixed panel 132 and/or the frame 136 to prevent movement of the moveable panel 134. In some embodiments, the system 100 can automatically activate the lock control 154 to inhibit the automated window from being opened. In some embodiments, the controller of the window opener 130 can automatically disengage the lock mechanism upon activation of the window opener by the system 100 as discussed herein or by activating any of the movement control buttons 150, 152.

In some embodiments, the window opener 130 can have or activate an alarm system when the moveable panel 134 is forced open (e.g., forced open by a person by not using the movement control buttons 150, 152 and/or commanded by the system 100 as discussed herein). The window opener 130 can be armed when the lock control 154 is activated by the user to prevent movement of the moveable panel 134. The window opener 130 can be armed by the system 100 and/or associated alarm system as discussed herein.

In some embodiments, the controller of the window opener 130 can be in communication (wirelessly or wired) with the alarm system of the building structure discussed herein. The alarm system can be triggered as discussed herein when the moveable panel 134 is forced open. The window opener can be activated or be armed at certain times of the day (e.g., during the night such as from 2100 to 0700). In some embodiments, the window opener 130 can have any suitable noisemaker such as a buzzer or a speaker. The noisemaker can be housed in the window housing 148.

In some embodiments, the controller of the window opener 130 can sense current to and/or voltage of the motor assemblies 144 as the moveable panel 134 moves along the tracks 146. The controller of the window opener 130 can learn, map, and/or store in memory specific values and variations in current to and/or voltage of the motor assemblies 144 as the motor assemblies 144 move along the tracks 144. The controller of the window opener 130 can compare the actual values of current to and/or voltage of the motor assemblies 144 along the tracks 146 to the stored current to and/or voltage of the motor assemblies 144 along the tracks 146. Upon detecting a variation, deviation, and/or change of the actual to the stored values of current to and/or voltage of the motor assemblies 144, for example, above a certain threshold, the controller of the window opener 130 can determine that either there is an obtrusion (e.g., a person's hand) or that someone is forcing the moveable panel 134 to trigger an alarm as discussed herein. In some embodiments, the controller of the window opener 130 can stop the movement of the moveable panel 134 to, for example, mitigate injury to a person (when the obtrusion is a body part of a person) as well as prevent damage to the motor assemblies 144 and/or any other components of the automated window 110.

As illustrated in FIGS. 2A and 2B, the window opener 130 can have one or more grippers or clips 148 that engage with, mate with, and/or connect to the moveable panel 134 to move the moveable panel 134 as the window opener 130 travels or moves along the tracks 146 as discussed herein. Using the clips 148, the window opener 130 can be installed on a non-motorized window to automate the window as discussed herein.

As illustrated in FIGS. 2A and 2B, the one or more motor assemblies 144 can be positioned on a rail or post 150. The motor assemblies 144 can be moved along the rail 150 to adjust an extent or length of the window opener 130 to adjust for and accommodate different window widths when the window opener 130 is being installed (retrofitted) on a non-motorized window. While a vertically moveable panel 134 is illustrated in FIG. 2A, the window opener 130 can be similarly installed on moveable panels that move horizontally such that the window opener 130 extent is adjusted vertically and moves horizontally to move the moveable panel.

Multifunction Adaptive Whole House Fan System Components

FIG. 2 is a schematic illustration of an embodiment showing different components of a fresh air cooling and ventilating system 100. FIG. 2 depicts an embodiment of, for example, the communication pathways between different components of the fresh air cooling and ventilating system 100. In some embodiments, the fresh air controller 300 can be integrated into and be a part of a user device or a user input device 201 such as an LCD Wall Control (see for example FIGS. 5 and 6) as discussed herein.

In some embodiments, the fresh air controller 300 can be in two-way communication with a whole house fan controller 200. The connection between the fresh air controller 300 and the whole house fan controller 200 can be a wired or a wireless connection. In some embodiments, the fresh air controller 300 can be connected to the whole house fan controller 200 by an Ethernet cable connection or any other suitable wired connection. In some embodiments, the fresh air controller 300 can be connected to the whole house fan controller 200 by a Bluetooth connection, a Wi-Fi connection, and/or any other suitable wireless connection to send and receive communication signals.

The whole house fan controller 200 can receive a signal from the fresh air controller 300 as well as send a signal to the fresh air controller 300. The fresh air controller 300 can send an operate command signal or cease operation command signal to the whole house fan controller 200. The whole house fan controller 200 can send a signal to the fresh air controller 300 indicating whether one or more WHFs 102 are operating as well the parameters of operation of the WHF(s) 102 such as speed (RPM), duration of present operation, and history of operation.

The whole house fan controller 200 can be in wired connection or integrated with a WHF 102 in order to cause and control the operation of the WHF 102 via, for example, one or more control signals. In some embodiments, the whole house fan controller 200 can be in two-way communication with one or more WHFs 102. The whole house fan controller 200 can be in wireless communication with the one or more WHFs 102. In some embodiments, the whole house fan controller 200 can be a master controller for one or more WHFs 102 to cause and control the operation of one or more WHFs 102. The whole house fan controller 200 can be in wired connection or integrated with one of the WHFs 102. The whole house fan controller 200 can be in wired connection or integrated with one of the WHFs 102, while being in wireless communication with one or more of the other WHFs 102.

As discussed above, the connection between the whole house fan controller 200 and the one or more WHFs 102 can be a wired or a wireless connection. In some embodiments, the whole house fan controller 200 can be connected to and/or integrated with a WHF 102 by a wire or cable connection or any other suitable electronic connection to cause operation of the WHF 102. In some embodiments, the whole house fan controller 200 can be connected to one or more WHFs 102 by a Bluetooth connection, a Wi-Fi connection, and/or any other suitable wireless connection to send and receive communication signals.

In some embodiments, the fresh air controller 300 can be in two-way communication with a ventilation fan controller 224. The connection between the fresh air controller 300 and the ventilation fan controller 224 can be a wired or a wireless connection. In some embodiments, the fresh air controller 300 can be connected to the ventilation fan controller 224 by an Ethernet cable connection or any other suitable wired connection. In some embodiments, the fresh air controller 300 can be connected to the ventilation fan controller 224 by a Bluetooth connection, a Wi-Fi connection, and/or any other suitable wireless connection to send and receive communication signals.

The ventilation fan controller 224 can receive a signal from the fresh air controller 300 as well as send a signal to the fresh air controller 300. The fresh air controller 300 can send an operate command or cease operation command to the ventilation fan controller 224. The ventilation fan controller 224 can send a signal to the fresh air controller 300 indicating whether one or more ventilation fans 118 are operating as well the parameters of operation of the ventilation fan(s) 118 such as speed (RPM), duration of present operation, and history of operation.

The ventilation fan controller 224 can be in wired connection or integrated with a ventilation fan 118 in order to cause and control the operation of the ventilation fan 118 via for example one or more command signals. In some embodiments, the ventilation fan controller 224 can be in two-way communication with one or more ventilation fans 118. The ventilation fan controller 224 can be in wireless communication with the one or more ventilation fans 118. In some embodiments, the ventilation fan controller 224 can be a master controller for one or more ventilation fans 118 to cause and control the operation of one or more ventilation fans 118. The ventilation fan controller 224 can be in wired connection or integrated with one of the ventilation fans 118. The ventilation fan controller 224 can be in wired connection or integrated with one of the ventilation fans 118, while being in wireless communication with one or more of the other ventilation fans 118.

As discussed above, the connection between the ventilation fan controller 224 and the one or more ventilation fans 118 can be a wired or a wireless connection. In some embodiments, the ventilation fan controller 224 can be connected to and/or integrated with a ventilation fan 118 by a wire or cable connection or any other suitable electronic connection to cause operation of the ventilation fan 118. In some embodiments, the ventilation fan controller 224 can be connected to one or more ventilation fans 118 by a Bluetooth connection, a Wi-Fi connection, and/or any other suitable wireless connection to cause operation of the ventilation fan 118.

In some embodiments, the fresh air controller 300 can be in two way communication with motorized automatic windows 228A-C, including one or more controllers associated with the one or more automatic windows 228A-C. In some embodiments, the connection between the fresh air controller 300 and the automatic windows 228A-C can be a Bluetooth connection, Wi-Fi, and/or a wired connection to send and receive communication signals. The fresh air controller 300 can send a command/operation signal causing the automatic windows 228A-C or instructing the automatic windows 228A-C to open, close, open partially, and/or close partially. The automatic windows 228A-C can send a signal back to the fresh air controller 300 indicating whether they are open, close, partially open, or partially closed. The automatic windows 228A-C may each have corresponding controllers that cause operation of the particular automatic windows 228A-C as instructed by a command signal from the fresh air controller 300.

In some embodiments, the system 100 can include a master window controller that is in wired and/or wireless communication with one or more automatic windows 228A-C to control the automatic windows 228A-C as discussed herein. The fresh air controller 300 can send a command/operation signal to the window controller to control the automatic windows 228A-C as discussed herein. The window controller can send a status/operation signal to the fresh air controller 300 indicating a status (open/closed) or operation of one or more automatic windows 228A-C.

In some embodiments, the fresh air controller 300 can include error correction features such that the fresh air controller 300 will not cause the WHF 102 to activate on when the fresh air controller 300 detects that the automatic windows 228A-C are not open (with control protocols provided for the user to override if desired or otherwise determined by the fresh air controller 300 as discussed herein). In some embodiments, the fresh air controller 300 can include error correction features such that the fresh air controller 300 can send a command/operation signal causing the air conditioning system to not be activated when the WHF 102 is activated and/or the automatic windows 228A-C are open. Conversely, in some embodiments, the fresh air cooling and ventilating system 100 will not activate when the fresh air controller 300 detects that the air conditioning system is activated. In some embodiments, the fresh air controller 300 can include error correction features such that the fresh air controller 300 also will not send a command/operation signal causing the WHFs 102 to activate unless the automatic windows 228A-C are open.

Utilizing multiple automatic windows 228A-C, the system can be constructed with multiple zones whereby each automatic window 228A-C can operate over different rooms or regions of the occupied space. In some embodiments, one or more automated or automatic dampers may be used with or without the automatic windows. The one or more dampers may function and be controlled as discussed herein for automatic windows. When multiple air intakes are used in conjunction with one or more user devices 201, climate condition system(s) 217, and/or temperature, humidity, and/or AQI sensors 230, a user can activate different zones at different times to cool the home. Such a system allows for cooling of only the occupied rooms of the building structure 106 therefore providing for more efficient cooling of the space and less energy consumption. Unoccupied rooms can be turned off or ignored by the system 100. Utilizing automatic windows 228A-C in conjunction with the WHF 102 can enable for intelligent air quality and comfort level control. The system can automatically determine when to open and close the automatic windows 228A-C and turn on the WHF 102 when the exterior conditions permit cooling of the internal building structure.

In some embodiments, the fresh air controller 300 can interface with and be in communication with air conditioning system(s) 215 to send and/or receive signals and/or information corresponding to the air conditioning system 215. In some embodiments, the fresh air controller 300 can be in direct wired or wireless communication (e.g., LAN or Bluetooth, respectively) to interface with and be in communication with the air conditioning system, including without being in communication with (e.g., bypassing) the thermostat controller discussed herein, to send and/or receive signals and/or information corresponding to the operation of the air conditioning system as discussed herein. The fresh air controller 300 can receive information regarding an operating state of the air conditioning system 215. The fresh air controller 300 can send a command or control signal to air conditioning system 215 as discussed herein. The fresh air controller 300 can receive information corresponding to temperature, humidity, AQI, and/or any other weather/ambient environment information that the air conditioning system 215 may have. Examples of devices that may have such information controlling the air conditioning system 215 include Nest, Ecobee, and Honeywell.

The fresh air controller 300 can analyze data (for example, climate condition system(s) data, sensor data) to more efficiently operate the system 100 and increase the automation of the system 100. The data utilized by the system 100 either can be generated locally within a single fresh air cooling and ventilating system or can come from a larger set of fresh air cooling and ventilating systems provided to the fresh air controller 300 via an internet connection. In some embodiments, data analysis can occur remotely from the fresh air controller 300. Data can be collected and analyzed through a cloud based online system, formatted for use by a fresh air controller 300, then transmitted to the fresh air controller 300 via the internet. For example, in some embodiments, the fresh air controller 300 could utilize historical usage data to determine patterns of usage and predict when a user may want to use the system 100. In some embodiments, usage and weather data can be combined to determine when a particular user is or set of users are most likely to utilize the fresh air cooling and ventilating system 100.

In some embodiments, the recommended usage in the summer season is to turn on the fresh air cooling and ventilating system 100 when the outside temperature is equal to or below the inside temperature and then keep them on until late in the evening to remove most of the latent heat that can be stored in the structure and mass of the building structure and/or the attic. In some embodiments, the system 100 can be kept on until three hours after sunset. In some embodiments, the system 100 can be kept on three or more hours, including 4, 5, 6, 7, or 8 or more hours, including being kept on all night. This method can prolong the cooling effects of the fresh air cooling and ventilating system 100 into the subsequent day, thus reducing demand of the air conditioner. By following this procedure, a typical building structure in a desert climate zone, such as in the Inland Empire area of Southern California, may only need the air conditioner to be run for two to three hours per day instead of the normal 8 to 10 hours in the heat of the summer typically required by existing air conditioning systems. The fresh air cooling and ventilating system 100 may use a fraction of the energy of the air conditioning system, and therefore results in a significant energy and cost savings compared to traditional air conditioning systems.

In some embodiments, the fresh air controller 300 can be in two-way communication with a smart phone or device application 220. The fresh air controller 300 can be in wireless communication with the smart phone application 220 using Bluetooth, Wi-Fi, and/or any other suitable wireless communication protocol to send and receive communication signals. Such communication protocols may be used when the user with the smart phone or other smart device is in or proximate the building structure having the system 100.

As used herein, a smart phone or device application 220 can be used with any portable electronic device, such as a smart phone or tablet. The smart phone application 220 can allow a user to view information about and input information/commands to the fresh air cooling and ventilating system 100 and operate the system 100. The fresh air controller 300 and/or any other parts of the system 100 can receive control inputs or a command signals from the smart phone application 220. For example, smart phone application 220 can be used to turn on and off the system 100, open and close windows 228A-C, switch the modes of operation of the system 100, turn on or off the WHF 102, turn on or off the ventilation fan 118, and/or any other operation that the fresh air controller 300 can perform as discussed herein. Such integration through smart phone application 220 allows for easier use of the system 100.

As shown in FIG. 2, in some embodiments, the smart phone application 220 can be in two-way communication with the automatic windows 228A-C. The smart phone application 220 can control the operation of the automatic windows 228A-C without the use of the fresh air controller 300. For example, the user may use the smart phone application 220 to open or close the automatic windows 228A-C to provide fresh air to the interior space 108 without the fresh air system 100 operating or running, such as the WHF 102 not operating or running.

As shown in FIG. 2, in some embodiments, the smart phone application 220 can be in two-way communication with the ventilation fan controller 224. The smart phone application 220 can control the operation of the attic ventilation fan 118 through the ventilation fan controller 224 without the use of the fresh air controller 300. For example, the user may use the smart phone application 220 to vent the attic space 104 without the fresh air system 100 operating or running, such as the WHF 102 not operating or running.

In some embodiments, the smart phone application 220 can be used to set the speed of the WHF 102 based on the temperature within the interior space 108. For example, the smart phone application 220 can be used to set a WHF to operate at low speed when the temperature in the interior space 108 is 70° F. to 75° F. or 65° F. to 75° F., to operate at high speed when the temperature in the interior space 108 is above 75° F., and to turn off when the temperature in the interior space 108 is below 65° F. The system 100 can be programmed that if the inside temperature warms from 65° F. to 66° F., the WHF 102 will turn on at low speed. Each WHF 102 controlled by the smart phone application 220 and/or user device 201 can have controls for fan speed, timer mode, display mode, and temperature set points. The smart phone application 220 and/or user device 201 can have a speed control that allows the selection of a speed on a multi-speed (e.g., 2-speed or 3-speed) WHF 102. The smart phone application 220 and/or user device 201 can allow a user to select the duration (e.g., 12 hours) of the timer. The smart phone application 220 and/or user device 201 can allow a user to select to operate the WHF 102 in continuous on mode. The smart phone application 220 and/or user device 201 can allow a user to select modes of operation as discussed herein, for example with reference to FIGS. 8-13.

The smart phone application 220 and/or user device 201 can perform a factory reset on the fresh air controller 300 and/or other components of the system 100 discussed herein. The smart phone application 220 and/or user device 201 can initiate or coordinate the pairing process for pairing devices. For example, the one or more automatic windows 228A-C may be initially paired with the system 100 via the smart phone application 220 and/or user device 201. The smart phone application 220 and/or user device 201 can allow a user to configure the system to automatically open select automatic windows when the WHF 102 is turned on. The smart phone application 220 and/or user device 201 can allow a user to select how far to open particular windows. The smart phone application 220 and/or user device 201 can allow a user to select the ventilation fan 118 to turn on and at what speed when the WHF 102 is turned on.

In some embodiments, the fresh air controller 300 can send a push notification or prompt to the smart phone application 220 alerting the user with various information about the system 100. In some embodiments, the prompt may be associated and depend on information from the internet, climate condition system(s) 217, and/or sensors 320. For example, the smart phone application 220 may receive information from the internet, climate condition system(s) 217, and/or sensors 230 as discussed herein without the fresh air controller 300 providing such information. The prompt may include a push notification on the smart phone application 220 based on the information from the internet, climate condition system(s) 217, and/or sensors 230. In some embodiments, the user device 201 can utilize prompts as discussed herein to provide push notification or prompts to the user as discussed herein.

A prompt can be an alert that a smart phone application 220 displays to the user via a smart phone or device. For example, the fresh air controller 300 can send a prompt to the user indicating it is an ideal time to run the system or WHF, the system or WHF is running, the system or WHF is turning on, or the system or WHF is turning off, or any other information about the system as discussed herein. Prompts can prompt the user for input. For example, in some embodiments, the fresh air controller 300 can prompt a user with a question such as "is there a window open in the home?" through a prompt.

In some embodiments, the fresh air controller 300 can send a prompt to the smart phone application 220 and/or the user device 201. In some embodiments, a prompt can be associated with and performed by the device application 220. In some embodiments, prompts can have functionality to notify a user and allowing for user input. In some embodiments, prompts can be associated with and performed by the user device 201, and/or switch 432 (see FIGS. 3 and 4). The fresh air controller 300 can send a prompt to the user device 201 and/or switch 432.

In some embodiments the fresh air controller 300 can connect to other devices over a Bluetooth Low Energy (BLE) 5.0/mesh. In some embodiments the fresh air controller can include a Wi-Fi 2.4/5 GHz Chip. In some embodiments, one or more components of the fresh air controller 300 can receive 17 Amps of current, for example, from standard building electrical power systems. In some embodiments, the fresh air controller 300 can transmit or receive data across about 100 feet or more of direct line communication. The fresh air controller 300 can transmit or receive data across about 80 feet or more of direct line communication (e.g., through average household obstructions). In some embodiments, the fresh air controller 300 can operate at 120V and a frequency of 60 Hz. The fresh air controller 300 can be adapted to have an operating temperature between about −20° C. to +80° C. The fresh air controller 300 can be adapted to have a storage temperature between about −40° C. to +80° C. and a storage humidity of less than about 90% relative humidity (non-condensing). The fresh air controller 300 can comply with Restriction of Hazardous Substances (RoHS).

In some embodiments, the fresh air controller 300 can communicate with and/or connect to one or more climate condition sensors 230, including one or more temperature sensors, one or more humidity sensors, and/or one or more AQI sensors. In some embodiments, the temperature sensor humidity sensor, and/or AQI sensor can be integrated into and positioned within a user device 201. In some embodiments, the temperature sensor humidity, and/or AQI sensor can be positioned in any suitable location within the building structure 106, such as the attic space 104, and/or the interior space 108. In some embodiments, the temperature sensor humidity, and/or AQI sensor can be positioned in any suitable location outside of the building structure 106, such as on an outside wall of the building structure facing the ambient environment.

In some embodiments, the temperature sensor can send a signal of a temperature value corresponding to the temperature inside the interior space 108 of the building structure 106. In some embodiments, the temperature sensor can send a signal of a temperature value corresponding to the temperature inside the attic space 104 of the building structure 106. In some embodiments, the temperature sensor can send a signal of a temperature value corresponding to the temperature of the ambient air/environment outside the building structure 106.

In some embodiments, the humidity sensor can send a signal of a humidity value corresponding to the humidity inside the interior space 108 of the building structure 106. In some embodiments, the humidity sensor can send a signal of a humidity value corresponding to the humidity inside the attic space 104 of the building structure 106. In some embodiments, the humidity sensor can send a signal of a humidity value corresponding to the humidity of the ambient air/environment outside the building structure 106.

In some embodiments, the AQI sensor can send a signal of an AQI value (such as information about and/or levels of volatile organic compound (VOC) gases, carbon dioxide, carbon monoxide, smoke, particulates, and/or pollen) corresponding to the AQI inside the interior space 108 of the building structure 106. In some embodiments, the AQI sensor can send a signal of an AQI value corresponding to the AQI inside the attic space 104 of the building structure 106. In some embodiments, the AQI sensor can send a signal of an AQI value corresponding to the AQI of the ambient air/environment outside the building structure 106.

Figure 3:
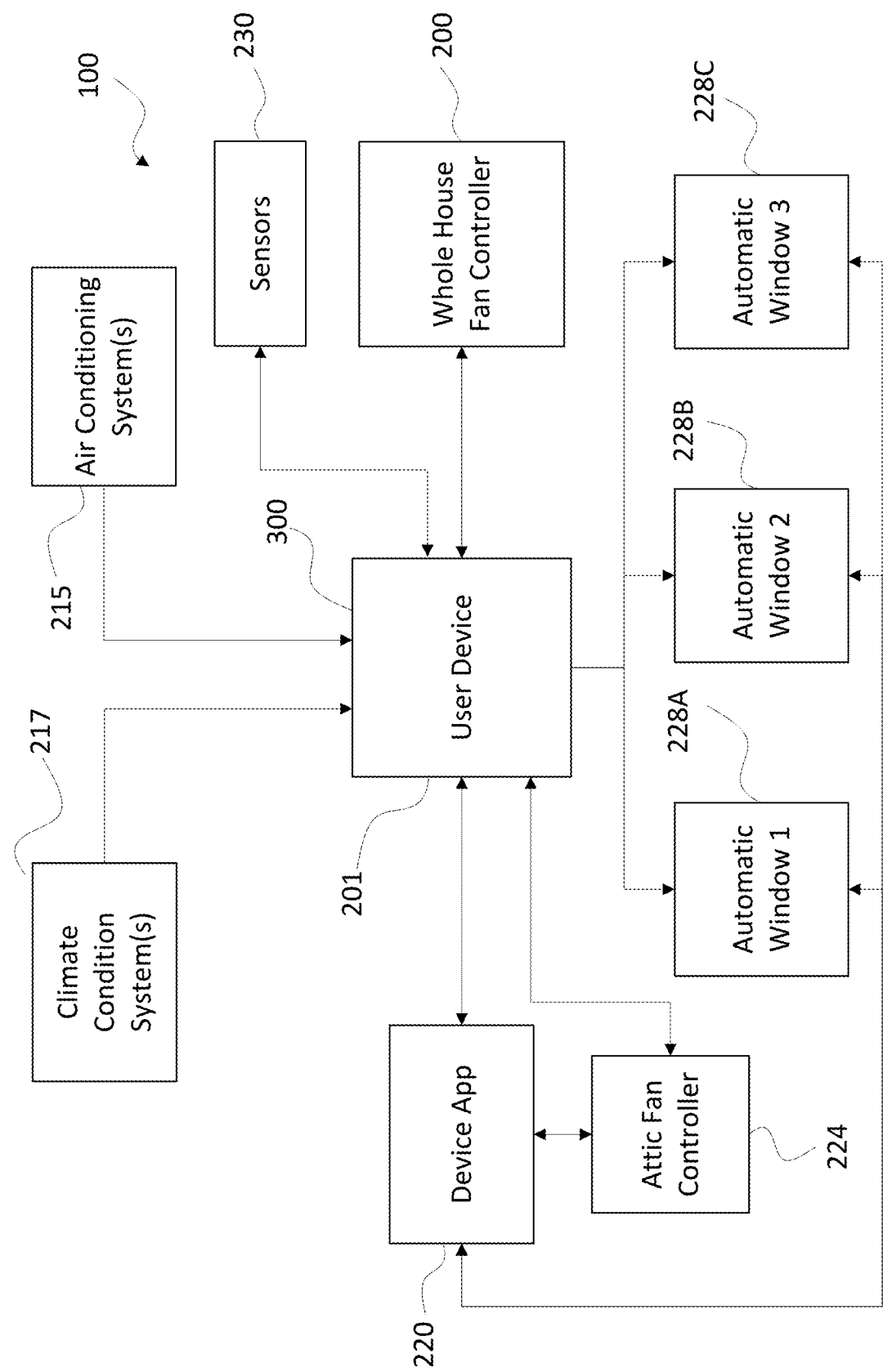
FIG. 3 is a schematic illustration of an embodiment showing different components of a multifunction adaptive whole house fan system.
Figure 4:
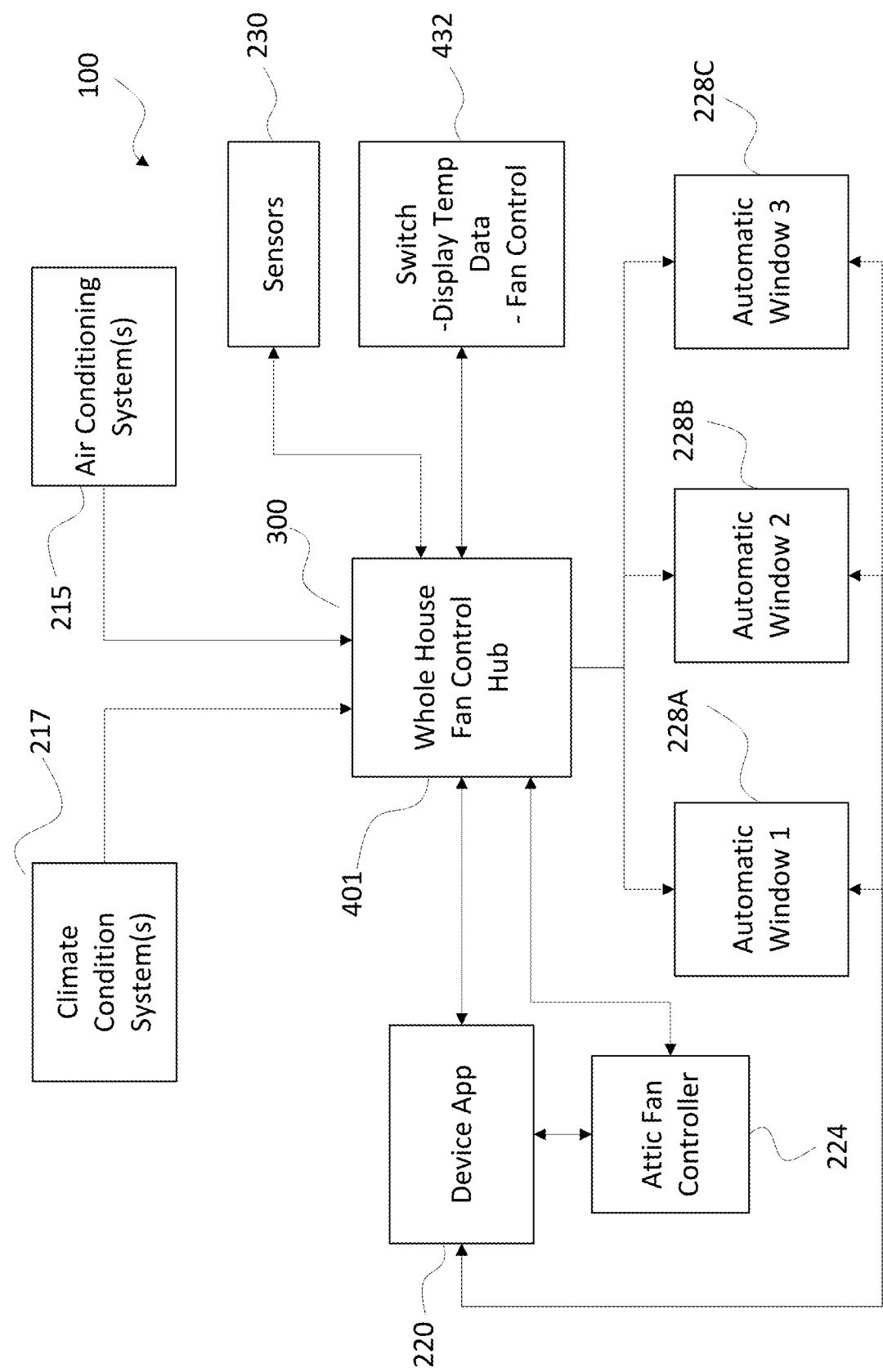
FIG. 4 is a schematic illustration of an embodiment showing different components of a multifunction adaptive whole house fan system.

FIGS. 3 and 4 are schematic illustrations of embodiments showing different components of a fresh air cooling and ventilating system 100. FIGS. 3 and 4 depict embodiments of the communication pathways between different parts of the fresh air cooling and ventilating system 100.

In some embodiments where the system 100 is not connected to automatic windows, the fresh air controller 300 can send a push notification or prompt, via the smart phone application 220, or the user device 201, to the user asking the user whether there is a window open in the building structure 106 to prompt the user to ensure at least one window is open and ambient air is permitted to flow into the building structure 106.

As depicted in FIG. 4, in some embodiments, the fresh air controller 300 can be included in and be a part of the whole house fan smart control hub 401 instead of a user device 201 as discussed herein. The whole house fan smart control hub 401 can have the functionality and features of the whole house fan controller 200 as discussed herein, while including the fresh air controller 300 as described. As depicted in FIG. 4, such a configuration of the system 100 can include automatic windows 228A-C.

As depicted in FIG. 4, in some embodiments, the whole house fan smart control hub 401 can be in two-way communication with a switch 432, which can be a user device, such as a user device 201 discussed herein, for receiving user input and displaying information to a user. The connection between the fresh air controller 300 of the whole house fan smart control hub 401 and the switch 432 can be a wired or a wireless connection. In some embodiments, the fresh air controller 300 can be connected to the switch 432 by an Ethernet cable connection or any other suitable wired connection. In some embodiments, the fresh air controller 300 can be connected to the switch 432 by a Bluetooth connection, a Wi-Fi connection, and/or any other suitable wireless connection to send and receive communication signals.

In some embodiments, the fresh air controller 300 can operate based on user input provided through signal from the switch 432. The switch 432 can be a controlling device which is designed to convey limited or selected information to the user and provide the user with select control options. The switch 432 can be used in conjunction with other user input options such as the smart phone application 220.

In some embodiments, the switch 432 can allow the user to turn the system 100 on and off or set the system 100 to operate in automatic mode. In some embodiments, the switch 432 can allow the user to set a countdown timer until the system 100 should turn on or off. The countdown timer can allow the user to set a countdown of 1, 2, 3, 4, 6, 8, or 12 hours or any time in between. In some embodiments, the switch 432 can allow the user to configure the fresh air controller to operate in semi-automatic mode or configure the fresh air controller to not operate in semi-automatic mode as discussed herein further. In some embodiments, the switch 432 can allow the user to choose between two or more fan speeds and send a signal to the whole house fan controller 200, to change the speed of the fan.

In some embodiments, the switch 432 can have a 2-year battery life, however, the time of the battery life is not limiting. The switch 432 can, for example, have a 1, 3, 4 or more year battery life. In some embodiments, the switch 432 can utilize a radio frequency (RF) connection to the whole house fan smart control hub 401 and/or the fresh air controller 300. The switch 432 can connect to the whole house fan smart control hub 401 and/or the fresh air controller 300 via a Bluetooth connection, a Wi-Fi connection, a wired connection or any other kind of connection known to the art.

In some embodiments, the switch 432 can be power down or go into a sleep mode when the user has not interacted with the switch for a period of time. In such a scenario, the switch can be wake up or turn on when the user hits any button. In some embodiments, the switch is illuminated by LED lights to allow the user to find the switch easily when other lights are turned out. In some embodiments, the switch 432 can have a light sensor that can sense the level of light and in the area where the switch 432 is located. The switch 432 can turn on the light senor determines there is low light in the area in which the switch 432 is located.

In some embodiments the switch 432 may further have and/or connect to a variety of sensors which can send information signals to the fresh air controller 300. For example, the switch 432 can have a temperature sensor that can detect temperature changes of plus or minus 1 degree Fahrenheit. In some embodiments, the switch 432 can have a humidity sensor that can take a humidity reading of the humidity inside the living space and transmit that humidity reading to the fresh air controller. In some embodiments, the switch 432 can have an AQI sensor that can take an AQI reading of the AQI inside the living space and transmit that AQI reading to the fresh air controller. In some embodiments, the switch 432 can be in connection with a smart phone application 220 such that it is able to display information retrieved from either the temperature sensor, the humidity sensor, and/or AQI sensor and display the information to the user through the smart phone application 220.

Figure 5:
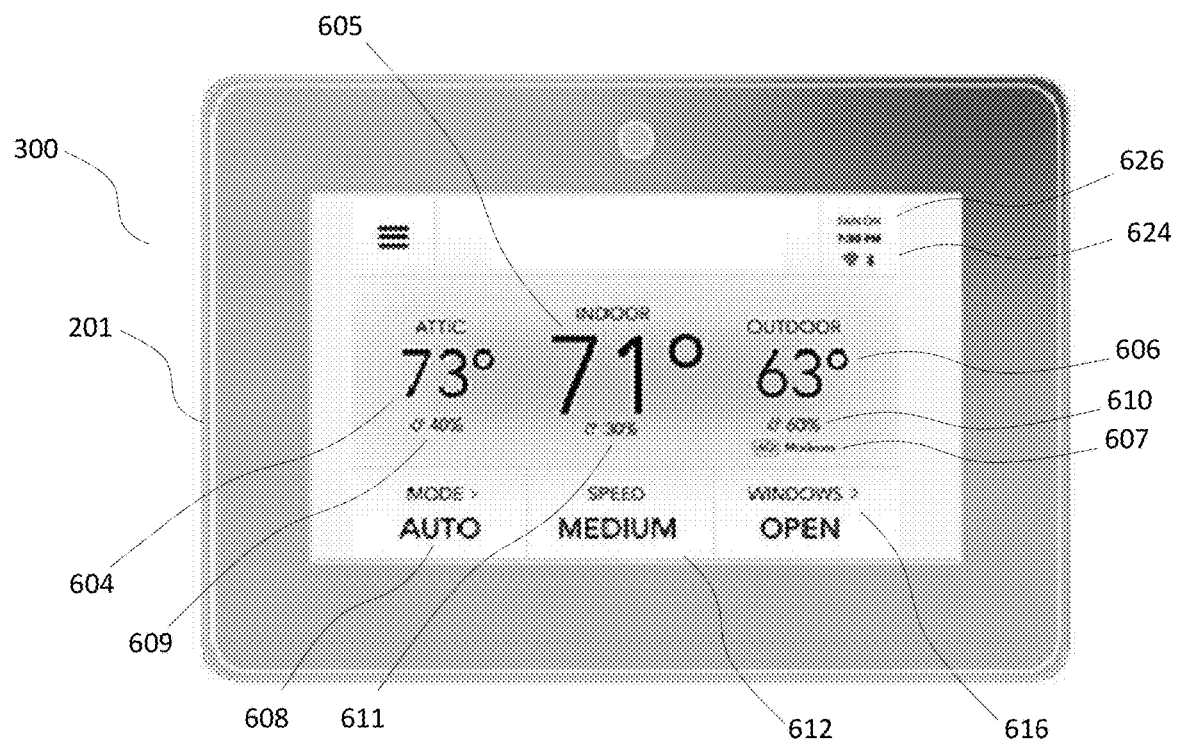
FIGS. 5 and 6 are an illustration of an embodiment of a user device of a multifunction adaptive whole house fan system.
Figure 6:
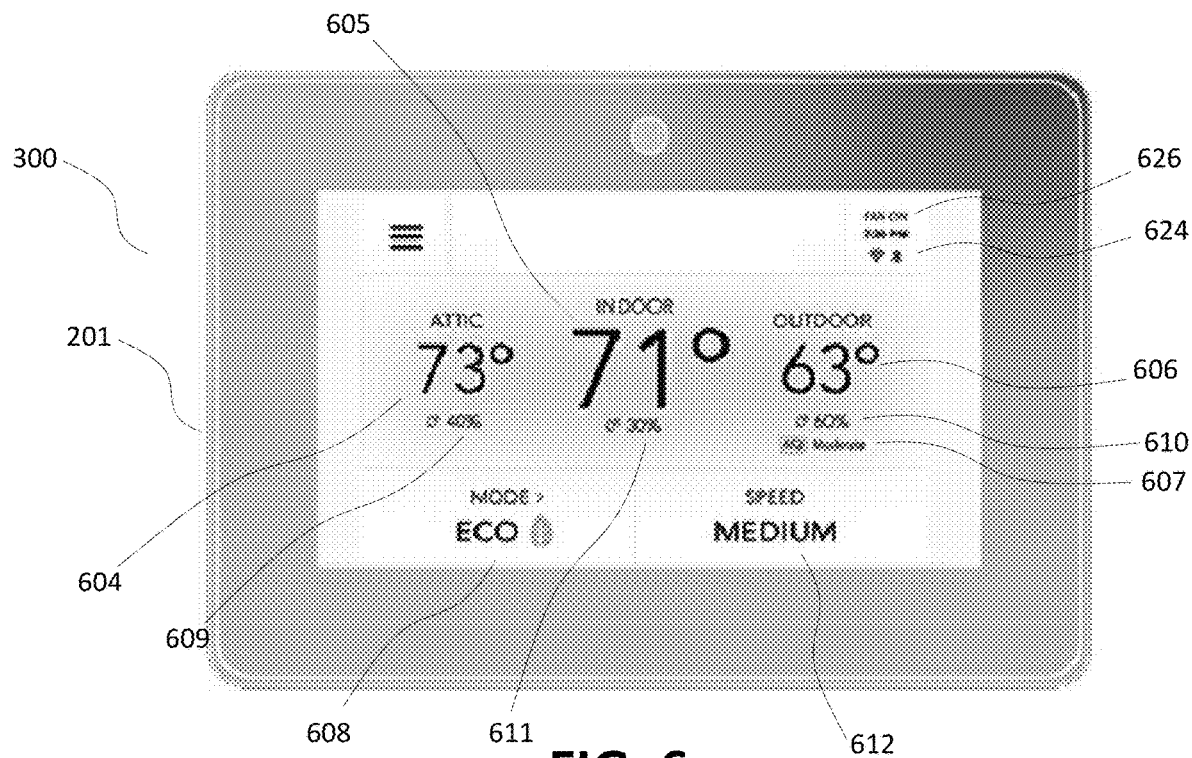

FIGS. 5 and 6 depict an embodiment of a user device 201. In some embodiments, the user device 201 can be utilized by the user to control the fresh air cooling and ventilating system through user input. The user device 201 can display or otherwise convey information about the system 100 such as through auditory or tactile communication protocols. In some embodiments, the user device 201 can be use instead of the switch 432 described above. The switch 432 and the user device 201 can also be used together. In some embodiments, an LCD Wall Control unit can be the user device 201.

In some embodiments, the user device/LCD Wall Control unit 201 and fresh air controller 300 can be contained within the same device or unit as well as other components as discussed herein such as temperature, humidity sensors, and/or AQI sensors.

The user device 201 can be in communication with automatic windows 228A-C, a whole house fan controller 200, ventilation fan controller 224, an air conditioning system, and/or other components of the system 100 as discussed herein to operate and optimize air control throughout the building structure 106. For example, the user device 201 can open and close the automatic windows 228A-C, turn on and off the fresh air cooling and ventilating system, turn on and off the ventilation fan, and/or turn on and off the air conditioning system with or without any user input.

In some embodiments, the user device 201 can be coupled with one or more temperature, humidity sensors, and/or AQI sensors 230 to make fine-tuned control decisions. Temperature, humidity sensors can, and/or AQI sensors 230 be placed both inside the building structure and outside in the ambient environment to determine optimal conditions for activating the fresh air cooling and ventilating system 100 as discussed herein. The user device 201 can be in wired or wireless communication with the one or more temperature, humidity sensors, and/or AQI sensors 230 using any suitable communication protocol as discussed herein. The user device 201 can have and/or house one or more temperature, humidity sensors, and/or AQI sensors on the user device 201 and/or inside the user device 201.

In some embodiments, the user device 201 can have a touch-screen interface for programming the device. In some embodiments, the user device 201 can also be used to control other secondary automated building functions such as security, lighting, and major appliances. In some embodiments, the user device 201 can be used to control heating in a manner similar to an air conditioning system. In some embodiments, the user device 201 can be activated remotely via a smart phone or by personal computer as discussed herein. In some embodiments, a user can determine the existing indoor temperature, outdoor temperature, indoor humidity, and/or outdoor humidity, as well as presently active units from a remote location through remote communication with the user device 201. A user can also use the remote function to make program or control changes in the fresh air cooling and ventilating system 100. In some embodiments, the user device 201 can be coupled with energy load sensors, which can be one or more of the sensors 230, to provide an energy management report and energy efficiency recording of the building. In some embodiments, the energy load sensors can be placed on major appliances, the fresh air cooling and ventilating system, and the air conditioning system to provide instantaneous energy reports. The user device 201 can use the information from the energy load sensors to control one or more components of the system 100 discussed herein, such as the WHF 102, ventilation fan 118, and/or automated or automatic windows 228A-C, as well as the air conditioning system or other system of the building structure 106.

The user device 201 of the fresh air cooling and ventilating system 100 can receive user input that provides information to the fresh air controller 300 for the operation of the system 100. In some embodiments, the user device 201 can display or otherwise convey (auditory or tactile) information about the operation of the fresh air cooling and ventilating system 100 to a user. In some embodiments, the information displayed or conveyed by the user device 201 can include, but is not limited to an indication as to whether the fresh air cooling and ventilating system 100 is on or off 626, the temperature inside the building structure 605, the temperature of the ambient air outside the building structure 606, the humidity in the building structure 611, the humidity of the ambient air outside the building structure 610, the humidity in the attic of the building structure 609, the air quality index of the ambient air outside the building structure 607, an indication of whether the user device 201 has Bluetooth and Wi-Fi connectivity turned on and/or is connected to other parts of the system and/or internet 624, a countdown timer indicating when the system will turn on, an indication as to whether or not the system is operating in semi-automatic mode, automatic mode, or any other mode discussed herein 608, an indication as to whether the windows connected to the system are open 616, and/or an indication of what speed the WHF is operating at 612. In some embodiments, the user device 201 displays information about the connectivity of the fresh air controller 300 and whether or not it is connected to other components of the system 100 and/or connected to Wi-Fi and/or Bluetooth.

In some embodiments, the user device 201 can receive input from the user for the operation of the system. In some embodiments, the user device 201 can allow the user to turn fans on, off, or put the system 100 in automatic mode. In some embodiments, the user device 201 can allow the user to put the system 100 in a semi-automatic mode. In some embodiments, the user device 201 can allow the user to operate the system 100 any component of the system 100 manually. In some embodiments, the user device 201 can allow the user to select between different WHF speeds (such as Speed 1, Speed 2, or Speed 3) which spin the fans at a different rate. In some embodiments, Speed 1 corresponds to a low speed, Speed 2 corresponds to a medium speed, and Speed 3 corresponds to a high speed. The system is, however, not limited to three speeds. The WHF can operate at 1, 2, 4, 5, or any number of different speeds, including variable speeds. In some embodiments, the user device 201 can allow the user to set a countdown timer to start or stop the operation of the system 100 at some future time. In some embodiments, the countdown timer can be set to 1 hours, 4 hours, 8 hours, 12 hours, or anytime selected by the user.

In some embodiments, the user device 201 can include an LCD screen or any other kind of screen that is capable of displaying information. In some embodiments, the LCD screen of the user device 201 can be illuminated by LED lights. In some embodiments, the LED lights illuminating the LCD screen can turn on when a user interacts with the system and can turn off after 5, 10, 15, 30, 60 second, or any other time of inactivity. In some embodiments, the LED lights of the user device 201 can blink if there is an issue with the system. In some embodiments, the LED lights can blink if the user device 201 is not connected to the fresh air controller.

In some embodiments, the user device 201 can be mounted into a retrofit electrical box that will be put into a wall. In some embodiments, the user device 201 can be made of multiple pieces including a back piece, the user device 201, and a faceplate. In some embodiments, the back piece can screw into the electrical box in the wall and provide a place for the switch or user device 201 to be placed. In some embodiments, the user device 201 can be connected to the back plate either by snapping into the back plate or by some other means. In some embodiments the faceplate can snap into or connect by some other means to the user device 201 and the back plate. In some embodiments, the faceplate can allow the user device 201 to blend in with other switches in the building structure.

In some embodiments, the user device 201 can be battery powered. In some embodiments the user device 201 can connect to the electrical system of the building structure. In some embodiments, that battery life of user device 201 can be 1, 2, 3, or more years.

In some embodiments, the user device 201 can have additional 120V leads and extra hot and neutral wires. These additional wires can be available for connection to additionally elements or components that, at present, are not included in the fresh air cooling and ventilating system. In some embodiments, these leads can be used to power an actuator that can open and close a damper to permit airflow into the building structure or a damper of the air intake 112 for the WHF 102.

In some embodiments, the user device 201 can have a light sensor. In some embodiments, the light sensor of the user device 201 can receive light input information from living space surrounding the user device 201. In some embodiments, when the light sensor determines there is no light or low light in the living area surrounding the user device 201 the user device 201 can illuminate itself so it can easily be located by a user.

In some embodiments, the user device 201 can include and/or house the fresh air controller 300 or be in connection with the fresh air controller 300. In some embodiments, the fresh air controller 300 can control the fresh air cooling and ventilating system 100 as discussed herein in conjunction with the user device 201 functionality discussed herein.

Multifunction Adaptive Whole House Fan System Operating Modes and Controls

Figure 7:
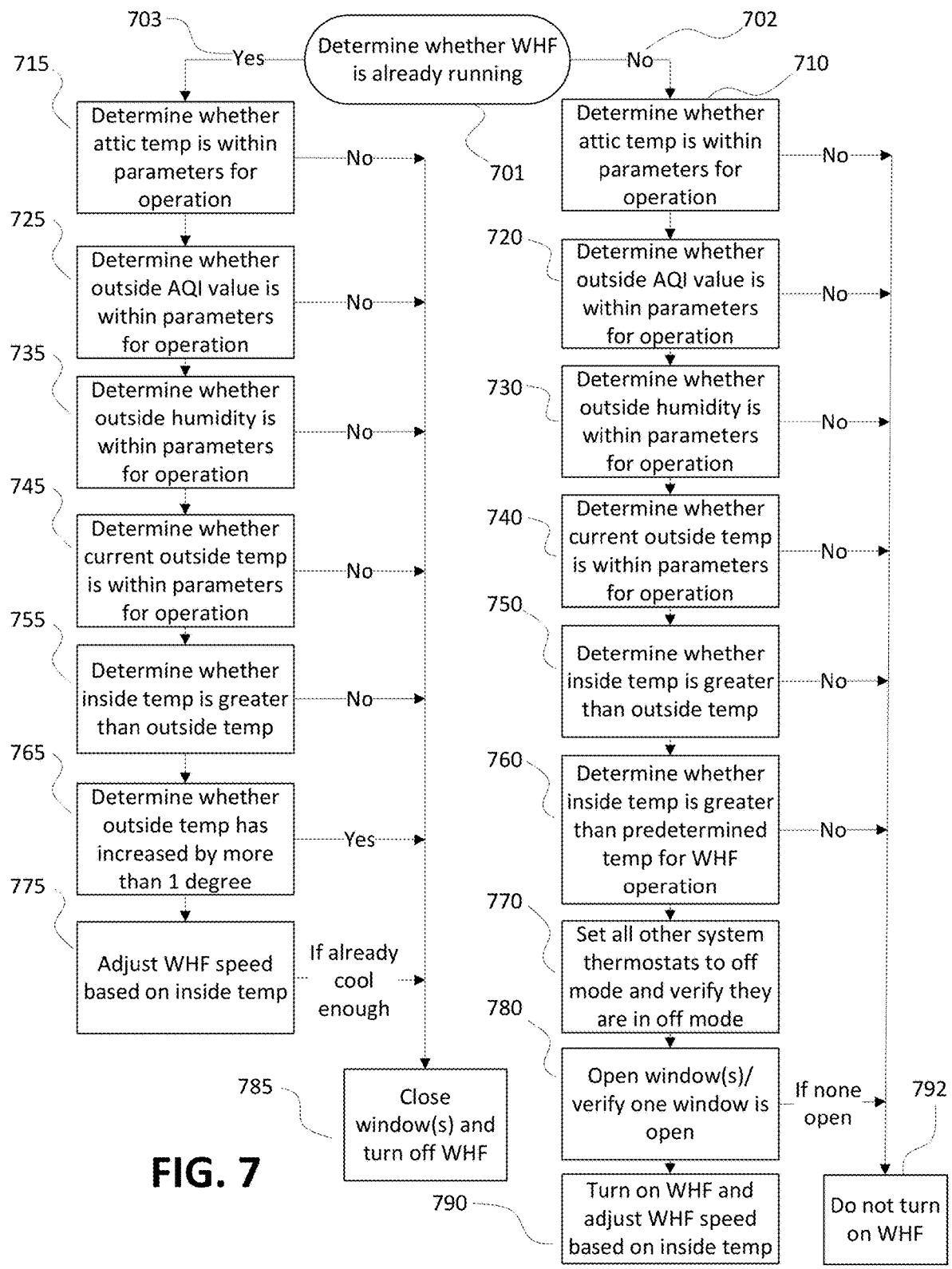
FIG. 7 is a control diagram illustrating an embodiment for operating a multifunction adaptive whole house fan system.

FIG. 7 depicts an embodiment of a control diagram of the logic for controlling the fresh air cooling and ventilating system 100. FIG. 7 depicts a control diagram of the logic the fresh air controller 300 can utilize when the user places the fresh air cooling and ventilating system 100 in an automatic mode using, for example, the smart phone application 220 and/or user device 201. In some embodiments, the logic depicted in FIG. 7 can run iteratively at a range of different intervals including every minute, every five minutes, every 10 minutes, every 30 seconds, every 1 second, anytime in between, or anytime beyond 10 minutes. The interval at which the fresh air controller 300 can operate the control logic can be set by the manufacturer, by the installer, by the user, by the manufacturer, or by the installer and can be modified by the user.

As depicted in FIG. 7, in some embodiments, fresh air controller 300 can first determine whether the WHF 102 of the fresh air cooling and ventilating system 100 is already operating, running, activated, or turned on 701. In some embodiments, depending on whether the WHF is operating in step 701, the fresh air controller 300 will follow either a WHF on logic flow path 703 or a WHF off logic control flow path 702.

As depicted in FIG. 7, in some embodiments, if the fresh air controller 300 determines that WHF is already operating in step 701, the fresh air controller 300 can proceed to step 715. For step 715 in the WHF on logic flow path 703, the fresh air controller 300 can determine whether the temperature in the attic of the building structure is within the operating parameters of the system. The fresh air controller 300 can receive a temperature value corresponding to the temperature in the attic of the building structure from a temperature sensor located in the attic of the building structure. The fresh air controller 300 can compare the attic temperature value with a predetermined attic temperature value. The fresh air controller 300 can determine that if the attic temperature is higher than the predetermined attic temperature value, the fresh air controller 300 can send a command/operation signal causing the whole house fan controller to turn off the WHF 102 and signal the automatic windows to close, as shown in step 785. The fresh air controller 300 can determine that if the attic temperature value is below the predetermined attic temperature, the fresh air controller 300 can continue on the WHF on logic flow path 703 to step 725.

The predetermined attic temperature, in some embodiments, can be 182 degrees Fahrenheit. A temperature of 182 degrees Fahrenheit or above may indicate that there is a fire in the building structure. In such a scenario the fresh air cooling and ventilating system 100 is designed to shut down to prevent air from being drawn into the building structure and further feeding any fire that may be occurring in the building structure. The predetermined attic temperature is not limited to 182 degrees Fahrenheit, but can be set at any temperature value, including 160, 165, 170, 170, and 180 degrees Fahrenheit. For example, under typical operating conditions, the attic temperature may reach between 120 and 140 degrees Fahrenheit.

For building structures positioned in excessively hot conditions, such as a desert, the attic temperature may reach up to 160 degrees Fahrenheit. In some embodiments, the smart phone application 220 and/or user device 201, can allow the user to modify the predetermined attic temperature, for example, depending on the location of the system 100. The system 100 may automatically modify the predetermined attic temperature depending on the location of the building structure within which the system 100 is installed. This feature is advantageous because it can prevent the system from exacerbating a fire that may be occurring in the building structure.

In some embodiments, as depicted in FIG. 7, if the attic temperature is determine to be lower than the predetermined attic temperature in step 715, the fresh air controller 300 can determine whether the outside air quality index value is within predetermined parameters for operation of the fresh air cooling and ventilating system 100 as shown in step 725. In some embodiments, the fresh air controller 300 can receive an air quality index value corresponding to the air quality index for the ambient air outside the building structure through from the climate condition system 217, air conditioning system 215, and/or one or more sensors 230, and/or the internet as discussed herein. The fresh air controller 300 can compare the air quality index value for the ambient air outside the building structure to a predetermined operating parameter for the air quality index.

In some embodiments, the predetermined operating parameters for air quality index value or predetermined air quality index value can be set by the user via the smart phone application 220 and/or user device 201. In some embodiments, the predetermined operating parameters for the air quality index can be set by the manufacturer, the installer, or some other entity during or prior to installation of the system 100. In some embodiments, the predetermined air quality index value can be 100. In some embodiments, the predetermined air quality index value can be 50, 60, 70, 80, 90, 110, 120, 130, 140, or 150. It is advantageous to check the air quality index value of the ambient air outside the building structure prior to operating the WHF because operating the WHF when the air quality index is high may cause highly polluted air to be pulled into the building structure, potentially negatively affecting its occupants.

In some embodiments, as depicted in FIG. 7, if the air quality index value is determined to be outside the air quality index operating parameters such as being greater than the predetermined air quality index value, the fresh air controller 300 send a command signal to turn off the WHF 102 and send a command signal to close the automatic windows as shown in step 785.

In some embodiments, as depicted in FIG. 7, if the fresh air controller 300 determines that air quality index value is within the air quality index operating parameters such as being less than the predetermined air quality index value in step 725, the fresh air controller 300 can determine whether the outside humidity is within the parameters for operation as shown in step 735. The fresh air controller 300 can receive a humidity value corresponding to the humidity of the ambient air outside the building structure. In some embodiments, the fresh air controller 300 can receive the ambient humidity value from the climate condition system 217, air conditioning system 215, and/or one or more sensors 230, and/or the internet or from a humidity sensor in communication with the fresh air controller 300.

In some embodiments, the fresh air controller 300 can compare the ambient air humidity value to a predetermined humidity operating parameter or value. In some embodiments, the predetermined humidity operating parameter can be set by the user utilizing the user device and/or smart phone application, or by the manufacturer or the system or the person installing the system or any combination of the above.

In some embodiments, as depicted in FIG. 7, if the fresh air controller 300 determines that the ambient air humidity value and the predetermine humidity operating parameters is outside the predetermined humidity operating parameters such as the humidity value being greater than the predetermined humidity value, the fresh air controller 300 can send a signal to turn off the WHF 102 and send a command signal to close the automatic windows as show in step 785. In some embodiments, as depicted in FIG. 7, if the fresh air controller 300 determines that the ambient air humidity value is within the operating parameters such as humidity value being less than the predetermined humidity value, the fresh air controller 300 continues to the next step in the WHF on flow path 703 to step 735.

In some embodiments, as depicted in FIG. 7, if the fresh air controller 300 determines the ambient air humidity value to be within the operating parameters in step 735, the fresh air controller 300 can determine whether the outside air temperature is within the parameters for operation in step 745. The fresh air controller 300 can receive an ambient air or outside temperature value corresponding to the temperature of the air outside the building structure. In some embodiments, the fresh air controller 300 can receive an ambient air or outside temperature value from a temperature sensor in communication with the fresh air controller 300. In some embodiments, the fresh air controller 300 can receive an ambient air or outside temperature value from the climate condition system(s) 217 and/or the internet to a weather service.

In some embodiments, the fresh air controller 300 can compare the present or current outside temperature value to a predetermined ambient temperature operating parameter. In some embodiments, the predetermined ambient temperature operating parameter can be set by the user utilizing the user device and/or smart phone application, or by the manufacturer or the system of the person installing the system or any combination of the above.

In some embodiments, as depicted in FIG. 7, if the fresh air controller 300 determines that the present ambient air or outside temperature value is not within the predetermined ambient temperature operating parameters such as the present or current ambient air or outside temperature value is greater than the predetermined outside temperature value in step 745, the fresh air controller 300 send a command signal to turn off the WHF 102 and send a command signal to close the automatic windows as shown in step 785. In some embodiments, as depicted in FIG. 7, if the fresh air controller 300 determines that the outside temperature value is within the operating parameters such as the present or current ambient air or outside temperature value is less than the predetermined outside temperature value, the fresh air controller 300 continues to the next step in the WHF on flow path 703, step 755.

In some embodiments, as depicted in FIG. 7, if the fresh air controller 300 determines that the outside air temperature value is within the operating parameters in step 745, the fresh air controller 300 can determine whether the air temperature inside the building structure (inside temperature value) is higher than the air temperature outside the building structure (outside temperature value) as shown in step 755. The fresh air controller 300 can receive a temperature value corresponding to the temperature of the air inside the building structure (inside temperature value) from the climate condition system 217, air conditioning system 215, and/or one or more sensors 230. In some embodiments, the fresh air controller 300 can receive a temperature value corresponding to the temperature of the ambient air outside the building structure (outside temperature value) from the climate condition system 217, air conditioning system 215, and/or one or more sensors 230. In some embodiments, the fresh air controller 300 can receive the inside temperature value from a temperature sensor in communication with the fresh air controller 300.

In some embodiments, the fresh air controller 300 can compare the inside temperature value to the outside temperature value. If the fresh air controller determines that the outside temperature value is greater than the inside temperature value in step 755, the fresh air controller 300 send a command signal to turn off the WHF 102 and send a command signal to close the automatic windows as shown in step 785. In some embodiments, as depicted in FIG. 7, if fresh air controller 300 determines that the outside temperature value is less than the inside temperature value, the fresh air controller 300 can continue to the next step in the WHF on flow path 703 to step 765.

In some embodiments, as depicted in FIG. 7, if the fresh air controller 300 determines the inside temperature value is greater than the outside temperature value in step 755, the fresh air controller 300 can determine whether the outside air temperature has increased by more than 1 degree Fahrenheit, as shown in step 765. The fresh air controller 300 can compare the current or present outside temperature value to a stored previous outside temperature value.

In some embodiments, the stored previous outside temperature value can correspond to the outside temperature received by the fresh air controller 300 during the most recent iteration of the WHF off control logic flow path 702. In some embodiments, the stored previous outside temperature value can correspond to the outside temperature received by the fresh air controller 300 during the most recent iteration of the WHF on control logic flow path 703. In some embodiments, change in temperature is not limited to 1 degree Fahrenheit and the fresh air controller 300 can determine whether the outsider temperature has increased by more than 2 degrees Fahrenheit, 3 degrees Fahrenheit, 5 degrees Fahrenheit, or any other temperature increase.

In some embodiments, if the fresh air controller 300 determines there has been an increase in the outside temperature of more than 1 degree Fahrenheit in step 765, the fresh air controller 300 send a command signal to turn off the WHF 102 and send a command signal to close the automatic windows as shown in step 785. In some embodiments, the fresh air controller can delete or clear the stored previous temperature value in step 785. In some embodiments, as depicted in FIG. 7, if the fresh air controller 300 determines there has not been an increase in the outside temperature of more than 1 degree Fahrenheit the fresh air controller 300 can continue to the next step in the WHF on flow path 703 to step 775.

In some embodiments, as depicted in FIG. 7, if the fresh air controller 300 determines that the outside temperature has not increased by more than one (1) degree Fahrenheit or any other predetermined temperature increase in step 765, the fresh air controller 300 can adjust the WHF 102 speed based on the inside temperature value, as shown in step 775. The fresh air controller 300 can compare the previously determined inside temperature value to a set of predetermined inside temperature values.

In some embodiments, the fresh air controller 300 can send a command/operation signal causing the whole house fan controller 200 to adjust the WHF speed based on the inside temperature value, as shown in step 775. The fresh air controller 300 can send a command/operation signal causing the whole house fan controller 200 to adjust the WHF speed as discussed herein.

In some embodiments, the fresh air controller 300 can compare the inside temperature value to a first, second, and third predetermined inside temperature values. For example, if the inside temperature value is between the first and second predetermined inside temperature values, the fresh air controller 300 can send a command signal to operate the WHF 102 at a first speed. If the inside temperature value is between the second and third predetermined inside temperature values, the fresh air controller 300 can send a command signal to operate the WHF 102 at a second speed. If the inside temperature value is greater than the third predetermined inside temperature value, the fresh air controller 300 can send a command signal to operate the WHF 102 at a third speed.

In some embodiments, the first, second, and third fan speeds correspond to a low, a medium, and a high speed respectively. In some embodiments, the WHF is not limited to three speeds, but instead can have 1 speed, 2 speeds, 4 speeds, 6 speeds, or any number of speeds. In some embodiments, the number of speeds corresponds to the number of predetermined values to which the fresh air controller 300 can compare the inside temperature of the building structure such that, for example, the number of speeds is equal to the number of predetermined temperature values.

In some embodiments, the first predetermined inside temperature to which the fresh air controller 300 can compare the inside temperature to is the lowest predetermined temperature. In some embodiments, the fresh air controller 300 can send a command signal to turn off the WHF and close the automatic windows when the inside temperature value is lower than the lowest predetermined inside temperature value. In some embodiments, the first predetermined inside temperature can be the predetermined inside temperature value for WHF operation discussed herein with reference to step 760. In some embodiments, the predetermined inside temperature values to which the inside temperature is compared to can be set by the user utilizing the user device and/or smart phone application, or by the manufacturer or the system of the person installing the system or any combination of the above. This can help to not turn on, activate, or keep running the WHF if the building structure is already cooler than the user would like it to be.

In some embodiments, when the fresh air controller 300 determines that the WHF 102 should be turned off while progressing through the WHF on logic flow path 703, the fresh air controller 300 can delete or clear the store outside temperature value as part of step 785. In some embodiments, as part of step 785 for any of the logic steps discussed herein, the fresh air controller 300 can send a signal to the home thermostat to resume or continue operation of the air conditioning system when it is not ideal to run the WHF.

In some embodiments, when the fresh air controller 300 sends a signal to close the automatic windows, as shown in step 785, the fresh air controller 300 can perform a check to determine or verify whether the automatic windows have been closed. The fresh air controller 300 can perform this check by determining the number of automatic windows connected to the fresh air controller 300 or the system 100. The fresh air controller 300 can retrieve or receive a status signal from each window indicating whether or not the any of the particular window(s) are open. If one or more of the windows are open, the fresh air controller 300 can send a command signal to close the corresponding window. If all of the windows are closed, the WHF on control logic flow path 703 can be complete. If the fresh air controller 300 receives a signal indicating there is an error with one or more windows that cannot be closed automatically, the fresh air controller 300 can cause an error notification to be sent to the user through a push notification or prompt sent via the smart phone application 220, and/or the user device 201 indicating that one or more particular windows could not closed automatically. If there is more than one automatic window connected to the system, the fresh air controller 300 can repeat the same steps for each automatic window.

In some embodiments, the when the automatic mode is turned off manually from either the switch 432, the user device 201, and/or smart phone application 220, the fresh air controller 300 can clear the stored outside temperature value, send a command signal to close the automatic windows, and verify the automatic windows are closed as discussed herein.

As depicted in FIG. 7, in some embodiments if at the fresh air controller 300 determines the WHF is not running in step 701, the fresh air controller 300 can follow the logic of the WHF off control flow path 702. In some embodiments, as depicted in FIG. 7, the logic of flow path can be the same or similar to the logic of the WHF on flow path 703 up until step 760. Thus, steps 710, 720, 730, 740, and 750 can correspond to steps 715, 725, 735, 745, and 755 described above, respectively. The fresh air controller 300 can perform steps 710, 720, 730, 740, and 750 in substantially the same manner as described above for steps 715, 725, 735, 745, and 755, respectively, with steps 710, 720, 730, 740, and 750 leading to step 792 or continuing in the logic sequence to, for example, step 790 similar to steps 715, 725, 735, 745, and 755, leading to step 785 or continuing in the logic sequence to, for example, step 775 as discussed herein.

After determining that the inside temperature is greater than the outside temperature in step 750, in some embodiments, as depicted in FIG. 7, the fresh air controller 300 can determine whether the present or current inside temperature value is greater than a predetermined inside temperature value for operation of the WHF as shown in step 760 on the WHF off logic flow path 702. The fresh air controller 300 can compare the inside temperature value to a predetermined inside temperature value for operation. The predetermined inside temperature value for operation can be set by the user utilizing the user device and/or smart phone application, or by the manufacturer or the system of the person installing the system or any combination of the above. This feature allows setting a minimum temperature below which the WHF is not activated, thus preventing the building structure from getting too cold. The predetermined inside temperature value can equal or correspond to the minimum temperature below which the WHF is not activated or turned on.

In some embodiments, as depicted in FIG. 7, if the fresh air controller 300 determines that the present or current inside temperature value is less than the predetermined inside temperature value in step 760, the fresh air controller 300 will not send a command signal to turn on or activate the WHF 102 or open the automatic windows, as shown in step 792. If the fresh air controller 300 determines that the present or current inside temperature value is greater than the predetermined inside temperature value in step 760, the fresh air controller 300 can proceed to the next step in the WHF off logic flow path 702 to step 770.

In some embodiments, as depicted in FIG. 7, if the fresh air controller 300 determines that the inside temperature value is greater than the predetermined inside temperature value in step 760, the fresh air controller 300 can send a command signal to not operate or activate to a home or other system connected thermostat(s) that can control air condition system(s) of the building structure, as shown in step 770. The fresh air control 300 can send a command signal to one or more connected thermostats as discussed herein to set the operating mode to off, for example, for an air conditioning system. The fresh air controller 300 can verify that the connected thermostat(s) are in the off mode. In some embodiments, the connected thermostat(s) are set to an off mode to prevent the air conditioning system in the building structure from operating at the same time as the WHF.

In some embodiments, as depicted in FIG. 7, after setting the connected thermostats to off in step 770, the fresh air controller 300 can send a command signal to the automatic windows connected to the fresh air cooling and ventilating system 100 to open, as shown in step 780. The fresh air controller 300 can verify whether the automatic windows opened. If the fresh air controller 300 determines in step 780 the automatic windows did not open as discussed herein, the fresh air controller 300 can send an error message to the user via a push notification or prompt sent to the smart phone application 220, and/or the user device 201. In some embodiments, the fresh air controller 300 in the automatic mode will not turn on the WHF 102 if the fresh air controller 300 cannot verify that at least one window is open, as shown in step 792.

In some embodiments, to verify or check that at least one automatic window is open in step 780, the fresh air controller 300 can determine the number of automatic windows connected to the fresh air controller 300 or the system 100. The fresh air controller 300 can determine whether the first automatic window is set to automatically open. If the first automatic window is set to automatically open, the fresh air controller 300 can send a signal to open the first automatic window. The fresh air controller 300 can request the status of the first automatic window and can receive a signal indicating whether the first automatic window is open, closed, or is experiencing an error. If first automatic window is closed or experiencing an error, the fresh air controller 300 can send a push notification or prompt, via the smart phone application 220 and/or the user device 201, alerting the user of the error and turn off or exit automatic mode. If there are multiple or one or more automatic windows, the fresh air controller 300 can repeat this process for each automatic window and can activate the WHF if at least one automatic window is open. If all of the automatic windows are closed or experiencing an error, the fresh air controller 300 can turn off or exit automatic mode, while having sent a push notification or prompt, via the smart phone application 220 or the user device 201, alerting the user of the error based on the closed or error automatic window logic as discussed herein. In some embodiments, if the fresh air controller 300 verifies at least one window is open in step 780, the fresh air controller 300 can send a signal to the whole house fan controller 200 turn on, activate, or operate the WHF and adjust the WHF speed, as shown in step 790.

In some embodiments, the system 100 can be communication with an alarm system of the building structure. The alarm system of the building structure can be designed to monitor the building structure and inform when an intruder has entered the building structure or some other undesirable event has occurred when the alarm system is active or activated (e.g., armed). The fresh air controller 300 can send and receive communication signals to and from the alarm system. In some embodiments, the fresh air controller 300 can be in communication with the alarm system or a controller of the alarm system through smart home connections, including via cloud services.

In some embodiments, when the alarm system is active, the alarm system or alarm system controller can send a communication or status signal to the fresh air controller 300 indicating that alarm system is active and that the one or more automatic windows of the building structure should not be opened. In some embodiments, when the alarm system is active and the user controls the system 100 to operate and open the one or more automatic windows as discussed herein (e.g., in the semi-automatic mode(s)), the fresh air controller 300 can send a push notification to the smart phone application 220, via the internet, alerting the user that the alarm system is active and that the one or more automatic windows should not be open or that opening the one more automatic windows may trigger the alarm system. In some embodiments, when the alarm system is active and the system 100 is automatically operating (e.g., in the automatic mode(s)) where one or more automatic windows are to be automatically opened as discussed herein, the fresh air controller 300 can send a push notification to the smart phone application 220, via the internet, alerting the user that the alarm system is active and that the one or more automatic windows could not be opened or that opening the one more automatic windows may trigger the alarm system.

The system 100 may configured such that the user may override the functionality or setting of automatic windows not being able to be opened when the alarm system is active to have automatic windows be opened by the fresh air controller 300 even if the alarm system is active. The fresh air controller 300 may send a status signal to the alarm system indicating user override for opening automatic windows. In some embodiments, the alarm system may include functionality (e.g., with the fresh air controller 300 sending an override signal) to allow the fresh air controller 300 to open one or more automatic windows without triggering the alarm system while the alarm system is active.

In some embodiments, when the alarm system is active, the fresh air controller 300 can suspend operation of the WHF and not open the one or more windows in one or more modes discussed herein that cause the automatic windows to automatically open (e.g., in the automatic mode(s)) where the fresh air controller 300 monitors certain parameters whether to automatically open one or more automatic windows and turn on the WHF. In some embodiments, when the alarm system is inactive or deactivated (e.g., disarmed), the alarm system or alarm system controller can send a communication or status signal to the fresh air controller 300 indicating that alarm system is inactive and that the one or more automatic windows of the building structures can be opened for, for example, the system 100 to operate as discussed herein. When the alarm system is activated, the alarm system can send an active status signal to the fresh air controller 300; if the WHF is operating with one or more automatic windows open (in any mode), the fresh air controller 300 may in response suspend operation of the WHF and close one or more automatic windows as discussed herein to, for example, secure the building structure 106.

In some embodiments, the fresh air controller 300 can send a command/operation signal causing the whole house fan controller 200 to adjust the WHF speed based on the inside temperature value, as shown in step 790. The fresh air controller 300 can send a command/operation signal causing the whole house fan controller 200 to adjust the WHF speed as discussed herein in reference to step 775.

In some embodiments, after turning on the WHF according to the WHF off logic flow path 702 discussed herein, the fresh air controller 300 can generate and store a stored outside temperature value corresponding to the outside temperature value received by the fresh air controller 300 during this iteration of the flow path 702, such as at step 740 as discussed herein or after performing step 790 with the WHF operating. The stored outside temperature value can correspond to a previous temperature value for use in the control logic in any of the modes discussed herein. The previous temperature value can be associated with a time period ago between the current iteration of the logic flow path and the next time the fresh air controller 300 generates and stores a stored outside temperature value as discussed herein. In some embodiments, the time period ago can be a predetermined time period ago, a previous time period, or a predetermined previous time period corresponding to a time when the fresh air controller 300 retained the stored/previous outside temperature value.

FIGS. 8, 9A, 9B 10, and 11 depict embodiments of a control diagram of the logic for controlling the fresh air cooling and ventilating system 100. FIGS. 8, 9A, 9B, 10, and 11 depict embodiments of the fresh air cooling and ventilating system 100 operating in a semi-automatic mode. The semi-automatic mode can include control logic that runs certain aspects of the system 100 automatically after the user provides inputs for other aspects, such as turning on the system 100.

Figure 8:
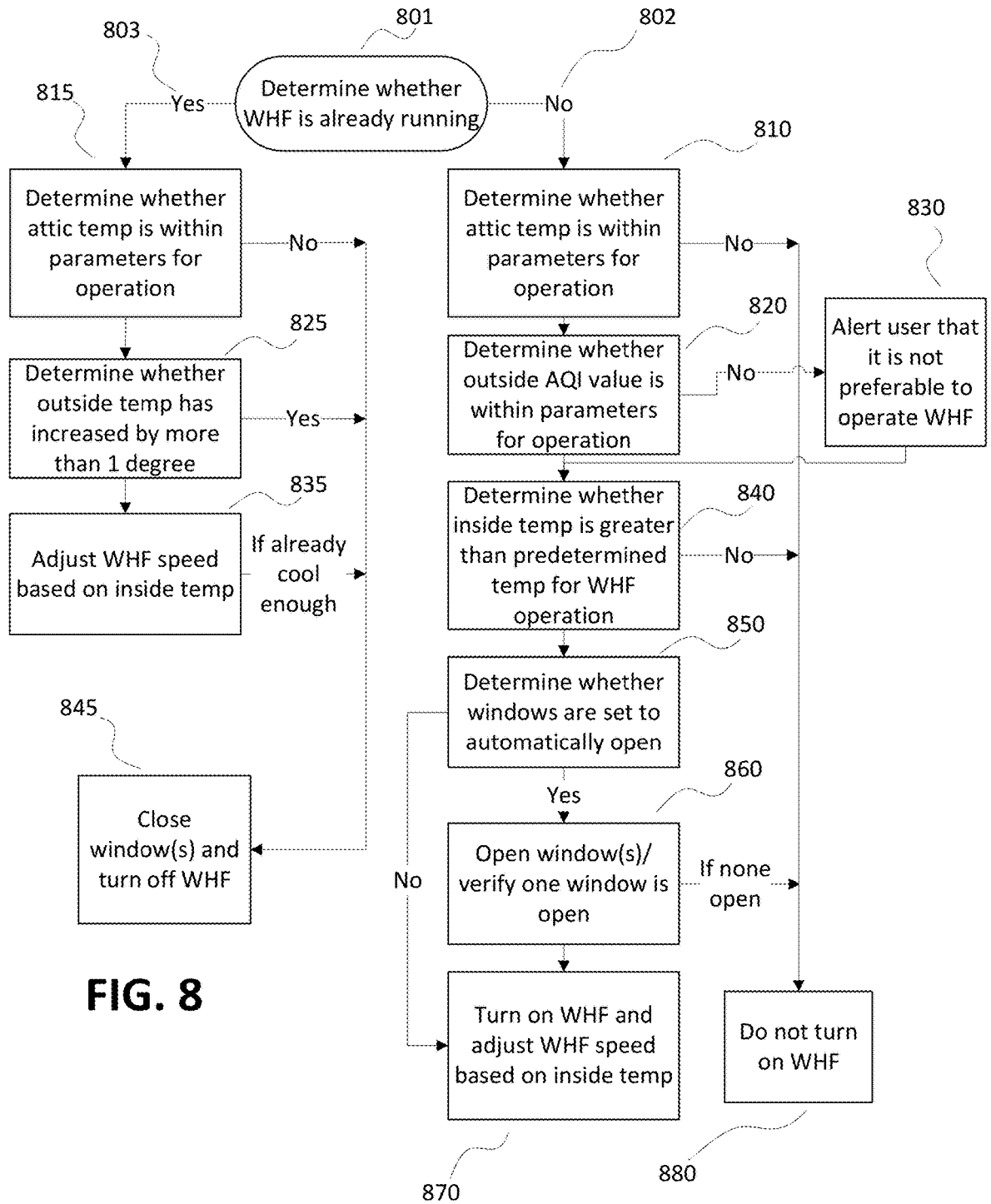
FIG. 8 is a control diagram illustrating an embodiment for operating a multifunction adaptive whole house fan system.

FIG. 8, depicts an embodiment of control logic when the fresh air cooling and ventilating system 100 is turned on and is set to operate in the semi-automatic mode by a user with the system 100 including automatic windows. The control logic illustrated in FIG. 8 can be implemented when the system 100 is initiated or controlled in the semi-automatic mode from the user device 201. In some embodiments, the control logic illustrated in FIG. 8 can be implemented when the system 100 is initiated or controlled in the semi-automatic mode from the smart phone application 220. The control logic illustrated in FIG. 8 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In fresh air control logic diagram depicted in FIG. 8, steps 801, 815, 825, 835, and 845 can correspond to steps 701, 715, 765, 775, and 785, respectively, described herein for FIG. 7. The fresh air controller 300 can perform steps 801, 815, 825, 835, and 845 in substantially the same manner as described above for steps 701, 715, 765, 775, and 785, respectively, with steps 815, 825, and 835 leading to step 845 or continuing in the logic sequence to, for example, step 835, similar to steps 715, 765, and 775 leading to step 785 or continuing in the logic sequence to, for example, step 775 as discussed herein.

In the fresh air control logic diagram depicted in FIG. 8, steps 810, 820, 840, 860, 870, and 880 can correspond to steps 710, 720, 760, 780, 790, and 792, respectively, described herein FIG. 7. The fresh air controller 300 can perform steps 810, 820, 840, and 860 in substantially the same manner as described above for steps 710, 720, 760, and 780, respectively, with steps 810, 840, and 860 leading to step 880 or continuing in the logic sequence to, for example, step 870, similar to steps 710, 760, and 780 leading to step 792 or continuing in the logic sequence to, for example, step 790 as discussed herein.

For the WHF off logic flow path 802, in some embodiments, the fresh air controller 300 can send a command signal to cause the WHF to operate for a predetermined amount of time immediately after determining the attic temperature is within parameters for operation per step 810. After the WHF runs for the predetermined amount of time, the fresh air controller 300 may proceed to step 820 to continue the control logic as discussed herein. In some embodiments, the predetermined amount of time for operation of the WHF can be 30 minutes. In some embodiments, the predetermined amount of time for operation can be 5, 10, 15, 20, 25, 30, 35, 40, 45, 50, 55, 60, or greater than 60 minutes.

As depicted in FIG. 8, some steps of the control logic for controlling the system 100 have a similar first step 801 to the embodiment illustrated in FIG. 7. In some embodiments, as depicted in FIG. 8, the fresh air controller 300 may check certain operating parameters after determining whether the WHF is already running, as shown in step 801, and following the WHF on flow path 803. For example, as depicted in FIG. 8, in some embodiments, the fresh air controller 300 may determine whether the attic temperature is with operating parameters, as shown in step 815, and whether the outside temperature has increased by more than one degree Fahrenheit, as shown in step 825. In some embodiments, as depicted in FIG. 8, after determining the attic temperature is within operating parameters, as shown in step 815 and that the outside temperature has not increased by more than one degree Fahrenheit, the fresh air controller 300 can proceed to adjusting the WHF speed based on the temperature inside the living space, as shown in step 835. In some embodiments, as depicted in FIG. 8, after determining the attic temperature is not within operating parameters, as shown in step 815, or that the outside temperature has increased by more than one degree Fahrenheit, the fresh air controller 300 can send a signal to the whole house fan controller 200 to turn off the WHF and send a signal to close the automatic windows as shown in step 845.

In some embodiments, the when the semi-automatic mode is turned off manually by the user from the smart phone application 220 and/or the user device 201, the fresh air controller 300 can clear the stored outside temperature value, send a signal to close the automatic windows, and verify the windows are closed as discussed herein.

In some embodiments, as depicted in FIG. 8, when determining whether the outside air quality index value is within operating parameters on the WHF off flow path 802, as shown in step 820, the fresh air controller 300 can send a push notification or prompt, via the smart phone application 220 and/or the user device 201, to the user if the air quality index is not within operating parameters as discussed herein (for example, for step 725), as shown in step 830. The push notification or prompt can warn, alert, or inform the user that it is not preferable to operate the WHF. After sending the push notification or prompt notifying that it is not preferable to operate the WHF, the fresh air controller may proceed step 840 to determine whether to turn the WHF on, activate, or operate based on the inside temperature. By providing for the WHF to possibly operate as discussed herein after step 830, the user may be provided with greater control over the system 100 and choice as to when to operate the fresh air cooling and ventilating system 100, despite for example, possibly an undesirable air quality index value as discussed herein.

In some embodiments, a push notification or prompt that does not turn off the WHF or prevent the system from operating can be added, in some embodiments, at any decision point of the fresh air controller 300 whether in the WHF on flow path or the WHF off flow path, or any other logic flow path utilized by the fresh air controller 300. For example, in some embodiments, when the WHF is on or when the WHF is off, the fresh air controller 300 may send a push notification or prompt, via the smart phone application 220 and/or the user device 201, alerting the user that the outside humidity is high and that it is not preferable to operate the WHF, but nonetheless, still allow the user to continue operation of the WHF.

Returning to the WHF off logic flow path 802, in some embodiments, the fresh air controller 300 can allow the user to set whether the user wants the automatic windows to be automatically opened. As depicted in FIG. 8, the fresh air controller 300 can determine whether the windows have been/are set to automatically open, as shown in step 850. If windows are not set to automatically open, as depicted in FIG. 8, the fresh air controller 300 can proceed to step 870 to turn on the WHF and adjusting the WHF speed based on the inside temperature as discussed herein (for example at various speeds based on the inside temperature value). For example, when the windows are not set to automatically open and the user has turned on the system 100 to semi-automatic mode, it may be assumed that the user has manually opened at least one window in the building structure.

If the automatic windows are set to open automatically in step 850, as depicted in FIG. 8, the fresh air controller 300 can send a command signal to cause the one or more automatic windows to open and verify at least one window is open as discussed herein, as shown in step 860. The fresh air controller 300 can perform step 860 as discussed herein for step 780, resulting in the fresh air controller 300 performing operating commands according to either step 870 of turning on the WHF and adjusting the speed or step 880 of not turning on the WHF if one or more automatic windows cannot be verified to be open. If the fresh air controller 300 determines that at least one automatic window is not open in step 860, in some embodiments, as depicted in FIG. 8, the fresh air controller 300 can cause a push notification or prompt, via the smart phone application 220 and/or the user device 201, notifying the user which automatic window is not automatically opening.

In some embodiments, the fresh air controller 300 can generate and store a stored outside temperature value corresponding to the outside temperature value received by the fresh air controller 300 during the current iteration of the logic flow path after completing the WHF on logic flow path 802 and determining that the WHF should be turned on according to step 870. The stored outside temperature value can correspond to a previous temperature value for use in the control logic in any of the modes discussed herein. The previous temperature value can be associated with a time period ago between the current iteration of the logic flow path and the next time the fresh air controller 300 generates and stores a stored outside temperature value as discussed herein. In some embodiments, the time period ago can be a predetermined time period ago, a previous time period, or a predetermined previous time period corresponding to a time when the fresh air controller 300 retained the stored/previous outside temperature value.

In some embodiments, the fresh air controller 300 can delete or clear the stored outside temperature value if, during the WHF on logic flow path 803, the fresh air controller 300 determines the WHF should be turned off according to step 845.

Figure 9A:
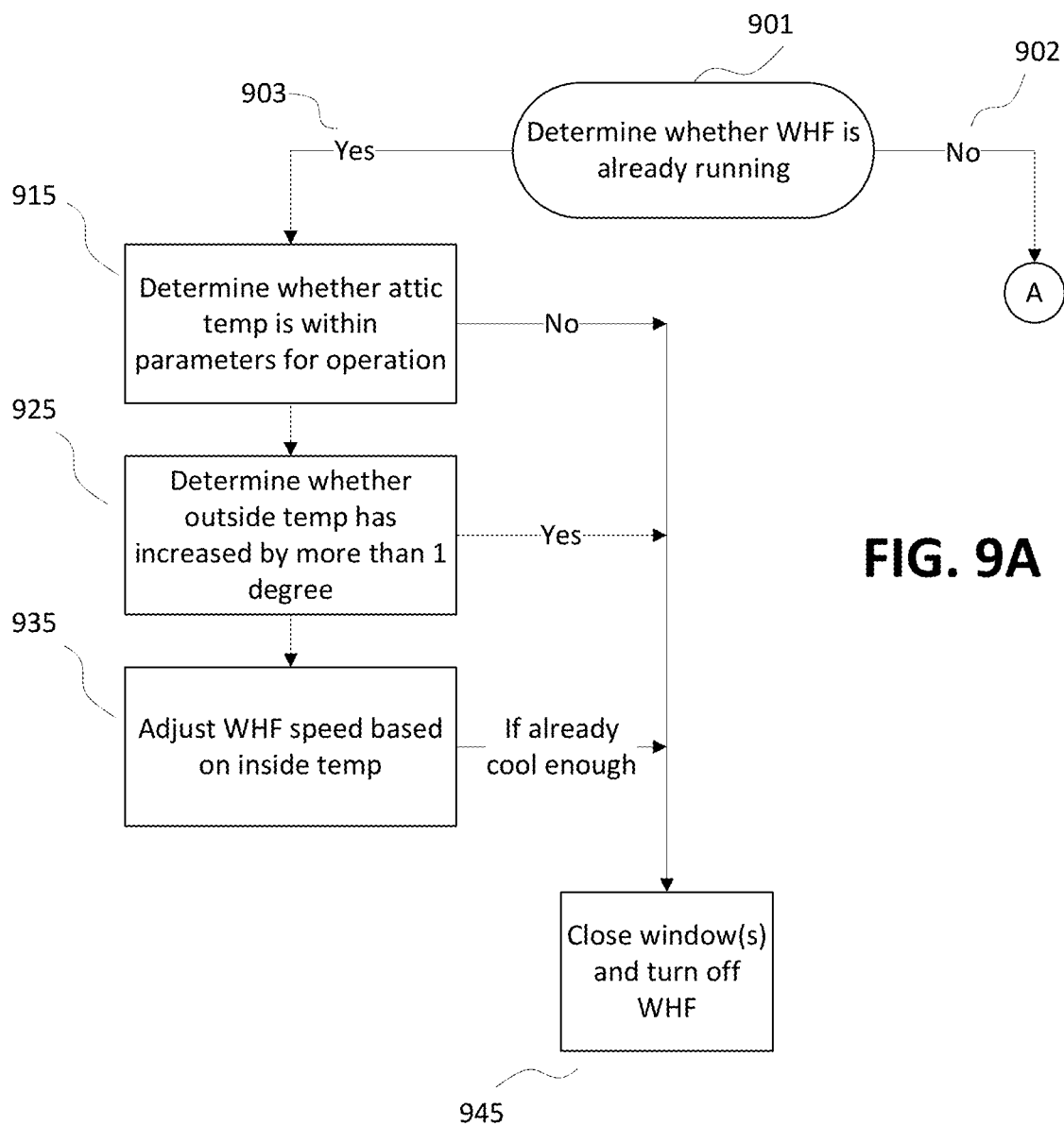

In some embodiments, as depicted in FIGS. 9A and 9B, the fresh air cooling and ventilating system 100 can be set to operate in semi-automatic mode by a user with the system 100 including automatic windows. The control logic illustrated in FIGS. 9A and 9B can be implemented when the system 100 is initiated or controlled in the semi-automatic mode, in particular, from a smart phone application 220. The control logic illustrated in FIGS. 9A and 9B can be implemented when the system 100 is initiated or controlled in the semi-automatic mode from the user device 201. The control logic illustrated in FIGS. 9A and 9B can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In fresh air control logic diagram depicted in FIG. 9A, steps 901, 915, 925, 935, and 945 can correspond to steps 701, 715, 765, 775, and 785, respectively, described herein for FIG. 7. The fresh air controller 300 can perform steps 901, 915, 925, 935, and 945 in substantially the same manner as described above for steps 701, 715, 765, 775, and 785, respectively, with steps 915, 925, and 935 leading to step 945 or continuing in the logic sequence to, for example, to step 935, similar to steps 715, 765, and 775 leading to step 785 or continuing in the logic sequence to, for example, step 775 as discussed herein.

In the fresh air control logic diagram depicted in FIG. 9B, steps 910, 920, 930, 950, 960, and 962 can correspond to steps 710, 720, 760, 780, 790, and 792, respectively, described herein for FIG. 7. The fresh air controller 300 can perform steps 920, 930, 960, and 962 in substantially the same manner as described above for steps 710, 720, 760, 790, and 792, respectively, with steps 910 and 930 leading to step 962 or continuing in the logic sequence to, for example, to step 960, similar to steps 710 and 760 leading to step 792 or continuing in the logic sequence to, for example, step 790 as discussed herein. In FIGS. 9A and 9B, the WHF off flow path 902 is connected by the circle annotated with reference alpha "A" indicating that the WHF off flow path 902 continues between FIGS. 9A and 9B.

For the WHF off flow path 902, in some embodiments, as depicted in FIG. 9B, after determining whether the outside air quality index value is within operating parameters in step 920, the fresh air controller 300 can send a prompt or push notification, via the smart phone application 220 and/or the user device 201, to the user if the air quality index is not within operating parameters as discussed herein (for example, for step 725), as shown in step 922. The prompt or push notification can query the user at step 922 if the user would still like to turn on the WHF if the air quality is not within operating parameters. If the user indicates through one of the input devices discussed herein, including the smart phone application, that the user would still like to turn the WHF on, the fresh air controller 300 can proceed to the step 930 in the WHF off flow path 902. In some embodiments, if the user indicates they would not like to turn the WHF on, the fresh air controller 300 can proceed to not turn on the WHF according to step 962. In some embodiments, the fresh air controller 300 can generate such a prompt or push notification, asking the user if they want to continue, at any step in the control logic performed by the fresh air controller 300.

After performing step 930 as discussed herein, for example, in reference to step 760, in some embodiments, the fresh air control 300 can determine in step 940 whether the automatic windows are set to automatically open on the WHF off flow path 902. If the windows are not set to automatically open, the fresh air controller 300 can send a prompt or push notification, via the smart phone application 220 and/or the user device 201 as discussed herein, to the user as shown in step 942. The prompt or push notification can query the user whether the user would like to open the automatic windows manually or automatically, as shown in step 942.

If the user indicates or provides a user input that the user would like to open the windows manually, the fresh air controller 300 can send a prompt or push notification, via the smart phone application 220 and/or the user device 201, to the user asking whether one or more windows are open, as shown in step 954. If the user indicates there is a window open, in some embodiments, the fresh air controller 300 can send a command signal to cause the WHF to turn on and adjust the WHF speed based on the temperature inside the house as discussed herein (for example at various speeds based on the inside temperature value as discussed herein for step 790), as shown in step 960. If the user indicates that there is not a window open, the fresh air controller 300 may not send a command signal to turn on the WHF, as shown in step 962.

In some embodiments, if in response to the query of step 942, the user indicates they would like to open the windows automatically, the fresh air controller, as part of step 944, can determine or receive one or more signals indicating the number of automatic windows 228A-C connected to the fresh air controller 300. If the fresh air controller 300 determines or receives a signal indicating that one automatic window 228A-C is connected the system 100 or otherwise operational, the fresh air controller 300 can proceed to step 950 as discussed herein (for example, as discussed herein for performing step 780).

If the fresh air controller 300 receives a signal indicating two or more (more than) one automatic windows 228A-C are connected to the system 100 or otherwise operational, the fresh air controller 300, as part of step 946, can cause a prompt or user notification that iterates through the two or more automatic windows to ask the user for each particular automatic window if the user would like to have that particular automatic window open automatically. For example, the fresh air controller 300 can send a signal to cause a prompt for user to indicate if the user would like to open automatic window 228A, if the user would like to open automatic window 228B, and/or if the user would like to open automatic window 228C. If the user indicates that at least one of the automatic windows is to be opened automatically, the fresh air controller 300 sends a command signal to cause to open the particular (one or more) automatic window selected to be automatically opened and verifies that the particular (one or more) automatic window is open. After verification that the particular (one or more) window is open, the fresh air controller 300 can proceed to step 960 as discussed herein.

If the particular (one or more) window selected to be automatically opened is not verified to be open, the fresh air controller 300 can cause a prompt or user notification, via for example smart phone application, indicating there was a problem opening the particular (one or more) window. If none of the automatic windows are verified to be open, the fresh air controller 300 can proceed to step 952 and cause a prompt or user notification asking the user if the user would like to run the WHF without automatic windows according to step 952 as discussed herein, proceeding to step 954 or step 962 depending the user's input as discussed herein.

If the user indicates that none of the one or more automatic windows 228A-C are to be opened automatically in response to the iterative query of step 946, the fresh air controller 300 can cause a prompt or user notification, via for example the smart phone application, indicating that no windows were selected to be open and asking the user to manually open one or more windows in the building structure. The fresh air controller 300 can proceed to step 954 and cause a prompt or user notification asking the user if there is a window open in the building structure according to step 954 as discussed herein, proceeding to step 960 or step 962 depending the user's input as discussed herein.

Returning to step 940, if at step 940 the fresh air controller 300 determines that the automatic windows are set to operate automatically, the fresh air controller 300 can proceed to the step 950 of the WHF off logic flow path 902. At step 950, the fresh air controller 300 can send a command signal to cause the automatic windows to open and verify at least one automatic window is open as discussed herein. If the fresh air controller 300 determines that at least one automatic window is open in step 950, in some embodiments, as depicted in FIG. 9B, the fresh air controller can send a command signal to turn on the WHF and adjust the WHF speed according to step 960 as discussed herein.

If the fresh air controller 300 determines that at least one automatic window is not open in step 950, in some embodiments, as depicted in FIG. 9B, the fresh air controller 300 can cause a push notification or prompt notifying the user which automatic window is not automatically opening via the smart phone application 220 and/or the user device 201. If the fresh air controller 300 determines that at least one automatic window is not open in step 950, in some embodiments, as depicted in FIG. 9B, the fresh air controller 300 can cause a push notification or prompt asking the user if they would like to run the WHF without automatic windows, as shown in step 952, via the smart phone application 220 and/or the user device 201. In some embodiments, the fresh air controller 300 can receive information indicating the user's answer or input to the question of step 952 provided by the user through either the smart phone application 220 and/or the user device 201.

If the user's answer or input to the query of step 952 indicates that user would not like to run the WHF without automatic windows, the fresh air controller 300 can cause a push notification or prompt informing the user there is an issue with one or more automatic windows and to diagnose the settings or issues for the one or more automatic windows. If the user's answer the query of step 952 indicates the user would like to run the WHF without automatic windows, the fresh air controller 300 can cause a push notification or prompt asking the user if there is an open window in the building structure, as shown in step 954, via the smart phone application 220 and/or the user device 201. The window that is open according to step 954 can be an automatic window 228A-C as discussed herein or any other manual or traditional window in the building structure. The fresh air controller 300 can receive information indicating the user's answer or input to the question of query in step 954 provided by the user through either the smart phone application and/or user device. If the user indicates at least one window is open in the building structure, the fresh air controller 300 can send a command signal to cause the WHF to turn on and adjust the WHF's speed according to the inside temperature of the building structure as discussed herein, as shown in step 960. If the user indicates there is not at least one window open in the building structure, the fresh air controller 300 will not turn on the WHF, as shown in step 962, and can cause a push notification or prompt through either the smart phone application 220 and/or the user device 201 that the WHF will not turn on because there are no windows open.

In some embodiments, the fresh air controller 300 can generate and store a stored outside temperature value corresponding to the outside ambient temperature value received by the fresh air controller 300 during the current iteration of the logic flow path after completing the WHF off logic flow path 902 and determining that the WHF should be turned on according to step 960 discussed herein. The stored outside temperature value can correspond to a previous temperature value for use in the control logic in any of the modes discussed herein. The previous temperature value can be associated with a time period ago between the current iteration of the logic flow path and the next time the fresh air controller 300 generates and stores a stored outside temperature value as discussed herein. In some embodiments, the time period ago can be a predetermined time period ago, a previous time period, or a predetermined previous time period corresponding to a time when the fresh air controller 300 retained the stored/previous outside temperature value.

In some embodiments, the fresh air controller 300 can delete or clear the stored outside temperature value if, during the WHF on logic flow path 903, the fresh air controller 300 determines the WHF should be turned off according to step 945 discussed herein.

Figure 10:
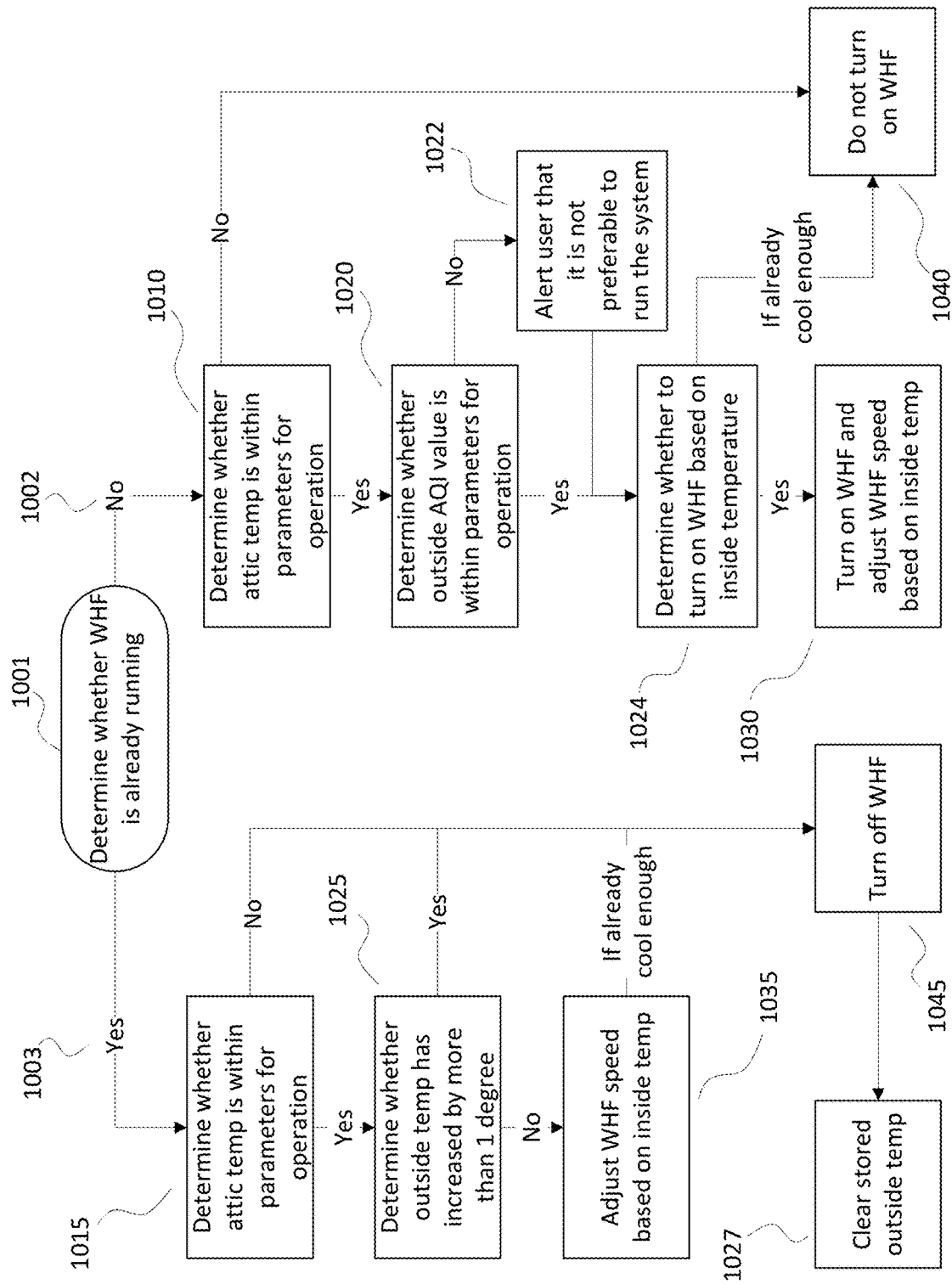
FIG. 10 is a control diagram illustrating an embodiment for operating a multifunction adaptive whole house fan system.

In some embodiments, as depicted in FIG. 10 the fresh air cooling and ventilating system 100 can be set to operate in a semi-automatic mode by a user with the system 100 not having or not being connected to automatic windows such as, for example, automatic windows 228A-C discussed herein, including when one or more of the automatic windows are not working or functioning properly. The control logic illustrated in FIG. 10 can be implemented when the system 100 is initiated or controlled in the semi-automatic mode from the smart phone application 220 and/or user device 201. The control logic illustrated in FIG. 10 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In fresh air control logic diagram depicted in FIG. 10, steps 1001, 1015, 1025, and 1035 can correspond to steps 701, 715, 765, and 775, respectively, described above in FIG. 7. The fresh air controller 300 can perform steps 1001, 1015, 1025, and 1035 in substantially the same manner as described above for steps 701, 715, 765, and 775, respectively, with steps 1015, 1025, and 1035 leading to step 1045 (without closing windows) or continuing in the logic sequence to, for example, step 1035, similar to steps 715, 765, and 775 leading to step 785 or continuing in the logic sequence to, for example, step 775 as discussed herein.

In the fresh air control logic diagram depicted in FIG. 10 steps 1010, 1020, 1030, and 1040 can correspond to steps 710, 720, 790, and 792, respectively described above in FIG. 7. The fresh air controller 300 can perform steps 1010, 1020, 1030, and 1040 in substantially the same manner as described above for steps 710, 720, 790, and 792, respectively, with steps 1010 and 1020 leading to step 1040 or continuing in the logic sequence to, for example, step 1030, similar to steps 710 and 720 leading to step 792 or continuing in the logic sequence to, for example, step 790 as discussed herein.

For the WHF off logic flow path 1002, in some embodiments, the fresh air controller 300 can send a command signal to cause the WHF to operate for a predetermined amount of time immediately after determining the attic temperature is within parameters for operation per step 1010. After the WHF runs for the predetermined amount of time, the fresh air controller 300 may proceed to step 1020 to continue the control logic as discussed herein. In some embodiments, the predetermined amount of time for operation of the WHF can be 30 minutes. In some embodiments, the predetermined amount of time for operation can be 5, 10, 15, 20, 25, 30, 35, 40, 45, 50, 55, 60, or greater than 60 minutes.

As depicted in FIG. 10, some steps of the control logic for controlling the system 100 have a similar first step 1001 to the embodiment illustrated in FIG. 7. In some embodiments, as depicted in FIG. 10, the fresh air controller 300 may check certain operating parameters after determining the WHF is already running, as shown in step 1001, and following the WHF on flow path 1003. For example, as depicted in FIG. 10, in some embodiments the fresh air controller 300 may determine whether the attic temperature is within operating parameters, as shown in step 1015, and whether the outside temperature has increased by more than one degree Fahrenheit, as shown in step 1025. In some embodiments, as depicted in FIG. 10, after determining the attic temperature is within operating parameters, as shown in step 1015 and that the outside temperature has not increased by more than one degree Fahrenheit, the fresh air controller 300 can proceed to adjusting the WHF speed based on the temperature inside the living space, as shown in step 1035. In some embodiments, as depicted in FIG. 10, after determining the attic temperature is not within operating parameters, as shown in step 1015, or that the outside temperature has increased by more than one degree Fahrenheit, the fresh air controller 300 can send a send a command/operation signal to the whole house fan controller 200 to turn off the WHF as shown in step 1045. In some embodiments, after turning off the WHF, the fresh air controller 300 as shown in step 1027 can delete or clear the stored outside temperature value generated at the end of the WHF off flow path 1002, as described herein.

For the WHF off logic flow path 1002, in some embodiments, as depicted in FIG. 10, when determining whether the outside air quality index value is within operating parameters, as shown in step 1020, the fresh air controller 300 can send a push notification or prompt, via the smart phone application 220 and/or the user device 201, to the user if the air quality index is not within operating parameters as discussed herein (for example, for step 725), as shown in step 1022. The push notification or prompt can warn, alert, or inform the user that it is not preferable to operate the WHF. After sending the push notification or prompt notifying that it is not preferable to operate the WHF, the fresh air controller may proceed step 1024 to determine whether to turn the WHF on based on the inside temperature. By providing for the WHF to possibly operate as discussed herein after step 1022, the user may be provided with greater control over the system 100 and choice as to when to operate the fresh air cooling and ventilating system 100, despite for example, possibly an undesirable air quality index value as discussed herein.

For step 1024, if the fresh air controller determines the inside temperature is less than a predetermined value and is already cool enough, the fresh air controller 300 may proceed to step 1040 and will not turn on the WHF. If the fresh air controller 300 determines that the inside temperature is greater than the predetermined value, the fresh air controller 300 can proceed to step 1030 and adjust the WHF speed based on the inside temperature.

In some embodiments, the fresh air controller 300 can determine whether to turn the WHF on based on the first predetermined inside temperature as discussed herein. For example, the first predetermined inside temperature to which the fresh air controller 300 can compare the inside temperature to is the lowest predetermined temperature. In some embodiments, the fresh air controller 300 can proceed to step 1040 to not turn on the WHF when the inside temperature value is lower than the lowest predetermined inside temperature value. In some embodiments, the fresh air controller 300 can proceed to step 1030 to turn on the WHF and adjust the speed based on the inside temperature as discussed herein when the inside temperature value is greater than the lowest predetermined inside temperature value. In some embodiments, the first predetermined inside temperature can be the predetermined inside temperature value for WHF operation discussed herein with reference to step 760. In some embodiments, the predetermined inside temperature values to which the inside temperature is compared to can be set by the user utilizing the user device and/or smart phone application, or by the manufacturer or the system of the person installing the system or any combination of the above. This can help to not turn on, activate, or keep running the WHF if the building structure is already cooler than the user would like it to be.

Figure 11:
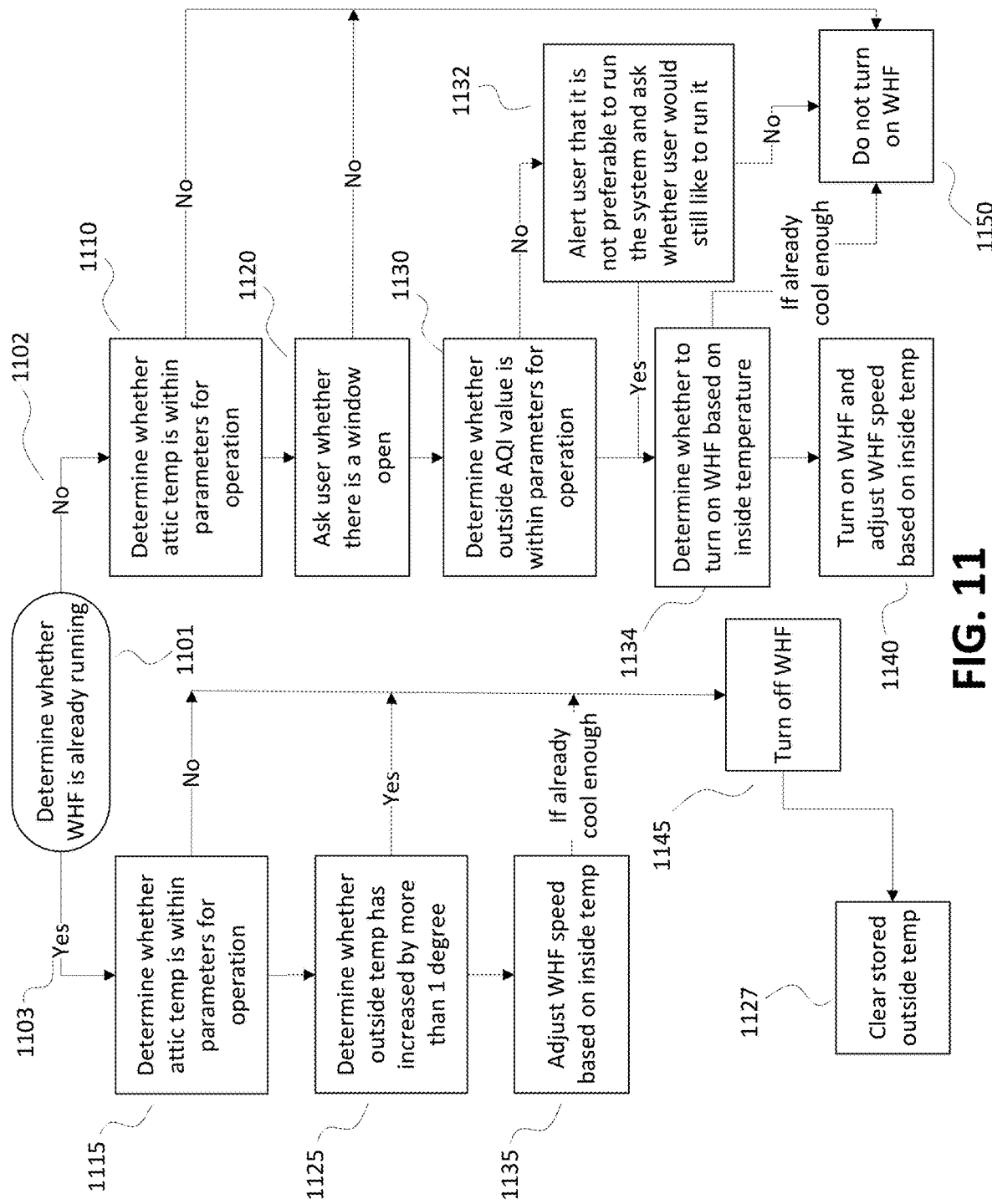
FIG. 11 is a control diagram illustrating an embodiment for operating a multifunction adaptive whole house fan system.

In some embodiments, as depicted in FIG. 11 the fresh air cooling and ventilating system 100 can be set to operate in a semi-automatic mode by a user with the system 100 not having or not being connected to automatic windows such as, for example, automatic windows 228A-C as discussed herein, including when one or more of the automatic windows are not working or functioning properly. The control logic illustrated in FIG. 11 can be implemented when the system 100 is initiated or controlled in the semi-automatic mode, in particular, from the smart phone application 220. The control logic illustrated in FIG. 11 can be implemented when the system 100 is initiated or controlled in the semi-automatic mode from the user device 201. The control logic illustrated in FIG. 11 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In fresh air control logic diagram depicted in FIG. 11, steps 1101, 1115, 1125 and 1135 can correspond to steps 701, 715, 765, and 775, respectively, described herein for FIG. 7. The fresh air controller 300 can perform steps 1101, 1115, 1125, and 1135 in substantially the same manner as described above for steps 701, 715, 765, and 775, respectively, with steps 1115, 1125, and 1145 leading to step 1145 (without closing windows) or continuing in the logic sequence to, for example, step 1135, similar to steps 715, 765, and 775 leading to step 785 as described herein or continuing in the logic sequence to, for example, step 775 as discussed herein.

In the fresh air control logic diagram depicted in FIG. 11, steps 1110, 1130, 1140, and 1150 can correspond to steps 710, 720, 790, and 792, respectively, described herein for FIG. 7. The fresh air controller 300 can perform steps 1110, 1130, 1140, and 1150 in substantially the same manner as described above for steps 710, 720, 790, and 792, respectively, with steps 1110 and 1130 leading to step 1150 or continuing in the logic sequence to, for example, step 1140, similar to steps 710 and 720 leading to step 792 or continuing in the logic sequence to, for example, step 790 as discussed herein.

In the fresh air control logic diagram depicted in FIG. 11, step 1134 can correspond to step 1024 described herein for FIG. 10. The fresh air controller 300 can perform step 1134 in substantially the same manner as described above for step 1024, with step 1134 leading to step 1140 or 1150 similar to step 1024 leading to step 1030 or 1040, respectively.

As depicted in FIG. 11, some steps of the control logic for controlling the system 100 have a similar first step 1101 to the embodiment illustrated in FIG. 7. In some embodiments, as depicted in FIG. 11, the fresh air controller 300 may check certain operating parameters after determining the WHF is already running, as shown in step 1101, and following the WHF on flow path 1103. For example, as depicted in FIG. 11, in some embodiments the fresh air controller 300 may determine whether the attic temperature is within operating parameters, as shown in step 1115, and whether the outside temperature has increased by more than one degree Fahrenheit, as shown in step 1125. In some embodiments, as depicted in FIG. 11, after determining the attic temperature is within operating parameters, as shown in step 1115 and that the outside temperature has not increased by more than one degree Fahrenheit, the fresh air controller 300 can proceed to adjusting the WHF speed based on the temperature inside the living space, as shown in step 1135. Alternatively, in some embodiments, as depicted in FIG. 11, after determining the attic temperature is not within operating parameters, as shown in step 1115, or that the outside temperature has increased by more than one degree Fahrenheit, the fresh air controller 300 can send a send a command/operation signal to the whole house fan controller 200 to turn off the WHF as shown in step 1145. In some embodiments, after turning off the WHF, the fresh air controller 300 can, as shown in step 1127 delete or clear the stored outside temperature value generated at the end of the WHF off flow path 1102, as described herein.

On the WHF off logic flow path 1102, in some embodiments, as depicted in FIG. 11, after determining the attic temperature is within parameters for operation, as shown in step 1110, the fresh air controller 300 can send a push notification or prompt, via the smart phone application 220 and/or the user device 201 asking the user whether there is a window open in the building structure, as shown in step 1120. If the user indicates there is not a window open, the fresh air controller 300 can proceed to step 1150 and not turn on the WHF. If the user indicates there is a window open in the building structure, the fresh air controller 300 can proceed to the step 1130 in the WHF off logic flow path 1102.

In some embodiments, as depicted in FIG. 11, when determining whether the outside air quality index value is within operating parameters on the WHF off flow path 1102, as shown in step 1130, the fresh air controller 300 can send a push notification or prompt, via the smart phone application 220 and/or the user device 201, to the user if the air quality index is not within operating parameters as discussed herein (for example, for step 725), as shown in step 1132. The push notification or prompt can warn or inform the user that it is not preferable to operate the WHF. The prompt or push notification can query the user at step 1132 if the user would still like to still turn on the WHF if the air quality is not within operating parameters. If the user indicates through one of the input devices discussed herein, including the smart phone application, that the user would still like to turn the WHF on, the fresh air controller 300 can proceed to the step 1134 in the WHF off flow path 1102. In some embodiments, if the user indicates that they would not like to turn the WHF on, the fresh air controller 300 can proceed to not turn on the WHF according to step 1150. In some embodiments, the fresh air controller 300 can generate such a prompt or push notification, asking the user if they want to continue, at any step in the control logic performed by the fresh air controller 300. By providing for the WHF to possibly operate as discussed herein after step 1132, the user may be provided with greater control over the system 100 and choice as to when to operate the fresh air cooling and ventilating system 100, despite for example, possibly an undesirable air quality index value as discussed herein.

In some embodiments, in the fresh air control diagram depicted in FIG. 11, step 1132 can correspond to step 922, described above in FIG. 9B. The fresh air controller 300 can perform step 1132 in substantially the same manner as described above for step 922 with step 1132 leading to step 1150 or continuing in the logic sequence to, for example, step 1140, similar to step 922 leading to step 962 or continuing in the logic to, for example, step 960.

In some embodiments, after turning on the system 100 and adjusting the WHF speed after completing an iteration of the WHF off logic path 1102, the fresh air controller 300 can store the stored outside temperature value corresponding to the outside temperature the fresh air controller received during the iteration of the WHF off logic path 1102.

In some embodiments, when semi-automatic mode is turned off manually either from the user device 201, switch 432, and/or smart phone application 220, the fresh air controller 300 can delete or clear the stored outside temperature value.

Figure 12:
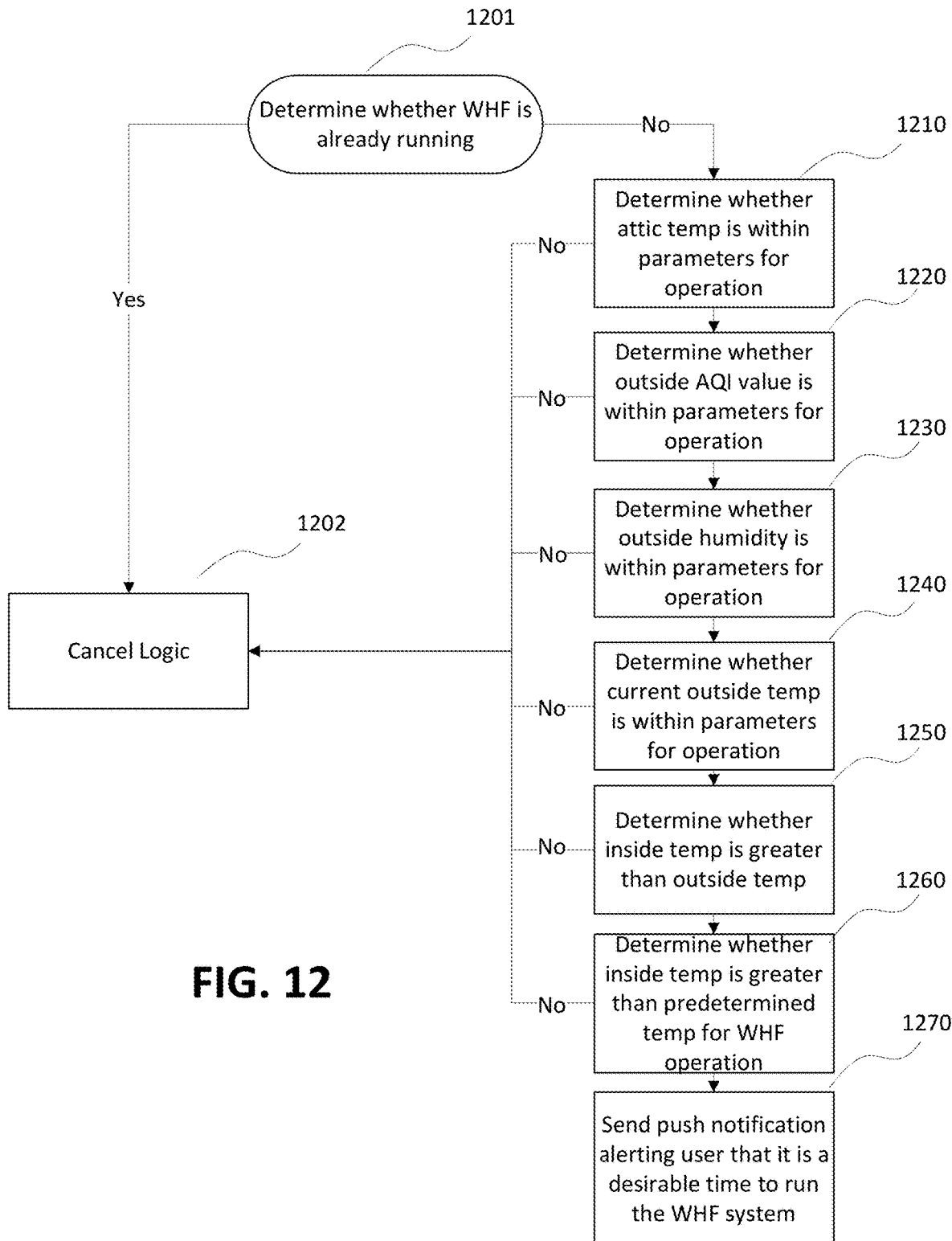
FIG. 12 is a control diagram illustrating an embodiment for operating a push notification or prompt system as part of a multifunction adaptive whole house fan system.

FIG. 12 depicts an embodiment of control logic for sending a push notification or prompt to the user to, for example, alert the user that it may an ideal or desired time to operate the WHF 102. The fresh air controller 300 can cause a push notification or prompt to the smart phone application 220 and/or the user device 201. The control logic illustrated in FIG. 12 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

Steps 1201, 1210, 1220, 1230, 1240, 1250, and 1260 of FIG. 12 can correspond to steps 701, 715, 725, 735, 745, 755, and 760, respectively, as described herein for FIG. 7. The fresh air controller 300 can perform steps 1201, 1210, 1220, 1230, 1240, 1250, and 1260 in substantially the same manner as described above for steps 701, 715, 725, 735, 745, 755, and 760, respectively.

As depicted in FIG. 12 some embodiments of the push notification logic flow of the fresh air cooling and ventilating system 100 have a similar first 1201 step to the embodiment of the control logic for controlling the system 100 depicted in FIG. 7. In some embodiments, as depicted in FIG. 12, the fresh air controller 300 may check certain operating parameters after determining the WHF 102 is not running. For example, after determining the WHF 102 is not running, the fresh air controller 300 can determine whether the attic temperature is within the parameters for operation as show in step 1210. The fresh air controller 300 can determine whether the air quality index value is within parameters for operation as shown in step 1220. If both the attic temperature and air quality index are within parameters for operation, the fresh air controller 300 can determine whether the outside humidity is within parameters for operation as shown is step 1230 and determine whether the current outside temp is within parameters for operation as shown in step 1240. As shown in FIG. 12, in some embodiments, if both the outside humidity and the outside temperature are within parameters for operation, the fresh air controller 300 can, for example, determine whether the inside temperature is greater than the outside temperature by comparing temperature values received for both the inside and outside temperatures as shown in step 1250. If the fresh air controller 300 determines the inside temperature is greater than the outside temperature as shown in step 1250, the fresh air controller can proceed to the step 1260 in the push notification logic flow and determine whether the inside temperature is greater than a predetermined temperature. If for each of steps 1210, 1220, 1230, and 1240 the fresh air controller 300 determines the parameters are within the parameters for operation, and the fresh air controller 300 determines the inside temperature is great than the outside temperature as shown in step 1250 and that the inside temperature is greater than a predetermined value as shown in step 1260, the fresh air controller 300 can send a push notification or prompt alerting the user that it is a desirable, ideal, or optimum time to run the WHF or system as shown in step 1270. The push notification or prompt can be sent to the smart phone application 220 and/or the user device 201.

If at any of steps 1210, 1220, 1230, and 1240, the fresh air controller 300 determines that the parameter is not within the operating parameters or if the fresh air controller 300 determines that the inside temperature is not higher than the outside temperature as shown in step 1250 or if the fresh air controller determines the inside temperature is below a predetermined temperature as shown in step 1260, the fresh air controller 300 can cancel the control logic, as shown in step 1202 and a push notification or prompt will not be sent to possibly operate the WHF or system. The fresh air controller 300 will also cancel the control logic if the fresh air controller 300 determines the WHF 102 is already running or operating as shown in step 1201.

The control logic and function of FIG. 12 ensures that the user can be notified when it is an ideal or desired time to use the system. Thus, if the system 100 is not operating in automatic mode, there is a greater likelihood that the user will utilize the fresh air cooling and ventilating system 100 as opposed to an alternative system such as the air conditioning system to cool the building structure, possible achieving more of the cost and health benefits associated with operating the system 100.

In some embodiments, steps 1201, 1210, 1220, 1230, 1240, 1250 and 1260 can be reordered or removed. The fresh air controller 300 can operate the push notification or prompt control logic in a variety of different configurations performing only a select number of the steps shown in FIG. 12 before sending a push notification or prompt to the user. For example, in some embodiments, the fresh air controller 300 can perform step 1201, proceed to step 1250 skipping steps 1210, 1220, 1230, and 1240, and then perform step 1270, skipping step 1260.

Figure 13:
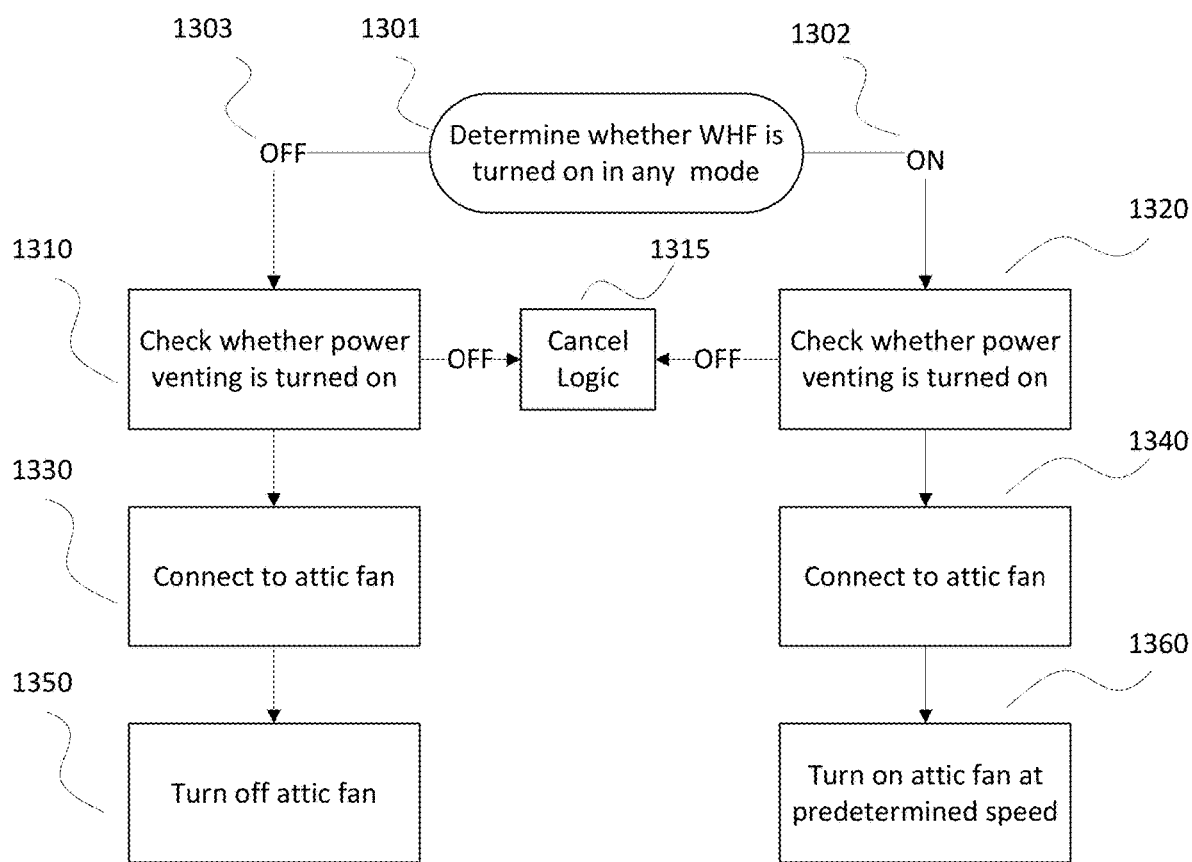
FIG. 13 is a control diagram illustrating an embodiment for operating a powering venting system as part of a multifunction adaptive whole house fan system.

FIG. 13 depicts an embodiment of a diagram of control logic for controlling the operation of a ventilation fan 118 in a system 100 where a ventilation fan 118 is part of the system as discussed herein. The control logic illustrated in FIG. 13 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

As described above, attic ventilation fans 118 can facilitation the expulsion of air 120 from the attic space. While the motorized fan or whole house fan 102 can expel air out of the attic space, the addition of ventilation fans 118 can increase the efficiency with which air is pushed out of the attic space thus allowing air from the living or interior space to be more easily pulled into the attic by the WHF 102. In some embodiments, there can be one ventilation fan or there can be multiple (one or more ventilation fans).

In some embodiments, the user can select whether or not the ventilation fan(s) 118 is utilized by the fresh air system 100 using the switch 432, user device 201, and/or smart phone application 220.

In some embodiments, as depicted in FIG. 13 at step 1301, the fresh air controller 300 can receive a signal from the whole house fan controller 200 or the WHF 102 indicating whether or not the WHF 102 is turned on.

In some embodiments, as depicted in FIG. 13, the fresh air controller 300 may take certain steps after determining the WHF 102 is turned off and following the WHF off logic flow path 1303. For example, the fresh air controller 300 can check whether power venting has been turned on by the user, as shown in step 1310. If power venting is turned off, the fresh air controller 300 can cancel the ventilation fan control logic. If the fresh air controller 300 determines power venting is turned on, the fresh air controller can proceed to the step 1330 in the WHF off logic flow path 1303. The fresh air controller 300 can connect via a wireless or wired connection (discussed herein such as Bluetooth) to the ventilation fan 118 and/or ventilation fan controller 224, as show in step 1330, and send a command signal to turn off the ventilation fan 118, as shown in step 1350. In some embodiments, the fresh air controller 300 can connect to the ventilation fan 118 and/or ventilation fan controller 224 through a wired connection, or through a Wi-Fi network, or by any other connection means known to those of skill in the art. In some embodiments, the steps of 1330 and 1340 may be omitted in the control logic if the system 100, including with the fresh air controller 300, maintains a connections with the ventilation fan while performing any of the control logic modes discussed herein.

As depicted in FIG. 13, in some embodiments, where the fresh air controller 300 receives a signal indicating the WHF 102 is currently operating or turned on, the fresh air controller 300 can take certain steps following the WHF on logic flow path 1302. The fresh air controller 300 can determine whether power venting is turned on, as show in step 1320. If the fresh air controller 300 determines power venting is turned off, the fresh air controller 300 can cancel the control logic, as show in step 1315 as described above. If the fresh air controller 300 determines that power venting is turned on, the fresh air controller 300 can connect via a wireless or wired connection (discussed herein such as Bluetooth) to the ventilation fan 118 and/or ventilation fan controller 224, as shown in step 1340, and send a command/operation signal to the ventilation fan 118 and/or ventilation fan controller 224 to turn on the ventilation fan, as shown in step 1360, and instructing the ventilation fan to operate at a predetermined speed. In some embodiments, the fresh air controller 300 can connect to the ventilation fan through a wired connection, or through a Wi-Fi network, or by any other connection means known to those of skill in the art.

The speed at which the ventilation fan operates can correspond to a speed selected by the user or one set by either the manufacturer or the installer of the fresh air cooling and ventilating system 100. Alternatively, the fresh air controller 300 can send a command/operation signal causing the ventilation fan controller 224 to operate the ventilation fan 118 at different speeds. For example, in some embodiments the ventilation fan controller 224 or ventilation fan 118 can operate at different speeds depending on the speed of the WHF 102. Alternatively, in some embodiments, the ventilation fan 118 can operate at different speeds depending on other variable or parameters discussed herein such as outside temperature and/or inside temperature.

Figure 14:
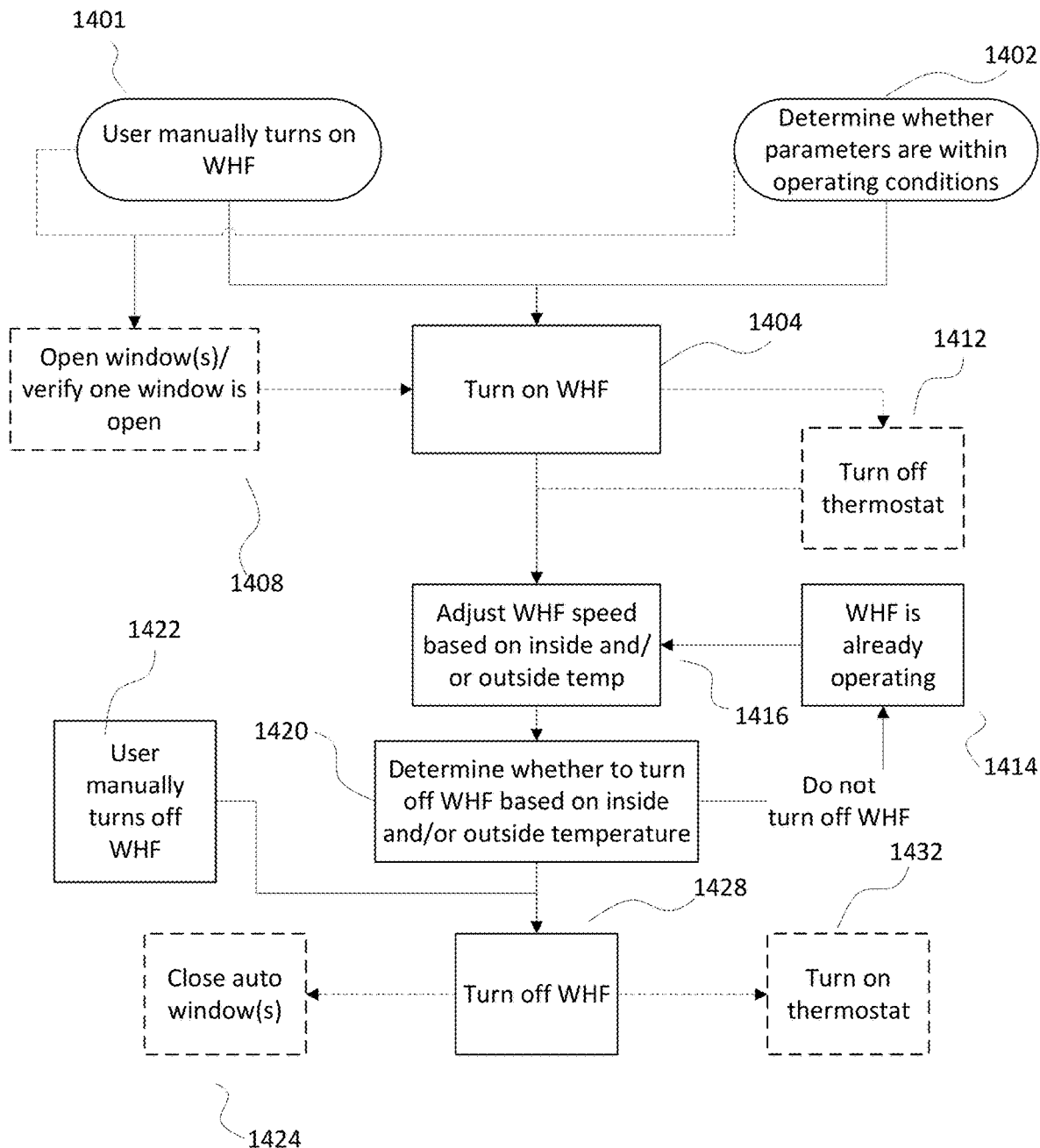
FIG. 14 is a control diagram illustrating an embodiment for operating a multifunction adaptive whole house fan system.

FIG. 14 depicts an embodiment of a diagram of control logic for controlling the operation of the WHF 102 where a WHF 102 is part of the system 100 and where the system 100 is set to operate in either automatic mode or semi-automatic mode. The fresh air controller 300 can run the control logic of FIG. 14 iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In some embodiments, as depicted in FIG. 14 at step 1404 the fresh air controller 300 can send a signal or command to the whole house fan controller 200 to turn on the WHF in response to the user manually turning on the WHF using the switch 432, user device 201, and/or smart phone application 220, as depicted in step 1401. When the system 100 is set to run in semi-automatic or automatic mode after determining parameters are within operating conditions as depicted in step 1402, the fresh air controller 300 can turn on the WHF.

In determining whether or not the parameters are within operating conditions, as depicted in step 1402, the fresh air controller 300 can receive values corresponding conditions inside and outside the building structure and compare them to operating parameters as discussed herein. For example, the fresh air controller 300 can determine whether the attic temperature, Air Quality Index, outside humidity, current outside temperature, and inside temperature are all within operating parameters in the same manner as steps 710, 720, 730, 740, and 760, respectively of FIG. 7 discussed herein. As part of step 1402, the fresh air controller 300 can also determine whether the inside temperature is greater than the outside temperature in the same manner as step 750 of FIG. 7 discussed herein.

As part of proceeding to step 1404, the fresh air controller can optionally perform step 1408 to open and/or verify one or more windows are open, for example, prior to proceeding to step 1404. The dashed lines linking steps 1408 to the rest of the control logic diagram depicted in FIG. 14 indicate that step 1408 is additional logic or feature that does not need to be performed by the fresh air controller 300. Either upon manufacture/initial programming by the installer or by input from the user, the system 100 can be configured to utilize step 1408 of the control logic or configured not to do so. In some embodiments, the user can control whether step 1408 is performed by utilizing the switch 432, user device 201, and/or smart phone application 220. Step 1408 can correspond to step 780 and can be performed in the same manner as step 780 of FIG. 7.

After sending a signal or command to turn on the WHF 102, the fresh air controller can proceed to step 1416 and adjust the WHF speed based on the temperature inside the building structure and/or the temperature outside the building structure. The adjustment of the WHF speed as depicted is step 1416 can correspond to step 775 of FIG. 7 and step 1416 can be performed in substantially the same manner as step 775.

In some embodiments, the adjustment of the WHF speed depicted in step 1416 can be based on the temperature outside the building structure. Where the fresh air controller 300 adjusts the WHF speed based on the temperature outside the building structure, the fresh air controller 300 can compare the inside temperature value to a first, second, and third predetermined outside temperature values. For example, if the outside temperature value is between the first and second predetermined outside temperature values, the fresh air controller 300 can send a command signal to operate the WHF 102 at a first speed. If the outside temperature value is between the second and third predetermined outside temperature values, the fresh air controller 300 can send a command signal to operate WHF 102 at a second speed. If the outside temperature value is greater than the third predetermined outside temperature value, the fresh air controller 300 can send a command signal to operate the WHF 102 at a third speed.

In some embodiments, the first, second, and third WHF speeds correspond to a low, a medium, and a high speed, respectively. In some embodiments, the WHF is not limited to three speeds, but instead can have 1 speed, 2 speeds, 4 speeds, 6 speeds, or any number of speeds. In some embodiments, the number of speeds corresponds to the number of predetermined values to which the fresh air controller 300 can compare the outside temperature of the building structure such that, for example, the number of speeds is equal to the number of predetermined temperature values.

In some embodiments, the first predetermined outside temperature to which the fresh air controller 300 can compare the outside temperature to is the lowest predetermined temperature. In some embodiments, the fresh air controller 300 can send a command signal to turn off the WHF and close the automatic windows when the outside temperature value is lower than the lowest predetermined outside temperature value. In some embodiments, the predetermined outside temperature values to which the outside temperature is compared to can be set by the user utilizing the user device and/or smart phone application, or by the manufacturer or the system of the person installing the system or any combination of the above. This can help to not turn on, activate, or keep running the WHF if the building structure is already cooler than the user would like it to be.

As part of proceeding to step 1416, the fresh air controller can optionally perform step 1412, for example, prior to proceeding to step 1416. The dashed lines linking step 1412 to the rest of the control logic diagram depicted in FIG. 14 indicate that step 1412 is additional logic or feature that does not need to be performed by the fresh air controller 300. Either upon manufacture/initial programming by the installer or by input from the user, the system 100 can be configured to utilize step 1412 of the control logic or configured not to do so. In some embodiments, the user can control whether step 1412 is performed by utilizing the switch 432, user device 201, and/or smart phone application 220. Step 1412 can correspond to step 770 in FIG. 7 and can be performed in the same manner as step 770.

After adjusting the WHF speed as depicted in step 1416, the fresh air controller 300 can determine whether to turn off the WHF 102 based on the inside temperature of the building structure and/or the outside temperature of the building structure as depicted in step 1420. In order to determine whether to turn off the WHF 102 the fresh air controller can receive a value corresponding to the present air temperature outside the building structure. The fresh air controller can also store a value corresponding to the air temperature outside of the building structure at a previous time. For example, the previous time could be the time at which a previous iteration of the control logic was run or the outside temperature at the time the WHF 102 was turned on.

The fresh air controller 300 can compare the current outside temperature value to the previous outside temperature value and send a command or signal to cause the WHF 102 to turn off where the current outside temperature value is greater than the previous outside temperature value by a predetermine value. The predetermined value can be preset by the manufacturer or set by the installer or set the use the switch 432, user device 201, and/or smart phone application 220. In some embodiments, in step 1420, the fresh air controller 300 can perform the following comparisons in addition or in place of the above described comparison. In some embodiments, the fresh air controller 300 can perform any combination of the comparisons described above and below in any order as part of step 1420.

The fresh air controller 300 can compare the current inside temperature value to the previous inside temperature value and send a command or signal to cause the WHF 102 to turn off where the current inside temperature value is greater than the previous inside temperature value by a predetermine value. The predetermined value can be preset by the manufacturer or set by the installer or set the use the switch 432, user device 201, and/or smart phone application 220. In some embodiments, in step 1420, the fresh air controller 300 can perform the following comparisons in addition or in place of the above described comparison. In some embodiments, the fresh air controller 300 can perform any combination of the comparisons described above and below in any order as part of step 1420.

In some embodiments, in step 1420, the fresh air controller 300 can compare the current outside temperature to a predetermined maximum outside temperature value. Where the outside temperature value is greater than the predetermined maximum outside temperature value, the fresh air controller 300 can send a signal or command to turn off the WHF 102. The predetermined maximum outside temperature value can be preset by the manufacturer or set by the installer or set the use the switch 432, user device 201, and/or smart phone application 220.

In some embodiments, in step 1420, the fresh air controller 300 can compare the current outside temperature value to a predetermined minimum outside temperature value. The predetermined minimum outside temperature value can correspond to the first predetermined temperature as discussed herein for outside temperatures. Where the outside temperature is less than the predetermined minimum outside temperature value, the fresh air controller 300 can send a signal or command to turn off the WHF 102. The predetermined minimum temperature value can be preset by the manufacturer or set by the installer or set the use the switch 432, user device 201, and/or smart phone application 220.

In some embodiments, in step 1420, the fresh air controller 300 can compare the current inside temperature value to a predetermined maximum inside temperature value. Where the inside temperature is greater than the predetermined maximum inside temperature value, the fresh air controller 300 can send a signal or command to turn off the WHF 102. The predetermined maximum inside temperature value can be preset by the manufacturer or set by the installer or set the use the switch 432, user device 201, and/or smart phone application 220.

In some embodiments, in step 1420, the fresh air controller 300 can compare the current inside temperature value to a predetermined minimum inside temperature value. The predetermined minimum inside temperature value can correspond to the first predetermined temperature as discussed herein for inside temperatures. Where the inside temperature is less than the predetermined minimum inside temperature value, the fresh air controller 300 can send a signal or command to turn off the WHF 102. The predetermined minimum inside temperature value can be preset by the manufacturer or set by the installer or set the use the switch 432, user device 201, and/or smart phone application 220.

In some embodiments, step 1420 can correspond to steps 745, 755, and 765 of FIG. 7. The fresh air controller 300 can perform step 1420 in substantially the same manner as described above for steps 745, 755, and 765 with steps 745 and 755 leading to step 765. In some embodiments step 1420 corresponds to only one of steps 745, 755, or 765. In some embodiments, step 1420 can correspond to any combination of steps 745, 755, and 765.

Where the fresh air controller 300 determines the WHF 102 should not be turned off at step 1420, the fresh air controller can iteratively repeat steps 1416 and 1420 until the fresh air controller 300 determines the WHF 102 should be turned off, as depicted in step 1414, or the user manually turns off the WHF as depicted in step 1422. The user can turn off the WHF utilizing the use the switch 432, user device 201, smart phone application 220.

Where the fresh air controller 300 determines the WHF 102 should be turned off (and in some embodiments, where the user manually turns off the WHF), the fresh air controller 300 can send a signal or command turning off the WHF 102. After or at the same time as sending a signal or command turning off the WHF 102 as depicted in step 1428, the fresh air controller can optionally perform steps 1424 and/or 1432 (as depicted by dashed lines in FIG. 14). Step 1424 can correspond to step 785 and can be performed in the same manner as step 785 of FIG. 7. As depicted in step 1432 the fresh air controller 300 can send a signal or command to turn on a thermostat connected to the system 100 thereby allowing climate of the building structure to be conditioned by an air conditioning system instead of the fresh air system 100 when conditions are not optimal or desired for the WHF operation.

Figure 15:
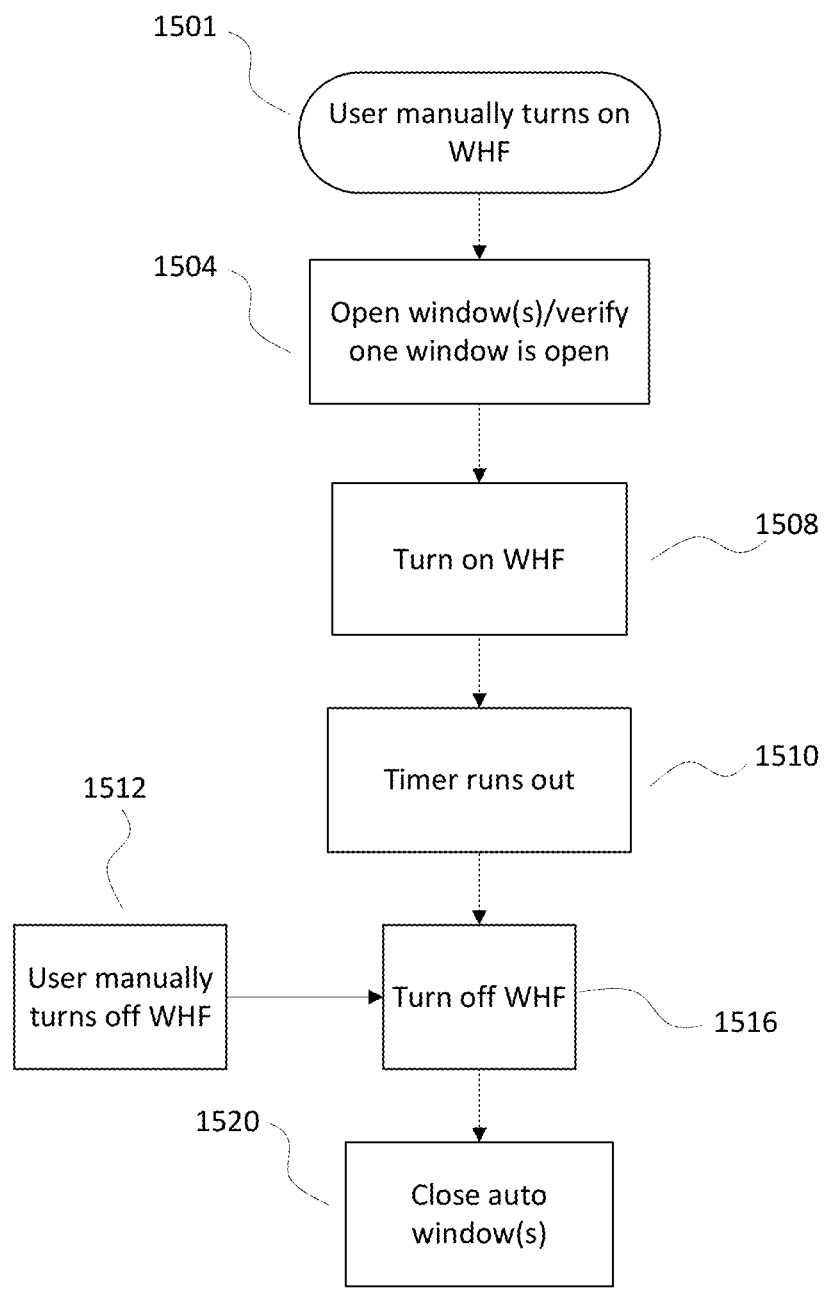
FIG. 15 is a control diagram illustrating an embodiment for operating a multifunction adaptive whole house fan system.

FIG. 15 depicts an embodiment of a diagram of control logic for controlling the operation of the WHF 102 where a WHF 102 is part of the system 100 and where the system 100 is set to operate in a manual mode.

In some embodiments, as depicted in FIG. 15 step 1504, the fresh air controller can be configured to send a signal or command to open the automatic windows 228A-C after receiving a signal that the user has manually turned on the fresh air system 100, as depicted in step 1501, through either the switch 432, user device 201, and/or smart phone application 220. The user can also utilize the switch 432, user device 201, and/or smart phone application 220 to set a timer such that the fresh air controller turns on the system after a set amount of time. Step 1504 corresponds to Step 780 of FIG. 7 and can be performed in the same manner as step 780 of FIG. 7.

After sending a signal or command to open the automatic windows as depicted in step 1504, the fresh air controller 300 can send a signal or command to cause to turn on the WHF 102 as depicted in step 1508. The system will then wait for further input from either a timer set by the user or from manual input by the user.

In some embodiments, the user can utilize the switch 432, user device 201, and/or smart phone application 220 to set a timer such that the fresh air controller 300 turns off the system after a set amount of time as depicted in step 1510. In some embodiments, as depicted in FIG. 15 step 1516, after receiving a signal that the timer set by the user has run out, the fresh air controller 300 can send a signal or command to turn off the WHF 102. As depicted in step 1512, the fresh air controller 300 can send a signal or command to turn off the WHF 102, when the user set the system 100 to off mode using the switch 432, user device 201, and/or smart phone application 220.

After sending a signal or command to turn off the WHF 102, the fresh air controller can send a signal or command to close the one or more automatic window connected to the system 100 as depicted in step 1520. Step 1520 can correspond to step 785 of FIG. 7 and can be performed in the same manner as step 785.

In some embodiments, the fresh air controller 300 can adjust the WHF speed based operation or operational time of the WHF 102. The operation time can correspond to how long the WHF 102 has been working whether turned on by a user or automatically activated in any of the modes discussed herein. The fresh air controller 300 can track an operation time of the WHF 102 operating or receive time data associated with the operation time of the WHF 102 operating. For example, the fresh air controller 300 can have a clock or timer module that keeps track of how long the WHF 102 has been operating. The fresh air controller 300 can receive time data associated with time via internet services and determine operation time based on the time data.

With the fresh air controller 300 adjusting the WHF speed based on the operation time, the fresh air controller 300 can compare the operation time or a value corresponding to the operation time of the WHF 102 to a first, second, and third predetermined time values. For example, if the operation time is less than the first predetermined time, the fresh air controller 300 can send a command signal to operate the WHF 102 at a first speed. If the operation time value is between the first and second predetermined time values, the fresh air controller 300 can send a command signal to operate the WHF 102 at a second speed. If the operation time value is between the second and third predetermined operation time values, the fresh air controller 300 can send a command signal to operate WHF 102 at a third speed. If the operation time value is greater than the third predetermined operation value, the fresh air controller 300 can send a command signal to cease or suspend operation of the WHF 102.

In some embodiments, the first, second, and third WHF speeds correspond to a high, a medium, and a low speed, respectively, and in particular as discussed above for operation of the WHF 102 based on operation time. In some embodiments, the WHF 102 is not limited to three speeds, but instead can have 1 speed, 2 speeds, 4 speeds, 6 speeds, or any number of speeds. In some embodiments, the number of speeds corresponds to the number of predetermined values to which the fresh air controller 300 can compare the operation time such that, for example, the number of speeds is equal to the number of predetermined operation time values.

In some embodiments, the first predetermined time value can be between 1 minute to 8 hours, 2 minutes to 6 hours, 3 minutes to 4 hours, 5 minutes to 2 hours, including any time between 1 minute to 8 hours. The second predetermined time value can be between 10 minutes to 10 hours, 15 minutes to 8 hours, 20 minutes to 6 hours, 30 minutes to 4 hours, including any time between 10 minutes to 10 hours. The second predetermined time value can be between 30 minutes to 12 hours, 45 minutes to 10 hours, 1 hour to 8 hours, 2 hours to 6 hours, including any time between 30 minutes to 12 hours.

Figure 16:
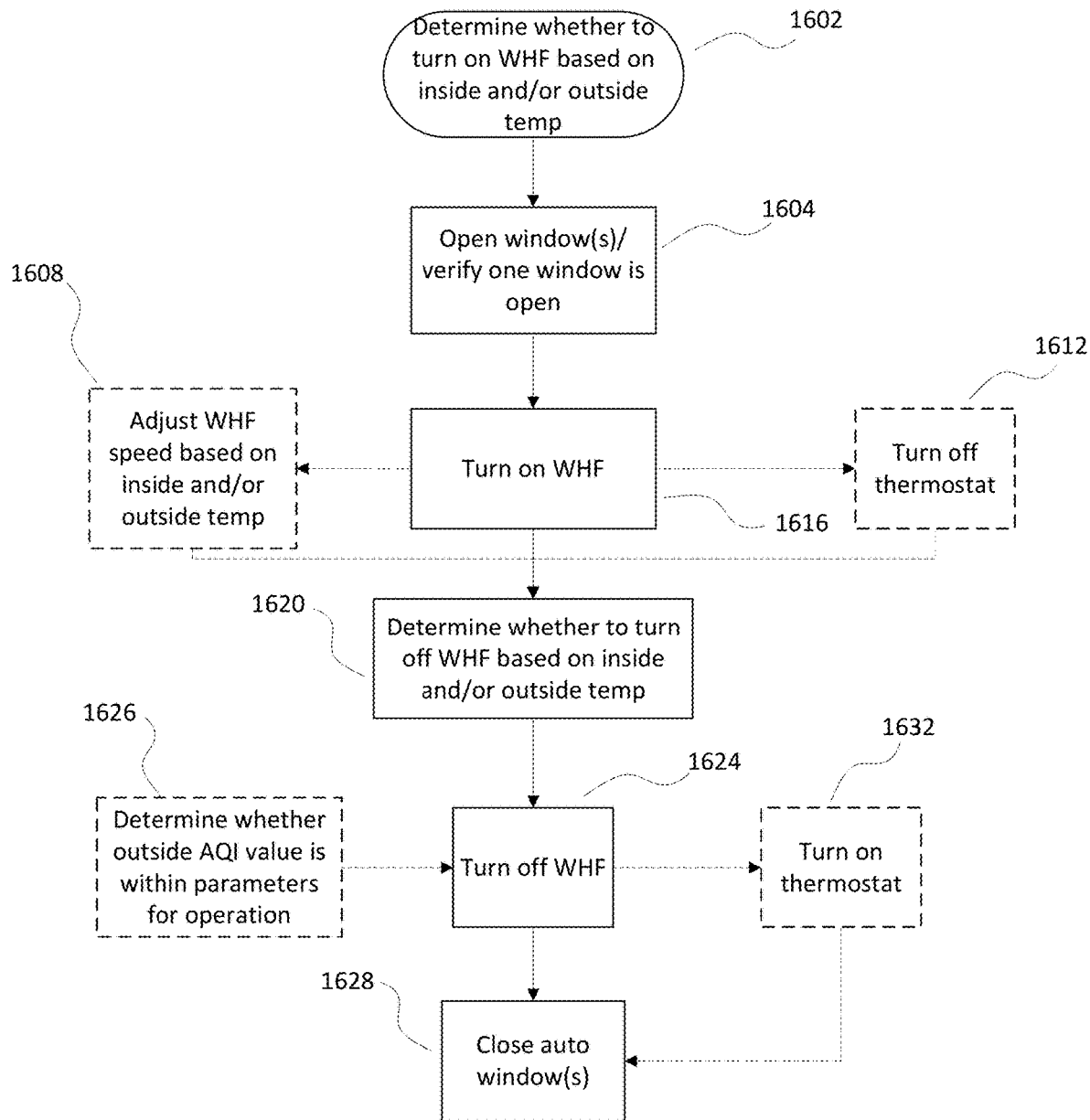
FIG. 16 is a control diagram illustrating an embodiment for operating a multifunction adaptive whole house fan system.

FIG. 16 depicts an embodiment of a diagram of control logic for controlling the operation of the WHF 102 where a WHF 102 is part of the system 100 and where the system 100 is set to operate in either automatic mode or semi-automatic mode. The control logic illustrated in FIG. 16 can run iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

In some embodiments, as depicted in step 1604 of FIG. 16, the fresh air controller 300 can send a command or signal to open the automatic windows 228A-C after determining whether to turn on the WHF 102 based on the temperature inside the building structure and/or the temperature outside the building structure as depicted in step 1602. In order to determine whether to operate the WHF, as depicted in step 1602, the fresh air controller 300 can receive temperature values corresponding to the temperature inside the building structure and/or outside the building structure. The fresh air controller 300 can send a signal or command to turn on the WHF if the inside temperature is great than the outside temperature. In some embodiments, as part of step 1602, the fresh air controller 300 can determine whether the inside temperature is within parameters for operation in a same manner as described in step 760 of FIG. 7 herein. In some embodiments, as part of step 1602, the fresh air controller 300 can determine whether the outside temperature is within parameters for operation in a same manner as described in step 740 of FIG. 7 herein. Step 1616 can correspond to Step 780 of FIG. 7 and can be performed in the same manner as step 780 of FIG. 7.

In some embodiments, in step 1602, the fresh air controller 300 can compare the current outside temperature to a predetermined maximum outside temperature value. Where the outside temperature value is less than the predetermined maximum outside temperature value, the fresh air controller 300 can send a signal or command to turn on the WHF 102. The predetermined maximum outside temperature value can be preset by the manufacturer or set by the installer or set the use the switch 432, user device 201, and/or smart phone application 220.

In some embodiments, in step 1602, the fresh air controller 300 can compare the current outside temperature value to a predetermined minimum outside temperature value. The predetermined minimum outside temperature value can correspond to the first predetermined temperature as discussed herein for outside temperatures. Where the outside temperature is greater than the predetermined minimum outside temperature value, the fresh air controller 300 can send a signal or command to turn on the WHF 102. The predetermined minimum temperature value can be preset by the manufacturer or set by the installer or set the use the switch 432, user device 201, and/or smart phone application 220.

In some embodiments, in step 1602, the fresh air controller 300 can compare the current inside temperature value to a predetermined maximum inside temperature value. Where the inside temperature is less than the predetermined maximum inside temperature value, the fresh air controller 300 can send a signal or command to turn on the WHF 102. The predetermined maximum inside temperature value can be preset by the manufacturer or set by the installer or set the use the switch 432, user device 201, and/or smart phone application 220.

In some embodiments, in step 1602, the fresh air controller 300 can compare the current inside temperature value to a predetermined minimum inside temperature value. The predetermined minimum inside temperature value can correspond to the first predetermined temperature as discussed herein for inside temperatures. Where the inside temperature is greater than the predetermined minimum inside temperature value, the fresh air controller 300 can send a signal or command to turn on the WHF 102. The predetermined minimum inside temperature value can be preset by the manufacturer or set by the installer or set the use the switch 432, user device 201, and/or smart phone application 220.

In some embodiments, as depicted in step 1616 of FIG. 16, the fresh air controller 300 can send a command or signal to turn on the WHF 102 after sending a signal or command to open the automatic windows 228A-C as depicted in step 1604.

In some embodiments, the fresh air controller 300 can perform step 1608, step 1612, or both step 1608 and step 1612 in addition to step 1616. The dashed lines linking steps 1608 and 1612 to the rest of the control logic diagram depicted in FIG. 16 indicate that steps 1608 and 1612 are additional logic or feature that does not need to be performed by the fresh air controller 300. Either upon manufacture/initial programming by the installer or by input from the user, the system 100 can be configured to utilize steps 1608 or 1612 of the control logic or configured not to do so. In some embodiments, the user can control whether steps 1608 and 1612 are performed by utilizing the switch 432, user device 201, and/or smart phone application 220. Step 1608 can correspond to step 1416 and can be performed in the same manner as step 1416 of FIG. 14 described herein. Similarly, step 1612 corresponds to step 770 in FIG. 7 and can be performed in the same manner as step 770 described herein.

After opening the one or more automatic windows 228A-C connected to the system in step 1616 and, in some embodiments, performing steps 1608 and 1612, the fresh air controller can proceed to determine whether to turn off the WHF based the temperature inside the building structure and/or outside the building structure as depicted in step 1620. Step 1620 can correspond to step 1420 of FIG. 14. The fresh air controller 300 can perform step 1620 in substantially the same manner as described above for step 1420.

Where the fresh air controller determines the WHF 102 should not be turned off at step 1620, the fresh air controller can iteratively repeat step 1620 until the fresh air controller 300 determines the WHF 102 should be turned off. Where the control logic of FIG. 16 includes the optional step 1608 and where the fresh air controller determines the WHF 102 should not be turned off at step 1620, the fresh air controller can iteratively repeat steps 1608 and 1620 until the fresh air controller 300 determines the WHF 102 should be turned off.

In some embodiments, the fresh air controller 300 can perform step 1626 in addition to step 1620. The dashed lines linking steps 1626 to the rest of the control logic diagram depicted in FIG. 16 indicate that step 1626 is additional logic or feature that does not need to be performed by the fresh air controller 300. Either upon manufacture/initial programming or by input from the user, the system 100 can be configured to utilize step 1626 of the control logic or configured not to do so. In some embodiments, the user can control whether step 1626 is performed by utilizing the switch 432, user device 201, and/or smart phone application 220. Step 1626 can correspond to step 725 and can be performed in the same manner as step 725 of FIG. 7 described herein.

If the fresh air controller 300 determines the WHF 102 should be turned off based on the temperature inside and/or outside the building structure in step 1620 and/or based on the air quality index in step 1626, the fresh air controller 300 can send a signal or command turning off the WHF 102 as depicted in step 1624. After sending a signal or command to turn off the WHF 102, the fresh air controller 300 can send a signal or command to close the one or more automatic windows. In addition to performing step 1628, the fresh air controller 300, after sending a signal or command to turn of the WHF 102 in step 1624, can send signal or command to turn on a thermostat connected to the system 100 as depicted in step 1632 thereby allowing climate of the building structure to be conditioned by an air conditioning system instead of the fresh air system 100 when conditions are not optimal for the WHF operation. The dashed lines linking step 1632 to the rest of the control logic diagram depicted in FIG. 16 indicate that step 1632 is additional logic or feature that does not need to be performed by the fresh air controller 300. Either upon manufacture/initial programming by the installer or by input from the user, the system 100 can be configured to utilize step 1632 of the control logic or configured not to do so. In some embodiments, the user can control whether or not step 1632 is performed by utilizing the switch 432, user device 201, and/or smart phone application 220.

Figure 17:
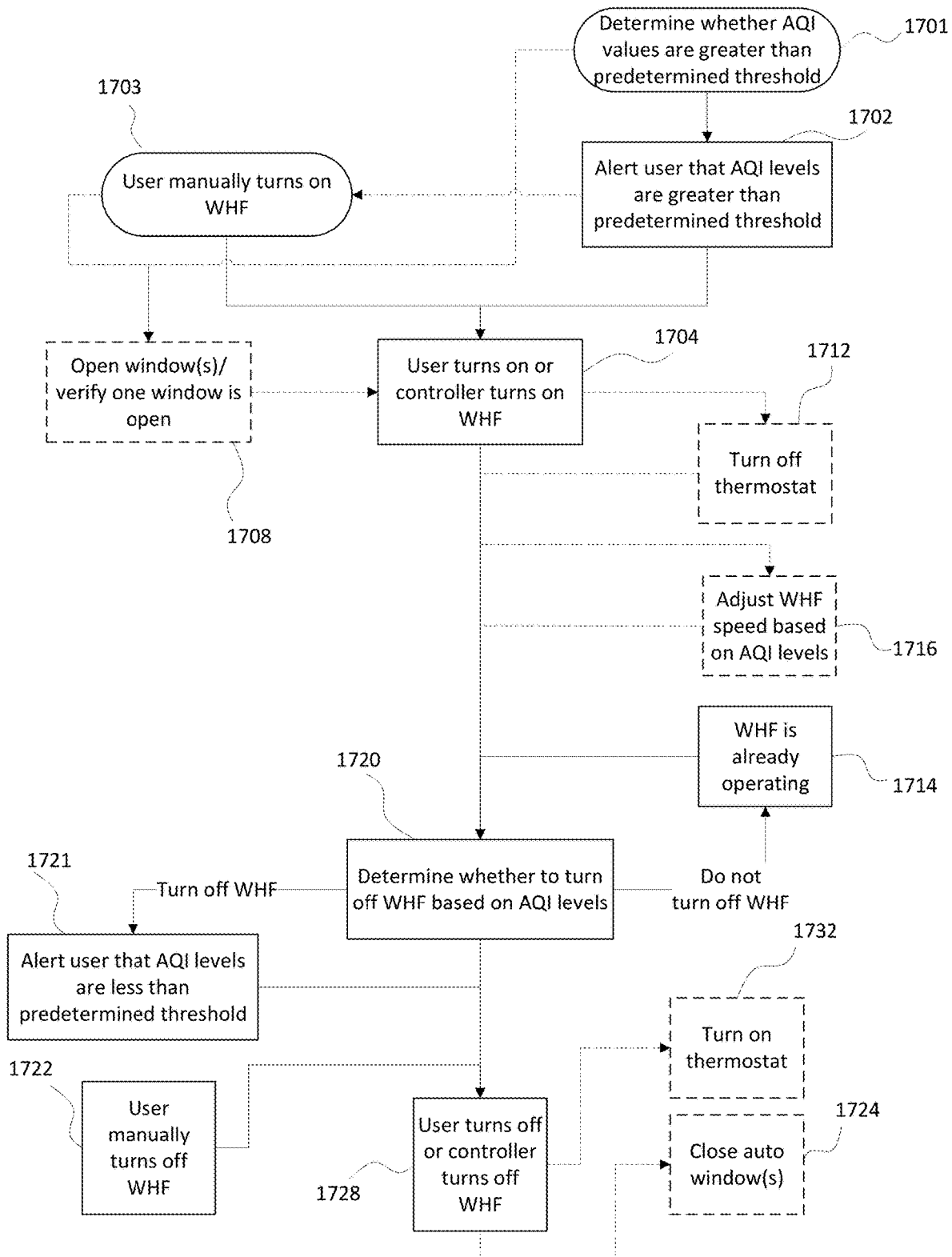
FIG. 17 is a control diagram illustrating an embodiment for operating a multifunction adaptive whole house fan system.

FIG. 17 depicts an embodiment of a diagram of control logic for controlling the operation of the WHF 102 where a WHF 102 is part of the system 100 and where the system 100 monitors the air quality index (AQI) values as discussed herein to reduce undesired air pollutants inside the building structure by bringing in fresh air. The fresh air controller 300 can run the control logic of FIG. 17 iteratively at a range of different intervals including every minute, every five minutes, every 10 minutes, every 30 seconds, every 1 second, anytime in between, or anytime beyond 10 minutes. The interval at which the fresh air controller 300 can operate the logic can be set by the manufacturer, by the installer, by the user, by the manufacturer, or by the installer and can be modified by the user.

The fresh air controller 300 can monitor the AQI values, information, and/or signals that are received from climate condition systems 217, internet, and/or sensors 230 as discussed herein. At step 1701, the fresh air controller 300 can determine whether AQI values inside the building structure are greater than the desired or predetermined threshold or range (e.g., beyond or outside of a desired condition or predetermined range). For example, one or more sensors 230 can monitor whether volatile organic compound (VOC) gases, carbon dioxide, carbon monoxide, smoke, particulates, and/or pollen in the building structure 106 (including attic space 104 and/or interior space 108) exceed or are greater than the desired levels or predetermined thresholds. Upon determining that the one or more AQI values exceed the predetermined levels, the fresh air controller 300 can send a push notification 216 at step 1702 to the user as discussed herein to alert the user that of the AQI value and associated information about the AQI level being greater than the predetermined levels, and/or the fresh air controller 300 can turn on the WHF as discussed herein to remove the undesired air pollutants inside the building structure (e.g., when AQI levels are high or above predetermined thresholds) by bringing in fresh air. The predetermined thresholds for AQI can be set by the manufacturer, by the installer, by the user, by the manufacturer, or by the installer and can be modified by the user.

In some embodiments, the fresh controller 300 can be programmed to not monitor or send command signals in response to carbon dioxide levels. High or undesirable carbon dioxide levels may indicate a fire inside the building structure. Turning on the WHF may further fuel and expand the fire. Accordingly, it may be undesirable to have the fresh air controller turn on WHF. In some embodiments, however, the fresh air controller 300 can monitor carbon dioxide levels inside the building structure. When carbon dioxide levels are above a predetermined range or threshold, the fresh air controller 300 can turn off the WHF for safety in case a fire is present inside the building structure and/or send a push notification 216 to the user alerting the user of the carbon dioxide levels exceeding a predetermined threshold.

In some embodiments, as part of step 1701, the fresh air controller 300 can compare inside AQI values to outside AQI values to determine whether to turn on the WHF. For example, even when inside AQI values our greater than the predetermined levels, if outside AQI values are greater by a larger amount or value of the predetermined levels, the fresh air controller 300 can determine to not turn on the WHF and/or not send a push notification 216 to the user regarding the AQI levels. The fresh air controller can determine and compare inside to outside AQI values using signal and value inputs from the climate condition system 217, air conditioning system 215, and/or one or more sensors 230 as discussed herein.

In some embodiments, as depicted in FIG. 17 at step 1704, the fresh air controller 300 can send a signal or command to the whole house fan controller 200 to turn on the WHF in response to the user manually turning on the WHF using the switch 432, user device 201, and/or smart phone application 220, as depicted in step 1704. When the system 100 is set to run in semi-automatic or automatic mode, after determining the AQI levels exceed the predetermined threshold as depicted in step 1701, the fresh air controller 300 can turn on the WHF as depicted in the step 1704. In determining whether the AQI levels exceed the predetermined threshold as depicted in step 1701, the fresh air controller 300 can receive values corresponding conditions inside and outside the building structure and compare them to AQI parameters such as thresholds as discussed herein.

As part of proceeding to step 1704, the fresh air controller can optionally perform step 1708 to open and/or verify one or more windows are open, for example, prior to proceeding to step 1704. The dashed lines linking steps 1708 to the rest of the control logic diagram depicted in FIG. 17 indicate that step 1708 is additional logic or feature that does not need to be performed by the fresh air controller 300. Either upon manufacture/initial programming by the installer or by input from the user, the system 100 can be configured to utilize step 1708 of the control logic or configured not to do so. In some embodiments, the user can control whether step 1708 is performed by utilizing the switch 432, user device 201, and/or smart phone application 220. Step 1708 can correspond to step 780 and can be performed in the same manner as step 780 of FIG. 7 using AQI values and thresholds as discussed herein to determine whether to open one or more windows and/or verify whether one or more windows are open.

After sending a signal or command to turn on the WHF 102, the fresh air controller can optionally perform step 1712, for example, prior to proceeding to step 1720. The dashed lines linking step 1712 to the rest of the control logic diagram depicted in FIG. 17 indicate that step 1712 is additional logic or feature that does not need to be performed by the fresh air controller 300. Either upon manufacture/initial programming by the installer or by input from the user, the system 100 can be configured to utilize step 1712 of the control logic or configured not to do so. In some embodiments, the user can control whether step 1712 is performed by utilizing the switch 432, user device 201, and/or smart phone application 220. Step 1712 can correspond to step 770 in FIG. 7 and can be performed in the same manner as step 770.

After sending a signal or command to turn on the WHF 102, the fresh air controller can optionally proceed to step 1716 (as depicted by dashed lines FIG. 17) and adjust the WHF speed based on the AQI values inside the building structure and/or the AQI values outside the building structure. The adjustment of the WHF speed as depicted is step 1716 can correspond to step 775 of FIG. 7 and step 1716 can be performed in substantially the same manner as step 775 using AQI values and comparisons thereof. The dashed lines linking step 1716 to the rest of the control logic diagram depicted in FIG. 17 indicate that step 1716 is additional logic or feature that does not need to be performed by the fresh air controller 300. Either upon manufacture/initial programming by the installer or by input from the user, the system 100 can be configured to utilize step 1716 of the control logic or configured not to do so. In some embodiments, the user can control whether step 1716 is performed by utilizing the switch 432, user device 201, and/or smart phone application 220. Step 1716 can correspond to step 775 in FIG. 7 and can be performed in the same manner as step 775.

In some embodiments, the adjustment of the WHF speed depicted in step 1716 can be based on the AQI values inside and/or outside the building structure. Where the fresh air controller 300 adjusts the WHF speed based on the AQI values inside the building structure, the fresh air controller 300 can compare the AQI values to a first, second, and third predetermined AQI values. For example, if the AQI values is between a first and second predetermined AQI values, the fresh air controller 300 can send a command signal to operate the WHF 102 at a first speed. If the AQI value is between a second and third predetermined AQI values, the fresh air controller 300 can send a command signal to operate WHF 102 at a second speed. If the AQI value is greater than the third predetermined AQI values, the fresh air controller 300 can send a command signal to operate the WHF 102 at a third speed.

In some embodiments, the first, second, and third WHF speeds correspond to a low, a medium, and a high speed, respectively. In some embodiments, the WHF is not limited to three speeds, but instead can have 1 speed, 2 speeds, 4 speeds, 6 speeds, or any number of speeds. In some embodiments, the number of speeds corresponds to the number of predetermined values to which the fresh air controller 300 can compare the AQI values inside the building structure such that, for example, the number of speeds is equal to the number of predetermined AQI values.

In some embodiments, the fresh air controller 300 can proceed to step 1720 directly after step 1704. In some embodiments, the fresh air controller can optionally perform steps 1712 and/or 1716 as discussed herein. In step 1720, the fresh air controller can determine whether to turn off the WHF 102 based on the inside AQI values of the building structure and/or the outside AQI of the building structure. In order to determine whether to turn off the WHF 102 the fresh air controller can receive a value corresponding to the present air AQI. The fresh air controller can also store a value corresponding to the air AQI at a previous time. For example, the previous time could be the time at which a previous iteration of the control logic was run or the outside AQI at the time the WHF 102 was turned on.

The fresh air controller 300 can monitor the AQI values, information, and/or signals that are received from the internet, climate condition systems 217, and/or sensors 230 as discussed herein. At step 1720, the fresh air controller 300 can determine whether inside and/or outside AQI values are less than the desired or predetermined threshold or range (e.g., beyond a desired condition or predetermined range) as discussed herein for step 1701, but upon determining that the inside and/or outside AQI values are within desired ranges, the fresh air controller 300 can send a push notification to the user and/or turn off the WHF.

For example, the fresh air controller 300 can determine whether AQI values inside the building structure are less than the desired or predetermined threshold or range (e.g., within a desired condition or predetermined range). One or more sensors 230 can monitor whether volatile organic compound (VOC) gases, carbon dioxide, carbon monoxide, smoke, particulates, and/or pollen in the building structure 106 (including attic space 104 and/or interior space 108) are within or less than the desired levels or predetermined thresholds. Upon determining that the AQI values within the predetermined levels, the fresh air controller 300 can send a push notification 216 at step 1721 to the user as discussed herein regarding the AQI value and associated information alerting the user that the AQI levels are within the predetermined levels and/or the fresh air controller 300 can turn off the WHF as discussed herein.

In some embodiments, as depicted in FIG. 17 at step 1720, the fresh air controller 300 can send a signal or command to the whole house fan controller 200 to turn off the WHF in response to the user manually turning off the WHF using the switch 432, user device 201, and/or smart phone application 220, as depicted in step 1728. When the system 100 is set to run in semi-automatic or automatic mode, after determining parameters are the AQI levels are within or less than the predetermined threshold as depicted in step 1720, the fresh air controller 300 can turn off the WHF as depicted in step 1728. In determining whether the AQI levels are within the predetermined threshold as depicted in step 1720, the fresh air controller 300 can receive values corresponding conditions inside and outside the building structure and compare them to AQI parameters or thresholds as discussed herein. The fresh air controller 300 can perform similar logic and control steps as discussed herein for outside AQI values or comparison of inside to outside AQI values as discussed herein for step 1701, but turning off the WHF when the AQI levels are less than or within predetermined levels or thresholds.

In the automatic or semi-automatic mode, where the fresh air controller 300 determines the WHF 102 should not be turned off at step 1720, the fresh air controller can iteratively repeat steps 1720 until the fresh air controller 300 determines the WHF 102 should be turned off, as depicted in step 1714, or the user manually turns off the WHF as depicted in step 1722. The user can manually turn off the WHF utilizing the use the switch 432, user device 201, and/or smart phone application 220.

Where the fresh air controller 300 determines the WHF 102 should be turned off (and in some embodiments, where the user manually turns off the WHF), the fresh air controller 300 can send a signal or command turning off the WHF 102. After or at the same time as sending a signal or command turning off the WHF 102 as depicted in step 1728, the fresh air controller can optionally perform steps 1724 and/or 1732 (as depicted by dashed lines FIG. 17). Step 1724 can correspond to step 785 and can be performed in the same manner as step 785 of FIG. 7. As depicted in step 1732 the fresh air controller 300 can send a signal or command to turn on a thermostat connected to the system 100 thereby allowing climate of the building structure to be conditioned by an air conditioning system instead of the fresh air system 100, for example, when conditions are not optimal or desired for the WHF operation as discussed herein.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, user interfaces, and algorithm steps described in connection with the embodiments disclosed herein can be implemented as electronic hardware, or combinations of electronic hardware and computer software. To illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks, user interfaces, and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device (controller), or in a combination of the two, that command, control, or cause the system(s) and associated components described herein to perform one or more functions or features of the method, process, routine, or algorithm. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The foregoing description of the preferred embodiments of the present disclosure has shown, described and pointed out the fundamental novel features of the inventions. The various devices, methods, procedures and techniques described above provide a number of ways to carry out the described embodiments and arrangements. Of course, it is to be understood that not necessarily all features, objectives or advantages described are required and/or achieved in accordance with any particular embodiment described herein. Also, although the invention has been disclosed in the context of certain embodiments, arrangements and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of the embodiments herein.

What is claims is:

1. A multifunction adaptive whole house fan system for use in a building structure having an attic and a living space, the system comprising:
   a whole house fan configured to be positioned in the attic of the building structure, the whole house fan having an air flow capacity within a range of 500 to 8000 cubic feet per minute, the whole house fan configured to expel an exhaust of the whole house fan into the attic from the living space to create a positive static pressure in the attic to cause air in the attic to be pushed out through one or more vents in the attic and inhibit outside air from being drawn into the attic through the one or more vents;
   an air intake comprising an air register, the air intake configured to be positioned in a wall separating the attic and the living space of the building structure;
   a duct having a first end and a second end, the first end configured to be attached to the whole house fan, the second end configured to be attached to the air intake, the duct being flexible between the first end and the second end;
   a motorized window configured to be positioned in a wall separating the living space from ambient environment of the building structure, the motorized window configured to automatically open to permit ambient air to enter the living space and to automatically close to inhibit ambient air from entering the living space, the motorized window comprising lock control to inhibit the motorized window from being forced open; and
   a fresh air controller configured to receive data associated with an outside temperature value corresponding to ambient temperature around the building structure and an inside temperature value corresponding to temperature inside the living space, the fresh air controller configured to be in communication with and control operation of the whole house fan and the motorized window, the fresh air controller configured to be in communication with a thermostat controller, the thermostat controller configured to control operation of an air conditioning system of the building structure, the air conditioning system configured to maintain a desired temperature inside the living space, wherein the fresh air controller is configured to adjust speed of the whole house fan based on the inside temperature value, the fresh air controller configured to:
      compare the outside temperature value to the inside temperature value;
      based on a comparison being that the outside temperature value is less than the inside temperature value:
         send a cease operation command to the thermostat controller for the thermostat controller to suspend operation of the air conditioning system;
         cause the motorized window to open to permit ambient air to enter the living space; and
         cause the whole house fan to operate to draw air into the attic from the living space through the air register via the duct and to draw ambient air into the living space through the motorized window as the air is drawn into the attic from the living space;
      based on a comparison being that the outside temperature value is greater than the inside temperature value:
         cause the whole house fan to suspend operation;
         cause the motorized window to close to inhibit ambient air from entering the living space; and
         send a resume or continue operation command to the thermostat controller for the thermostat controller to resume or continue operation of the air conditioning system;
      compare the inside temperature value to a first predetermined temperature, a second predetermined temperature, and a third predetermined temperature, wherein the first predetermined temperature is less than the second predetermined temperature, and the second predetermined temperature is less than the third predetermined temperature;
      based on a comparison being that the inside temperature value is between the first predetermined temperature and the second predetermined temperature, cause the whole house fan to operate at a first speed;
      based on a comparison being that the inside temperature value is between the second predetermined temperature and the third predetermined temperature, cause the whole house fan to operate at a second speed, the second speed being greater than the first speed; and
      based on a comparison being that the inside temperature value is greater than the third predetermined temperature, cause the whole house fan to operate at a third speed, the third speed being greater than the second speed.

2. The multifunction adaptive whole house fan system of claim 1, further comprising a ventilation fan configured to be positioned in the attic of the building structure, the ventilation fan configured to be positioned proximate to a vent of the one or more vents, the ventilation fan configured to draw air from the attic through the vent to facilitate the whole house fan pushing air from the attic through the one or more vents.

3. The multifunction adaptive whole house fan system of claim 1, wherein the fresh air controller is configured, based on a comparison being that the inside temperature value is less than the first predetermined temperature, to:
   cause the whole house fan to suspend operation; and
   cause the motorized window to close to inhibit ambient air from entering the living space.

4. The multifunction adaptive whole house fan system of claim 1, wherein the fresh air controller is configured to receive data associated with an attic temperature value corresponding to temperature inside the attic, the fresh air controller configured to:
   compare the attic temperature value to a predetermined attic temperature; and
   based on a comparison being that the attic temperature value is greater than the predetermined attic temperature, cause the whole house fan to suspend operation and the motorized window to close to inhibit ambient air from entering the living space.

5. The multifunction adaptive whole house fan system of claim 1, wherein the fresh air controller is configured to retrieve a previous outside temperature value corresponding to ambient temperature around the building structure from a predetermined previous time period, the fresh air controller configured to:
   compare the outside temperature value to the previous outside temperature value; and
   based on a comparison being of the outside temperature value is greater than the previous outside temperature value by a predetermined value, cause the whole house fan to suspend operation and the motorized window to close to inhibit ambient air from entering the living space.

6. A multifunction adaptive whole house fan system for use in a building structure having an attic and an interior space, the system comprising:

a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic and inhibit outside air from being drawn into the attic through the one or more vents;

a motorized window configured to be positioned between the interior space and ambient environment of the building structure, the motorized window configured to automatically open to permit ambient air to enter the interior space and to automatically close to inhibit ambient air from entering the interior space; and a fresh air controller configured to receive data associated with an outside temperature value corresponding to ambient temperature around the building structure and an inside temperature value corresponding to temperature in the interior space, the fresh air controller configured to control operation of the whole house fan and the motorized window, the fresh air controller configured to be in communication with a thermostat controller, the thermostat controller configured to control operation of an air conditioning system of the building structure, the air conditioning system configured to maintain a desired temperature inside the interior space, wherein the fresh air controller is configured to receive data associated with an attic temperature value corresponding to temperature inside the attic, the fresh air controller configured to:

compare the outside temperature value to the inside temperature value;

based on a comparison being that the outside temperature value is less than the inside temperature value:
send a cease operation command to the thermostat controller for the thermostat controller to suspend operation of the air conditioning system;
cause the motorized window to open to permit ambient air to enter the interior space; and
cause the whole house fan to operate to draw air into the attic from the interior space and to draw ambient air into the interior space through the motorized window as the air is drawn into the attic from the interior space;

based on a comparison being that the outside temperature value is greater than the inside temperature value:
cause the whole house fan to suspend operation;
cause the motorized window to close to inhibit ambient air from entering the interior space; and
send a resume or continue operation command to the thermostat controller for the thermostat controller to resume or continue operation of the air conditioning system;
compare the attic temperature value to a predetermined attic temperature; and
based on a comparison being that the attic temperature value is greater than the predetermined attic temperature, cause the whole house fan to suspend operation and the motorized window to close to inhibit ambient air from entering the interior space.

7. The multifunction adaptive whole house fan system of claim 6, further comprising a user device configured to be positioned in the interior space, the user device comprising the fresh air controller.

8. The multifunction adaptive whole house fan system of claim 6, wherein the fresh air controller is configured to adjust speed of the whole house fan based on the inside temperature value, the fresh air controller configured to:
compare the inside temperature value to a first predetermined temperature, a second predetermined temperature, and a third predetermined temperature, wherein the first predetermined temperature is less than the second predetermined temperature, and the second predetermined temperature is less the third predetermined temperature;
based on a comparison being that the inside temperature value is between the first predetermined temperature and the second predetermined temperature, cause the whole house fan to operate at a first speed;
based on a comparison being that the inside temperature value is between the second predetermined temperature and the third predetermined temperature, cause the whole house fan to operate at a second speed, the second speed being greater than the first speed; and
based on a comparison being that the inside temperature value is greater than the third predetermined temperature, cause the whole house fan to operate at a third speed, the third speed being greater than the second speed.

9. The multifunction adaptive whole house fan system of claim 8, wherein the fresh air controller is configured, based on a comparison being that the inside temperature value is less than the first predetermined temperature, to:
cause the whole house fan to suspend operation; and
cause the motorized window to close to inhibit ambient air from entering the interior space.

10. The multifunction adaptive whole house fan system of claim 6, further comprising an attic temperature sensor configured to send a temperature signal corresponding to the attic temperature value, the fresh air controller configured to receive the temperature signal to determine the attic temperature value.

11. The multifunction adaptive whole house fan system of claim 6, wherein the fresh air controller is configured to retrieve a previous outside temperature value corresponding to ambient temperature around the building structure from a predetermined previous time period, the fresh air controller configured to:
compare the outside temperature value to the previous outside temperature value; and
based on a comparison being of the outside temperature value is greater than the previous outside temperature value by a predetermined value, cause the whole house fan to suspend operation and the motorized window to close to inhibit ambient air from entering the interior space.

12. The multifunction adaptive whole house fan system of claim 6, wherein the fresh air controller is configured to receive a window signal indicating whether the motorized window is open or closed, and wherein the fresh air controller is configured to cause the whole house fan to suspend operation based on the window signal indicating that the motorized window is closed.

13. A multifunction whole house fan system for use in a building structure having an attic and an interior space, the system comprising:
- a whole house fan configured to be positioned in the attic of the building structure, the whole house fan having an air flow capacity within a range of 500 to 8000 cubic feet per minute, the whole house fan configured to expel an exhaust of the whole house fan into the attic from the interior space to create a positive static pressure in the attic to cause air in the attic to be pushed out through one or more vents in the attic;
- a motorized window configured to be positioned at the interior space, the motorized window configured to automatically open to permit ambient air to enter the interior space and to automatically close to inhibit ambient air from entering the interior space; and
- a fresh air controller configured to receive data associated with an outside temperature value corresponding to ambient temperature around the building structure and an inside temperature value corresponding to temperature in the interior space, the fresh air controller configured to control operation of the whole house fan and the motorized window, wherein the fresh air controller is configured to adjust speed of the whole house fan based on the inside temperature value, the fresh air controller configured to:
  - compare the outside temperature value to the inside temperature value;
  - based on a comparison being that the outside temperature value is less than the inside temperature value:
    - cause the motorized window to open to permit ambient air to enter the interior space; and
    - cause the whole house fan to operate to draw air into the attic from the interior space and to draw ambient air into the interior space through the motorized window as the air is drawn into the attic from the interior space;
  - based on a comparison being that the outside temperature value is greater than the inside temperature value:
    - cause the whole house fan to suspend operation; and
    - cause the motorized window to close to inhibit ambient air from entering the interior space;
  - compare the inside temperature value to a first predetermined temperature, a second predetermined temperature, and a third predetermined temperature, wherein the first predetermined temperature is less than the second predetermined temperature, and the second predetermined temperature is less the third predetermined temperature;
  - based on a comparison being that the inside temperature value is between the first predetermined temperature and the second predetermined temperature, cause the whole house fan to operate at a first speed;
  - based on a comparison being that the inside temperature value is between the second predetermined temperature and the third predetermined temperature, cause the whole house fan to operate at a second speed, the second speed being greater than the first speed; and
  - based on a comparison being that the inside temperature value is greater than the third predetermined temperature, cause the whole house fan to operate at a third speed, the third speed being greater than the second speed.

14. The multifunction whole house fan system of claim 13, wherein the fresh air controller is configured to be in communication with a thermostat controller, the thermostat controller configured to control operation of an air conditioning system of the building structure, the air conditioning system configured to maintain a desired temperature inside the interior space.

15. The multifunction whole house fan system of claim 14, wherein, based on the comparison being that the outside temperature value is less than the inside temperature value, the fresh air controller is configured to send a cease operation command to the thermostat controller for the thermostat controller to suspend operation of the air conditioning system.

16. The multifunction whole house fan system of claim 14, wherein, based on a comparison being that the outside temperature value is greater than the inside temperature value, the fresh air controller is configured to send a resume or continue operation command to the thermostat controller for the thermostat controller to resume or continue operation of the air conditioning system.

17. The multifunction whole house fan system of claim 14, wherein the fresh air controller is configured to wirelessly communicate with the thermostat controller.

18. The multifunction whole house fan system of claim 14, wherein the fresh air controller and the thermostat controller are included in a same control unit that is configured to control the multifunction whole house fan system.

19. The multifunction whole house fan system of claim 18, wherein the fresh air controller comprises the thermostat controller.

20. The multifunction whole house fan system of claim 13, further comprising an air intake comprising an air register, the air intake configured to be positioned in a wall separating the attic and the interior space of the building structure.

21. The multifunction whole house fan system of claim 20, further comprising a duct having a first end and a second end, the first end configured to be attached to the whole house fan, the second end configured to be attached to the air intake, the duct being flexible between the first end and the second end.

22. The multifunction whole house fan system of claim 13, further comprising a ventilation fan configured to be positioned in the attic of the building structure, the ventilation fan configured to be positioned proximate to a vent of the one or more vents, the ventilation fan configured to draw air from the attic through the vent to facilitate the whole house fan pushing air from the attic through the one or more vents.

23. The multifunction whole house fan system of claim 22, wherein the fresh air controller is configured to cause the ventilation fan to operate with the whole house fan being operated.

24. The multifunction whole house fan system of claim 13, further comprising a user device configured to be positioned in the interior space, the user device comprising the fresh air controller.

25. The multifunction whole house fan system of claim 24, wherein the user device comprises a temperature sensor configured to send a temperature signal corresponding to the inside temperature value, the fresh air controller configured to receive the temperature signal to determine the inside temperature value.

26. The multifunction whole house fan system of claim 13, wherein the fresh air controller is configured, based on a comparison being that the inside temperature value is less than the first predetermined temperature, to:
- cause the whole house fan to suspend operation; and cause the motorized window to close to inhibit ambient air from entering the interior space.

27. The multifunction whole house fan system of claim 13, wherein the fresh air controller is configured to receive data associated with an attic temperature value corresponding to temperature inside the attic, the fresh air controller configured to:
  compare the attic temperature value to a predetermined attic temperature; and
  based on a comparison being that the attic temperature value is greater than the predetermined attic temperature, cause the whole house fan to suspend operation and the motorized window to close to inhibit ambient air from entering the interior space.

28. The multifunction whole house fan system of claim 27, further comprising an attic temperature sensor configured to send a temperature signal corresponding to the attic temperature value, the fresh air controller configured to receive the temperature signal to determine the attic temperature value.

29. The multifunction whole house fan system of claim 13, wherein the fresh air controller is configured to retrieve a previous outside temperature value corresponding to ambient temperature around the building structure from a predetermined previous time period, the fresh air controller configured to:
  compare the outside temperature value to the previous outside temperature value; and
  based on a comparison being of the outside temperature value is greater than the previous outside temperature value by a predetermined value, cause the whole house fan to suspend operation and the motorized window to close to inhibit ambient air from entering the interior space.

30. The multifunction whole house fan system of claim 13, wherein the fresh air controller is configured to receive a window signal indicating whether the motorized window is open or closed, and wherein the fresh air controller is configured to cause the whole house fan to suspend operation based on the window signal indicating that the motorized window is closed.

* * * * *